(12) United States Patent
Ouchi et al.

(10) Patent No.: US 6,299,542 B1
(45) Date of Patent: Oct. 9, 2001

(54) CONSTANT VELOCITY JOINT AND ROLLING BEARING UNIT FOR WHEEL

(75) Inventors: Hideo Ouchi; Yasumasa Mizukoshi; Shigeoki Kayama, all of Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/291,304

(22) Filed: Apr. 15, 1999

(30) Foreign Application Priority Data

| Apr. 15, 1998 | (JP) | 10-104885 |
| Apr. 30, 1998 | (JP) | 10-120383 |
| Jul. 22, 1998 | (JP) | 10-206249 |
| Aug. 10, 1998 | (JP) | 10-226142 |

(51) Int. Cl.⁷ .................................................. F16D 3/16
(52) U.S. Cl. ......................... 464/145; 464/139; 464/906
(58) Field of Search .................... 464/145, 143, 464/139, 906

(56) References Cited

U.S. PATENT DOCUMENTS

| 3,324,682 | 6/1967 | Bendler . |
| 3,412,580 | 11/1968 | Cull . |
| 3,553,979 | * 1/1971 | Masaaki .............. 464/145 |

(List continued on next page.)

FOREIGN PATENT DOCUMENTS

| 3700868 | * 7/1988 | (DE) ................ 464/145 |
| 42 34 488 | 3/1994 | (DE) . |
| 0 802 341 | 10/1997 | (EP) . |
| 0 892 187 | 1/1999 | (EP) . |
| 2 655 103 | 5/1991 | (FR) . |
| 1072475 | 6/1967 | (GB) . |
| 1 416 989 | 12/1975 | (GB) . |
| 1537067 | 12/1978 | (GB) . |
| 2 088 526 | 6/1982 | (GB) . |
| 2 109 874 | 6/1983 | (GB) . |
| 2 127 132 | 4/1984 | (GB) . |
| 57-145824 | 9/1982 | (JP) . |
| 57-145825 | 9/1982 | (JP) . |
| 57-151102 | 9/1982 | (JP) . |
| 59-185425 | 12/1984 | (JP) . |
| 62-12021 | 1/1987 | (JP) . |
| 7-317754 | 12/1995 | (JP) . |
| 11-91307 | 4/1999 | (JP) . |
| WO 97/24538 | 7/1997 | (WO) . |

OTHER PUBLICATIONS

Ouchi, "Rolling Bearing Unit and Constant Velocity Joint for Wheels", U.S. application Ser. No. 09/116,527, filed Jul. 16, 1998.

Hofmann et al., "Motor Vehicle Wheel Bearing Mountings: Actual Solutions for the Large Series Production", Ball and Roller Bearing Engineering, 1984, pp. 20–27.

Primary Examiner—Lynne H. Browne
Assistant Examiner—Aaron M Dunwoody
(74) Attorney, Agent, or Firm—Crowell & Moring LLP

(57) ABSTRACT

A constant velocity joint comprises an inner race, an outer race provided along a periphery of the inner race, a cage sandwiched in between the inner race, the outer race, and balls. A crossing angle between a central axis of the inner race and a central axis of the outer race is bisected, and the balls are disposed within a bisection plane orthogonal to a plane including these two central axes.

If a ratio $t_c/D_a$ is set to $r_t$, there is satisfied a relationship such as:

$$(0.054/r_t) \cdot D_a \leq w \leq (0.16/r_t) \cdot D_a$$

where $D_a$ is the major diameter of each ball, w is the circumference-directional width of each of the column members existing between the pockets adjacent to each other in the circumferential direction with respect to the cage, and $t_c$ is the diameter-directional thickness of each of the column members of the cage.

4 Claims, 26 Drawing Sheets

U.S. PATENT DOCUMENTS

| | | |
|---|---|---|
| 4,129,345 | 12/1978 | Krude . |
| 4,372,628 | 2/1983 | Kiener et al. . |
| 4,405,032 | 9/1983 | Welschof et al. . |
| 4,417,643 | 11/1983 | Guimbretierè . |
| 4,424,047 | 1/1984 | Welschof et al. . |
| 4,432,741 | 2/1984 | Winkler . |
| 4,449,841 | 5/1984 | Brandenstein et al. . |
| 4,466,503 | 8/1984 | Hans et al. . |
| 4,494,941 | 1/1985 | Hirai et al. . |
| 4,497,495 | 2/1985 | Christiansen . |
| 4,564,243 | 1/1986 | Asberg . |
| 4,589,857 | 5/1986 | Okoshi . |
| 4,621,700 | 11/1986 | Merkelbach . |
| 4,668,111 | 5/1987 | Kapaan . |
| 4,861,316 | 8/1989 | Welschof . |
| 4,968,287 | 11/1990 | Jacob . |
| 5,122,096 | 6/1992 | Aucktor et al. . |
| 5,167,584 | 12/1992 | Krude . |
| 5,221,233 | 6/1993 | Jacob . |
| 5,222,914 | 6/1993 | Mazziotti . |
| 5,509,856 | 4/1996 | Welschof . |
| 5,685,777 | 11/1997 | Schwärzler . |
| 5,782,696 | 7/1998 | Guimbretierè . |
| 5,975,767 | 11/1999 | Mizukoshi et al. .................. 385/544 |
| 6,071,195 * | 6/2000 | Krude .................................. 464/144 |

\* cited by examiner

CONSTANT VELOCITY JOINT AND ROLLING BEARING UNIT FOR WHEEL

This application claims the benefits of Japanese Application Nos. 10-104885, 10-120383, 10-206249 and 10-226142 which are hereby incorporated by reference.

BACKGROUND OF THE INVENTION

1. Field of the Invention

The present invention relates to a constant velocity joint and a wheel-support rolling bearing unit incorporating the constant velocity joint.

A wheel-support rolling bearing unit according to the present invention is a so-called fourth-generation hub unit, and utilized for supporting the drive wheels {(which imply front wheels of an FF car (front-engine front-drive car), rear wheels of an FR car (front-engine rear-drive car) of an RR car (rear-engine rear drive car), and whole wheels of 4WD car (four-wheel drive car)} held on the independent suspension so that the drive wheels are rotatable about the suspension.

A constant velocity joint according to the present invention is integrally incorporated into a rolling bearing unit for supporting drive wheels on, e.g., an independent suspension, and utilized for transmitting a driving force from a transmission to the drive wheels.

2. Related Background Art

A constant velocity joint is provided between a transmission of an automobile and a drive wheel supported on an independent suspension, whereby a driving force (traction) of an engine is transmittable to the drive wheel at the same angular speed along an entire periphery irrespective of a relative displacement between a differential gear and the drive wheel and of a steering angle given to the wheel. What has hitherto been known as the constant velocity joint used for such a mechanism, is disclosed, e.g., U.S. Pat. No. 3,324,682, U.S. Pat. No. 3,412,580 and U.S. Pat. No. 4,589,857.

This type of constant velocity joint 1 which has been known so far is constructed so that a rotary force is, as shown in, e.g., FIGS. 21–23, transmitted between an inner race 2 and an outer race 3 through six pieces of balls 4, 4. The inner race 2 is fixed to an external side end (a left side end in FIG. 21) of one shaft 5 rotationally driven by the transmission. Further the outer race 3 is fixed to an internal side end (a right side end in FIG. 21) of another shaft 6 for fixing the drive wheel. Six streaks of inner engagement grooves 7, 7 each taking a circular arc shape in section are formed in an outer peripheral surface 2a of the inner race 2 in a direction right-angled to a circumferential direction at an equal interval in the circumferential direction. Six streaks of outer engagement grooves 8, 8 each taking the circular arc shape in section are likewise formed in an outer peripheral surface 3a of the outer race 3 in positions facing to the inner engagement grooves 7, 7 in the direction right-angled to the circumferential direction.

A cage 9 assuming a circular arc shape in section but an annular shape on the whole is sandwiched in between the outer peripheral surface 2a of the inner race 2 and the inner peripheral surface 3a of the outer race 3. Pockets 10, 10 are formed in positions aligned with the two groups of inner and outer engagement grooves 7, 8 as well as in six positions in the circumferential direction of the cage 9, and totally six pieces of balls 4, 4 are held one by one inwardly of each of the pockets 10, 10. These balls 4, 4 are capable of rolling along the two groups of inner and outer engagement grooves 7, 8 in a state of being held in the pockets 10, 10.

The pockets 10, 10 are, as illustrated in FIG. 23, each takes a rectangular shape elongated in the circumferential direction, and structured to, even when a spacing between the balls 4, 4 adjacent to each other in the circumferential direction might change with a variation in an axial crossing angle α which will hereinafter be explained, absorb this change. Namely, a positional relationship between bottom surfaces 7a, 7a of the inner engagement grooves 7, 7 and a positional relationship between bottom surfaces 8a, 8a of the outer engagement grooves 8, 8, become such as a relationship of the longitude lines on a globe as indicated by the one-dotted chain line in FIG. 24. If the central axis of the inner race 2 is concentric with the central axis of the outer race (the axial crossing angle α=180°), each of the balls 4, 4 exists in the vicinity of a position corresponding to the equator on the globe which is indicated by the two-dotted line in FIG. 24. Whereas if the central axis of the inner race 2 is not concentric with the central axis of the outer race (the axial crossing angle α<180°), the balls 4, 4 displace in reciprocation (displace alternately in the direction of the North Pole and in the direction of the South Pole on the globe) in the up-and-down direction in FIG. 24 with a rotation of the constant velocity joint 1. As a result, the spacing between the balls 4, 4 adjacent to each other in the circumferential direction changes, and hence the pockets 10, 10 each takes the rectangular shape elongated in the circumferential direction, thereby enabling the spacing therebetween to change. Note that the bottom surfaces 7a, 7a of the inner engagement grooves 7, 7 and the bottom surfaces 8a, 8a of the outer engagement grooves 8, 8, are not concentric with each other as obvious from the explanation which follows. Accordingly, the lines corresponding to the longitude lines exist in positions slightly deviating from each other for every corresponding engagement groove 7 or 8.

Further, as shown in FIG. 21, the balls 4, 4 are disposed within a bisection plane c which bisects the axial crossing angle α between the two shafts 5, 6, i.e., the angle α made by two lines a and b at a point-of-intersection O between a central line a of one shaft 5 and a central line b of the other shaft 6. Therefore, the bottom surfaces 7a, 7a of the inner engagement grooves 7, 7 are located on a spherical surface wherein a point d existing away by h from the point-of-intersection O on the central line a is centered, and the bottom surfaces 8a, 8a of the inner engagement grooves 8, 8 are located on a spherical surface wherein a point e existing away by h from the point-of-intersection o on the central line b is centered. The outer peripheral surface 2a of the inner race 2, the inner peripheral surface 3a of the outer race and two inner and outer peripheral surfaces of the cage 9, are, however, located on the spherical surface with the point-of-intersection O being centered, thereby enabling the outer peripheral surface 2a of the inner race 2 and the inner peripheral surface of the cage 9 to slide on each other, and also the outer peripheral surface 3a of the outer race 3 and the outer peripheral surface of the cage 9 to slide on each other.

In the case of the thus constructed constant velocity joint 1, when the inner race 2 is rotated by one shaft 5, this rotary motion is transmitted via the six balls 4, 4 to the outer race 3, whereby the other shaft 6 rotates. If a positional relationship (which implies the axial crossing angle α) between the two shafts 5, 6 changes, the balls 4, 4 roll along the two groups of inner and outer engagement grooves, thus allowing the displacement between one shaft 5 and the other shaft 6.

The basic structure and operation of the constant velocity joint are as described above. The basic structure and operation of the constant velocity joint which have been explained referring to FIG. 21 are applied to the present invention and the embodiments thereof which will be discussed later on.

On the other hand, it has been a technical pursuit over the recent years that the constant velocity joint described above is combined integrally with a wheel-support rolling bearing unit for rotatably supporting the wheel on a suspension. Namely, the operation of rotatably supporting the wheel of an automobile on the suspension involves the use of the wheel-support rolling bearing unit in which the outer race and the inner race are rotatably combined through rolling members. If the thus constructed wheel-support rolling bearing unit is combined integrally with the above-described constant velocity joint, the wheel-support rolling bearing unit and the constant velocity joint can be so constructed as to be downsized and to reduce weights thereof on the whole. What has hitherto been well known as the wheel-support rolling bearing unit, i.e., a so-called fourth-generation hub unit structured to integrally combine the wheel-support rolling bearing unit with the constant velocity joint, is disclosed in Japanese Patent Application Laid-Open Publication No. 7-317754.

FIG. 25 shows a prior art structure disclosed in the same Publication. An outer race 11, which does not rotate in a state of being supported on the suspension as well as in a state of being assembled to a vehicle, includes a first fitting flange 12, formed on an outer peripheral surface thereof, for supporting the wheel on the suspension, and plural trains of outer race tracks 13, 13 formed along an inner peripheral surface, respectively. A hub 16 constructed by combining first and second inner race members 14, 15 is disposed inwardly of the outer race 11. The first inner race member 14 of these first and second inner race members 14, 15 is formed in a cylindrical configuration and includes a second fitting flange 17, provided at a portion, closer to one side end (on a left side in FIG. 25), on the outer peripheral surface, for supporting the wheel, and a first inner race track 18 provided at a portion closer to the other side end (on a right side in FIG. 25), respectively. While on the other hand, the second inner race member 15 includes a cylindrical portion 19, provided at one side end (a left side end in FIG. 25), for externally fixedly fitting the first inner race member 14, an outer race 3A for a constant velocity joint 1a, which is provided at the other side end (a right side end in FIG. 25), and a second inner race track 20 formed in an outer peripheral surface of an intermediate portion. Then, a plurality of rolling members 21 and another plurality of rolling members 21 are provided between the outer race tracks 13, 13 and the first and second inner race tracks 18, 20, whereby the hub 16 is rotatably supported inwardly of the outer race 11.

Further, engagement grooves 22, 23 are formed in positions aligned with each other on the inner peripheral surface of the first inner race member 14 and on the outer peripheral surface of the second inner race member 15, and a stop ring 24 is provided in a state of bridging the two engagement grooves 22, 23, thus preventing the first inner race member 14 from coming off the second inner race member 15. Further, a portion between an outer peripheral edge of one side end surface (a left side end surface in FIG. 25) of the second inner race member 15 and an inner peripheral edge of a stepped portion 25 formed on the inner peripheral surface of the first inner race member 14, is welded 26, thereby fixedly joining the first and second inner race members 14, 15 to each other.

Moreover, covers 27a, 27b each taking substantially a cylindrical shape and composed of a metal such as a stainless steel etc and annular seal rings 28a, 28b each composed of an elastic material such as elastomer like a rubber, are provided between openings formed at both side ends of the outer race 11 and the outer peripheral surface of the intermediate portion of the hub 16. The covers 27a, 27b and the seal rings 28a, 28b cut off the portions provided with the plurality of rolling members 21, 21 from outside, thereby preventing grease existing in those portions from leaking outside and also preventing foreign matters such as rain water and dusts etc from permeating those portions. Moreover, a screen board 29 for closing the inside of the second inner race member 15 is provided inwardly of the intermediate portion of the second inner race member 15, thereby ensuring a rigidity of the second inner race member 15 and preventing the foreign matters from arriving at the constant velocity joint 1a, which have entered the interior of the second inner race member 15 from an opening at the front side end (a left side end in FIG. 25) of the second inner race member 15. Note that the constant velocity joint 1a is constructed in the same way as that of the constant velocity joint 1 previously illustrated in FIGS. 21–23.

When assembling the thus constructed wheel-support rolling bearing unit to the vehicle, the outer race 11 is supported through the first fitting flange 12 on the suspension, and the wheel defined as a drive wheel is fixed through the second fitting flange 17 to the first inner race member 14. Further, a front side end of an unillustrated drive shaft rotationally driven by an engine through a transmission, is spline-engaged with the inside of the inner race 2 constituting the constant velocity joint 1a. When the automobile travels, rotations of this inner race 2 are transmitted via the plurality of balls 4 to the hub 16 including the second inner race member 15, thereby rotationally driving the wheel.

For attaining further downsizing of the fourth-generation wheel-support rolling bearing unit described above, it is effective to reduce a diameter of a circumscribing circle of each of the plurality of balls 4, 4 constituting the constant velocity joint 1a. Then, the diameter of each of the balls 4, 4 is reduced for decreasing the diameter of the circumscribing circle, and besides it is required for securing a torque transmittable through the constant velocity joint 1a that the number of the balls 4, 4 be increased. Moreover, under such circumstances, even when increasing the number of the balls 4, 4, there might be a necessity for ensuring strength and durability of each of column members 30, 30 (see FIGS. 22, 23, 27 and 29 to 31) existing between the plurality of pockets 10, 10 provided in the cage 9 in order to secure a durability of the cage 9 for holding the respective balls 4, 4.

The reason why when the number of the balls 4, 4 is increased from 6 up to 8, there rises a rate of the balls occupying the cage in the circumferential direction even if a major diameter $D_a$ is reduced to some extent. As a result, a circumference-directional width of each of the column members 30, 30 (FIGS. 22 and 23) existing between the pockets 10, 10 adjacent to each other in the circumferential direction, is narrowed, and there is a deficiency in terms of a rigidity of the cage 9, which might lead to a possibility in which damages such as cracks etc occur at a peripheral edge of each of the pockets 10, 10 with a long-term use. Namely, if the constant velocity joint 1a is operated in a state of giving a joint angle (at which a positional relationship between the central axis of the inner race 2 and the central axis of the outer race 3A deviates from a rectilinearity, i.e., a supplementary angle of the axial crossing angle α shown in FIG. 21), the respective balls 4, 4 receive forces as indicated by arrowheads a, a in FIGS. 26 and 27 from the bottom surfaces 7a, 8a of the two inner and outer engagement grooves 7, 8. Then, the balls 4, 4 are pressed by a resultant force of the forces indicated by the arrowheads a, a against an intermediate portion of an inner surface of the rim portion 31 of the cage 9. As a result, a moment load, with a connecting portion to the column members 30, 30 being centered, is applied to the rim portion 31, and a stress is applied to this connecting portion. This stress becomes greater as a length of each of the pockets 10, 10 in the circumferential direction becomes larger, and as the length dimension of each of the column members 30, 30 in the circumferential direction becomes smaller, with the result that the connecting portion is easily damaged like cracks etc. Such being the case, it is required for ensuring the ample durability of the cage 9 that the length dimension of each of the pockets 10, 10 in the circumferential direction be reduced, and that the length dimension, in the circumferential direction, of each of the column members 30, 30 adjacent to each other in the circumferential direction be increased.

The process of increasing the length dimension of each of those column members 30, 30 is controlled in terms of preventing interference with the balls 4, 4. To be more specific, first, the length of each of the pockets 10, 10 in the circumferential direction needs, when rotating the constant velocity joint 1a in the state of giving the joint angle, to be large enough to enable each of the balls 4, 4 to displace in the circumferential direction of the cage 9. Second, the above length must be, after assembling together the inner race 2, the outer race 3A and the cage 9 in order to assemble the constant velocity joint 1a, large enough to incorporate the balls 4, 4 into the pockets 10, 10 of the cage 9.

European Patent 0 802 341 A1 discloses the constant velocity joint 1b as shown in FIGS. 28–31 by way of a structure for increasing the length dimension of each of the column members 30, 30 while setting the number of the balls 4, 4 to 6 or larger in consideration of the above point. The constant velocity joint 1b disclosed in the above Publication is structured to transmit the rotary force between the inner race 2 and the outer race 3 through eight pieces of balls 4, 4. Then, in the case of the structure disclosed in the same Publication, two types of pockets 10a, 10b each having a different length dimension in the circumferential direction, are disposed alternately at an equal interval in the circumferential direction. With this arrangement, as compared with the case of using the single type of pockets, it is feasible to increase a circumference-directional width of each of the column members 30, 30 existing between the pockets adjacent to each other in the circumferential direction. There is made, however, no contrivance about the width of each of the column members 30, 30 in terms of securing the durability of the cage 9a while ensuring life-spans of other components of the constant velocity joint 1b.

In other words, there is made no contrivance of optimally controlling a relationship between the major diameter of each of the balls 4, 4 constituting the constant velocity joint 1b and the width of each of the column members 30, 30, considering a relationship between the rolling fatigue life-span of each of the inner and outer engagement grooves 7, 8 and the strength of the cage 9a. The above Publication does not disclose such a point at all that the constant velocity joint 1b is designed in consideration of the above point.

In the case of the above-described structure disclosed in the European Patent 0 802 341 A1, each of the balls 4, 4 is held in each of the pockets 10a, 10b, and hence it is difficult to equilibrate at a high level the major diameter and the number of the balls 4, 4 and the length dimension of each of the column members 30, 30 when ensuring these factors. Therefore, the constant velocity joint capable of transmitting sufficiently a large torque and exhibiting an enough durability can not be necessarily actualized.

It can be considered to enlarge a section area of each of the column members 30, 30 by increasing a thickness of the cage 9 for securing the strength and the durability thereof even when the width of each of the column members 30, 30 is small.

There arises, however, a fresh problem which follows, if the major diameter of the cage is increased or if a minor diameter thereof is decreased in order to enlarge the sectional area.

First, the increase in the major diameter of the cage leads to a rise in a diameter of an inner peripheral surface 3a of the outer race 3 (3A). This rise in the diameter of the inner peripheral surface 3a leads to a decrease in depth of the outer engagement groove 8. Similarly, a decrease in the minor diameter of the cage leads to a reduction in a diameter of an outer peripheral surface 2a of the inner race 2. This decrease in the diameter of the outer peripheral surface 2a leads to a decrease in depth of the inner engagement groove 7.

When the depth of each of the two groups of outer and inner engagement grooves 8, 7 decreases, there is lessened the rigidity of the constant velocity joint 1 (11a) in a rotational direction, which is based on an engagement of each of the balls 4, 4 with each of the two groups of engagement grooves 8, 7. Further, when transmitting a large torque between the inner race 2 and the outer race 3 (3A), a rolling surface of each ball 4 becomes easier to run on an opening edge of each of the engagement grooves 8, 7. As a result, the durability of the constant velocity joint is ensured with the difficulty because of a shortened rolling fatigue life-span of the rolling surface of each ball 4, and so forth.

Accordingly, it must be controlled in terms of obtaining a required depth of the engagement groove that the major diameter of the cage 9 is increased or that the minor diameter thereof is reduced.

On the other hand, it is also required that a minimum thickness of the cage be controlled in terms of ensuring the durability of the constant velocity joint 1 (1a). Namely, if the cage 9 is composed of a material having a large strength such as, e.g., a high-function resin and a high-tension steel etc., the strength and the durability of the column member 30 itself can be ensured. In this case also, however, if the thickness thereof is too small, the following problem might arise.

That is, as obvious from the discussion given above, during an operation of the rzeppa type constant velocity joint 1 (1a) at which the present invention aims, the balls 4, 4 displace in the diametrical direction of the cage 9 as well as in the circumferential direction thereof. With such a displacement, when a maximum-major-diameter portion of the ball 4 impinges upon the opening edge of the pocket holding the ball inside, there might be a possibility wherein this opening edge is chipped off.

To begin with, if the major diameter of the cage 9 is too small, the maximum-major-diameter portion of the ball 4 existing upward in FIG. 21 impinges upon the peripheral edge of the opening on the side of the major diameter of the pocket 10. Whereas if the minor diameter of the cage 9 is too large, the maximum-major-diameter portion of the ball 4 existing downward in FIG. 21 impinges upon the peripheral edge of the opening on the side of the minor diameter of the pocket 10. Every opening peripheral edge of the pocket 10 takes a sharp configuration and might be therefore, if strongly pressed by the rolling surface of the ball 4, chipped into minute fragments. A sectional configuration of the opening peripheral edge on the side of the major diameter has an acute angle especially when the pocket 10 is formed by punch-out working, and hence, if the cage 9 is composed of a steel subjected to a hardening process, the above chips might be easily produced.

Then, if the chips enter between the balls 4, 4 and the engagement grooves 8, 9, the inner surfaces of the engagement grooves 8, 7 and the rolling surfaces of the balls 4, 4 are damaged, which in turn causes a decline of the durability of the constant velocity joint 1 (1a)

Accordingly, it must be controlled in terms of preventing the rolling surfaces of the balls 4, 4 from impinging upon the opening peripheral edges of the pockets 10 to reduce the major diameter of the cage 9 or to increase the minor diameter thereof.

As described above, it is required that the maximum and minim of the major and minor diameters of the cage be controlled in terms of securing the rigidity and the durability of the constant velocity joint 1 (1a), however, no contrivance on this point has been made in the prior art.

Further, the specification of British Patent No. 1,537,067 discloses a structure in which the balls 4, 4 are, as shown in FIG. 32, held by twos in each of three pockets 10c, 10c formed in positions at an equal interval in the circumferential direction of a cage 9b. According to this structure, a length dimension of each of column members 30, 30 existing between the pockets 10c, 10c adjacent to each other in the circumferential direction, is increased corresponding to a degree to which the interval between the balls 4, 4 held in the same pocket 10c, thereby ensuring a durability of the cage 9b.

In the case of the above-mentioned structure disclosed in the specification of British Patent 1,537,067, no consideration is made with respect to the strength of the cage.

Further, as explained above, it is necessary for attaining the downsizing and the reduction in weight of the wheel-support rolling bearing unit known as the so-called fourth-generation hub unit to reduce, as shown in FIG. 25, a major diameter of a housing unit 3A by decreasing the major diameter of each of the balls 4, 4 constituting the constant velocity joint 1a and thus decreasing the diameter of the circumscribing circle of the balls 4, 4. Then, there is a necessity for ensuring a load capacity of the constant velocity joint 1a by reducing the major diameter of each of the balls 4, 4 and increasing the number of the balls 4, 4 (from 6 to 7 or more).

If the major diameter of each of the balls 4, 4 is set too small, however, there might decrease a contact ellipse existing at impingement portions between the rolling surfaces of these balls 4, 4 and the inner surfaces of the inner engagement groove 7a and the outer engagement groove 8a, with the result that a surface pressure upon those impingement portions becomes excessively large. The rolling fatigue life-span of the inner surface of each of the engagement grooves 7a, 8a is thereby shortened. If the major diameter of each of the balls 4, 4 is simply increased for preventing the reduction in the rolling fatigue life-span of the inner surface of each of the engagement grooves 7a, 8a due to the above cause, the interval between the balls 4, 4 adjacent to each other in the circumferential direction is narrowed. Then, there is decreased the width of each of the column members existing between the pockets 10, 10 for holding the balls 4, 4 with respect to the cage 9. The reduction in the width of the column member is not also preferable because of leading to the decline of the durability of the cage 9.

If the major diameter of the housing unit 3A is increased, the major diameter of each of the balls 4, 4 is also increased, and besides the width of each column member can be ensured. It is, however, impossible to attain the downsizing and the reduction in the weight of the wheel-support rolling bearing unit called the fourth-generation hub unit, which is not preferable.

SUMMARY OF THE INVENTION

It is a first object of the present invention to provide a constant velocity joint that can be downsized and reduced in weight, and is capable of transmitting a sufficient torque.

It is a second object of the present invention to provide a rolling bearing unit for a wheel, which can be downsized and reduced in weight.

According to a first aspect of the present invention, a constant velocity joint comprises an inner race, inner engagement grooves each taking a circular arc in section and formed in eight locations at an equal interval in a circumferential direction on an outer peripheral surface of the inner race in a direction right-angled to the circumferential direction, an outer race provided along a periphery of the inner race, outer engagement grooves each taking a circular arc in section and formed in positions facing to the inner engagement grooves on an inner peripheral surface of the outer race in the direction right-angled to the circumferential direction, a cage sandwiched in between an outer peripheral surface of the inner race and an inner peripheral surface of the outer race and formed with eight pockets each elongated in a circumferential direction in positions aligned with the inner engagement groove and the outer engagement groove, and eight pieces of balls made capable of rolling along the inner engagement groove and the outer engagement groove in a state of being singly held inwardly in each of the pockets. Then, a crossing angle between a central axis of the inner race and a central axis of the outer race is bisected, and the balls are disposed within a bisection plane orthogonal to a plane including these two central axes.

Particularly in the constant velocity joint according to the first aspect of the present invention, if a ratio $t_c/D_a$ is set to $r_t$, there is satisfied a relationship such as:

$$(0.054/r_t) \cdot D_a \leq w \leq (0.16/r_t) \cdot D_a$$

where $D_a$ is the major diameter of each ball, w is the circumference-directional width of each of the column members existing between the pockets adjacent to each other in the circumferential direction with respect to the cage, and $t_c$ is the diameter-directional thickness of each of the column members of the cage.

According to the thus structured constant velocity joint in the first aspect of the present invention, it is feasible to sufficiently ensure both of the rolling fatigue life-span of each of the inner and outer engagement grooves and the strength of the cage, and the constant velocity joint is downsized, thus making a contribution to utilization of a so-called fourth generation hub unit in which the outer race of the constant velocity joint is integrated with the inner race of the rolling bearing unit for supporting the wheel.

Further, in the constant velocity joint according to a second aspect of the present invention, if a ratio $D_c/d_m$ of a diameter $D_c$ of the outer peripheral surface of the cage to a pitch circle diameter $d_m$ of each of the plurality of balls is set to $R_1$, and if a ratio $d_c/d_m$ of a diameter $d_c$ of the inner peripheral surface of the cage to a pitch circle diameter $d_m$ is set to $r_1$, there are relationships such as $1.06<R_1<1.11$, and $0.945<r_1<0.998$. Note that the pitch circle diameter $d_m$ is a 2-fold dimension of a distance between a center (a point $O_i$ or $O_e$ in FIGS. 6–8 and 21) of curvature of a bottom surface of the inner or outer engagement groove and a center of each ball when the constant velocity joint is in a neutral state (wherein a joint angle is 0).

Further, in the constant velocity joint according to the second aspect of the present invention, in addition to the preferable construction given above, a ratio $r_t$ of an average thickness $t_c$ of the cage which is expressed by ½ of a difference between a diameter $D_c$ of the outer peripheral surface of the cage and a diameter $d_c$ of the inner peripheral surface of the cage, to a major diameter $D_a$ of each ball, that is, $r=t_c/D_a$ has a relationship such as $0.16<r_t<0.30$.

According to the thus constructed constant velocity joint in the second aspect of the present invention, even in the case where for instance, the width of the column member provided between the pockets adjacent to each other is decreased by setting the number of the pockets for holding the balls to 8, a sectional area of each column member is secured, whereby a strength and a durability of these column members can be ensured. Simultaneously, it is feasible to prevent an opening peripheral edge of the pocket from being chipped by preventing the rolling surface of each ball from impinging upon the opening peripheral edge of the pocket.

To start with, there will be elucidated the reason why the ratio $D_c/d_m$ ($=R_1$) of the diameter $D_c$ of the outer peripheral surface of the cage to the pitch circle diameter $d_m$ of each of the plurality of balls is set such as $1.06<R_1<1.11$.

When designing the constant velocity joint, the pitch circle diameter $d_m$ is determined as a principal item of data corresponding to the number of the balls and the major diameter $D_a$ in order to obtain a load capacity corresponding to a magnitude of the torque to be transmitted. Accordingly, the above ratio $D_c/d_m$ ($=R_1$) is a value determined depending mainly upon a magnitude of the diameter $D_c$ of the outer peripheral surface of the cage.

As it becomes more approximate to $R_1 \leq 1.06$, the diameter Dc of the outer peripheral surface of the cage becomes smaller, in which case the sectional area of the cage is ensured with a difficulty, and besides the rolling surface of each ball might impinge upon an opening peripheral edge on the side of the major diameter of the pocket, with the result that this peripheral edge is easily chipped off. The impingement of the rolling surface upon the peripheral edge can be prevented by reducing an offset quantity (shown by h in FIG. 6) of points of centers of curvature of the bottom surfaces of the two inner and outer engagement grooves and thus decreasing a displacement quantity of each ball in the diametrical direction of the cage. The reduction in the offset quantity, however, is a cause for hindering a smooth operation of the constant velocity joint and can not be therefore adopted.

In contrast, as it becomes more approximate to $R_1 \geq 1.11$, the diameter $D_c$ of the outer peripheral surface of the cage becomes larger, in which case a depth of each outer engagement groove becomes too small. Then, as explained above, the rigidity of the constant velocity joint in a rotational direction lowers, and the rolling surface of the ball becomes easier to run on the side edge of the opening of each of the outer engagement grooves. It is consequently difficult to ensure the durability of the constant velocity joint such as a shortened rolling fatigue life-span of the rolling surface of each ball.

According to the second aspect of the present invention, $R_1$ being set such as $1.06<R_1<1.11$, the impingement of the rolling surface upon the peripheral edge of the pocket, which might lead to the chip-off, is prevented while securing the load capacity and the smooth operation of the constant velocity joint. In addition, it is possible to prevent the rolling surface of each ball from running on the side edge of the opening of the outer engagement groove.

Given next is an elucidation of the reason why the ratio $d_c/d_m$ ($=r_1$) of the diameter d of the inner peripheral surface of the cage to the pitch circle diameter $d_m$ is set to $0.945<r_1<0.998$.

As explained above, the pitch circle diameter $d_m$ is determined as the principal item of data of the constant velocity joint, and hence the above ratio $d_c/d_m$ ($=r_1$) is a value determined depending mainly upon a magnitude of the diameter $d_c$ of the inner peripheral surface of the cage.

To begin with, as it becomes more approximate to $0.945 \geq r_1$, the diameter $d_c$ of the inner peripheral surface of the cage becomes smaller. In this case, the depth of the inner engagement groove becomes too small, and, as described above, the rigidity of the constant velocity joint in the rotational direction lowers, and besides the rolling surface of each ball becomes easier to run on the side edge of the opening of the inner engagement groove. It is consequently difficult to ensure the durability of the constant velocity joint such as a shortened rolling fatigue life-span of the rolling surface of each ball.

In contrast, as it becomes more approximate to $r_1 \geq 0.998$, the diameter $d_c$ of the inner peripheral surface of the cage becomes larger. In this case, it is difficult to ensure the sectional area of the cage, and additionally the rolling surface of each ball impinges upon the peripheral edge of the opening on the side of the minor diameter of the pocket, with the result that this peripheral edge is easily chipped off. As explained above, it is unfeasible to reduce the offset quantity to prevent the impingement of the rolling surface of each ball on the peripheral edge of the opening.

According to the second aspect of the present invention, $r_1$ being set such as $0.945<r_1<0.998$, the impingement of the rolling surface upon the peripheral edge, which might lead to the chip-off, is prevented while securing the load capacity and the smooth operation of the constant velocity joint. In addition, it is possible to prevent the rolling surface of each ball from running on the side edge of the opening of the outer engagement groove.

Furthermore, if the ratio $r_t$ ($=t_c/D_a$) of the average thickness $t_c$ of the cage, which is expressed by ½ of the difference between the diameter $D_c$ of the outer peripheral surface of the cage and the diameter $d_c$ of the inner peripheral surface of the cage, to the major diameter $D_a$ of each ball is set such as $0.16<r_t<0.30$, then it is possible to give a good equilibrium between the strength of each column member and the durability of each of the two groups of inner and outer engagement grooves in the constant velocity joint as a whole.

Namely, as it becomes more approximate to $r_t \leq 0.16$, the average thickness $t_c$ of the cage becomes smaller as compared with the major diameter $D_a$ of each ball, in which case there diminishes the sectional area of the column member existing between the pockets adjacent to each other in the circumferential direction, and the strength and the durability of the cage including the column members are secured with the difficulty.

By contrast, as it becomes more approximate to $r_t \geq 0.30$, the average thickness $t_c$ of the cage becomes larger as compared with the major diameter $D_a$ of each ball. In this case, the depth of each of the inner and outer engagement grooves is hard to ensure, resulting in a difficulty of transmitting the large torque.

That is, as obvious from the explanation of FIGS. 6–18, the depths of the inner and outer engagement grooves are not uniform over their entire length, and each groove becomes deep at its one end in the lengthwise direction but shallow at the other end. In order that the large torque can be transmitted (the sufficient load capacity is ensured) by the thus structured rzeppa type constant velocity joint, and besides, the enough durability is secured, it is required that the depth of each of the inner and outer engagement grooves be amply secured at each of the other ends having the smallest depths. On the other hand, if the offset quantity h described above augments for ensuring the smooth operation of the constant velocity joint, a difference in the depth between the inner engagement groove and the outer engagement groove becomes large between one end and the other end. In such a state, when the average thickness of the cage is increased while reducing the depths of the inner and outer engagement grooves, it is difficult to secure this depth at each of the other ends where the depths are minimized.

In contrast, if the ratio $r_t$ is set such as $0.16 < r_t < 0.30$, it is feasible to establish a compatibility between ensuring the strength and the durability of the cage including the column members and securing the load capacity of the constant velocity joint which is based on ensuring the depths of the two engagement grooves.

According to the above-described second aspect of the present invention, the constant velocity joint that is excellent of its rigidity and durability can be obtained.

According to the third aspect of the present invention, at least a part of the plurality of pockets are capable of holding the plurality of balls within the single pocket, and a total number of balls is 7 or more (preferably 8 or more).

According to the third aspect of the present invention, the number of the pockets is preferably even-numbered, and the number of the balls held in each of the pockets is different.

According to the third aspect of the present invention, the number of the pockets is preferably 4, and the number of the balls is 10. The number of the balls held in each of the two pockets existing on the opposite side in a diametrical direction is 2, and the number of the balls held in each of the remaining two pockets is 3, respectively.

In the case of the thus constructed constant velocity joint according to the third aspect of the present invention, the total number of the balls is set to 7 or more, and therefore, even when capable of transmitting sufficiently a large torque or the dimension of the major diameter is decreased, the constant velocity joint can be downsized and reduced in weight. Besides, an interval between the balls held in the same pocket is narrowed, and a length dimension of a column member existing between the pockets adjacent to each other in the circumferential direction is increased, so that the length of the column member may be 4, 5 or 6 mm in average, for example, and the thickness in the diameter direction may be 3.2, 3.5, 3.8 or 4.1 mm, for example, thus ensuring a durability of the cage and obtaining an enough durability of the constant velocity joint as a whole.

In particular, according to the preferable characteristics of the constant velocity joint in the third aspect of the present invention, when the number of the balls held in each pocket is made different, the balls are incorporated finally into the pockets in which a larger number of balls should be held, thereby making it feasible to incorporate the balls and, besides, to restraining an increased in the length dimension of the pocket. As a result, the number of the balls to be incorporated into the constant velocity joint can be increased, and in addition the durability of the cage can be ensured.

According to a fourth aspect of the present invention, a rolling bearing unit for a wheel, comprises an outer race constructive member including respectively a first fitting flange, formed on an outer peripheral surface, for supporting the outer race constructive member on a suspension, and a plurality of outer race tracks formed on an inner peripheral surface, the outer race constructive member not rotating when used, an inner race constructive member including respectively a second fitting flange, formed on an end side portion of an outer peripheral surface, for supporting a wheel, and a plurality of inner race tracks formed on an intermediate portion, the inner race constructive member having the other side end portion formed as a housing unit serving as an outer race of a constant velocity joint, the inner race constructive member rotating when used, a plurality of rolling members so provided as to be capable of rolling between the outer race tracks and the inner race tracks, an inner race provided on an inner side of the housing unit and constituting the constant velocity joint, outer engagement grooves each taking a circular arc in section and formed in a direction right-angled to a circumferential direction in a plurality of positions in the circumferential direction on an inner peripheral surface of the housing, a plurality of inner engagement grooves each taking a circular arc in section and formed in the direction right-angled to the circumferential direction in positions facing to the outer engagement grooves on an outer peripheral surface of the inner race, a cage sandwiched in between an outer peripheral surface of the inner race and an inner peripheral surface of the housing unit and formed with a plurality of pockets each elongated in the circumferential direction in positions aligned with the inner engagement grooves and the outer engagement grooves, the cage constituting the constant velocity joint, and a plurality of balls so provided as to be capable of rolling along the inner engagement grooves and the outer engagement grooves between the outer engagement grooves and the inner engagement grooves in a state of being held inwardly of the pockets. A crossing angle between a central axis of the inner race and a central axis of the housing unit is bisected, and the balls constituting the constant velocity joint are disposed on a bisection plane orthogonal to a plane including these two central axes.

Especially in the rolling bearing unit for the wheel according to the present invention, the number of the outer and inner engagement grooves and the number of balls are each set to 7 or more. Further, a radius of curvature of each of sectional configurations of the two groups of outer and inner engagement grooves is made small at each of groove bottom areas of the two groups of outer and inner engagement grooves and made larger at both of side end portions proximal to respective opening edges. Moreover, if a ratio $d_1/d_2$ of $d_1$ to $d_2$ is set to R, there is a relationship such as:

$$0.49 \leq R \leq 0.63$$

where $d_1$ is the pitch circle diameter of each of the balls constituting the constant velocity joint, and $d_2$ is the pitch circle diameter of each of the rolling members constituting the inner rolling member train of the plurality of rolling member trains.

In the case of the rolling bearing unit for the wheel according to the fourth aspect of the present invention, a contrivance is given to each of the sectional configurations of the two groups of inner and outer engagement grooves, and there is controlled the ratio $R (=d_1/d_2)$ of the pitch circle diameter $d_1$ of each of the balls constituting the constant velocity joint to the pitch circle diameter $d_2$ of each of the rolling members constituting the inner rolling member train of the plurality of rolling member trains of which the rolling bearing unit is constructed. The wheel-support rolling bearing unit can be thereby downsized and reduced in its weight while ensuring the durability of this wheel-support rolling bearing unit.

Namely, the radius of curvature of each of the sectional configurations of the two groups of outer and inner engagement grooves is made smaller at each of the groove bottom areas of these two groups of engagement grooves and larger at both of the side ends proximal to the respective opening edges. It is therefore feasible to increase a contact angle between the inner surface of each of the two groups of engagement grooves and the rolling surface of each ball. Hence, in combination with the contrivance that the number of the balls is set to over 7 larger than 6 set according to the prior art, the load capacity of the constant velocity joint augments, and the durability of this constant velocity joint can be thereby ensured. Further, the balls run on the shoulder portions of the two groups of outer and inner engagement grooves with the difficulty, thereby preventing an excessive surface pressure based on an edge load from acting on the rolling surface of each ball. Consequently, an exfoliation life-span of the rolling surface of the ball can be ensured.

Further, when the above ratio R is controlled within a range such as $0.49 \leq R \leq 0.63$, in a case where the number of the balls constituting the constant velocity joint is set to 7 or more, the major diameter of each of the balls is secured, and there is enlarged a contact ellipse existing at an impingement portion between the rolling surface of each of the balls and an inner surface of each of the two groups of outer and inner engagement grooves, thereby restraining a rise in a contact surface pressure of the above impingement portion. It is therefore possible to ensure the rolling fatigue life-span of the inner surface of each of the two groups outer and inner engagement grooves. Simultaneously, the durability of the cage can be secured by ensuring the width of each of the column members existing between the pockets for holding the balls with respect to the cage. Besides, there can be made such a design that a part of the outer engagement grooves are disposed on the inner side in the diametrical direction of the inner rolling member train, whereby the wheel-support rolling bearing unit known as the fourth-generation hub unit can be downsized and reduced in its weight.

Note that as the ratio R becomes less than 0.49, the pitch circle diameter $d_1$ of the ball decreases. Then, the interval between the balls adjacent to each other in the circumferential direction is narrowed, and the width of the column member diminishes, with the result that the durability of the cage can not be ensured. Further, the interval between the balls adjacent to each other in the circumferential direction is increased in order to ensure the durability of this cage, and hence, if the major diameter of each ball is decreased, the contact surface pressure rises, it is difficult to secure the rolling fatigue life-span of the inner surface of each of the two groups of outer and inner engagement grooves.

By contrast, as the ratio R exceeds 0.63, the pitch circle diameter $d_1$ of the ball increases. Then, it is difficult to make such a design that a part of the outer engagement grooves are disposed on the inside in the diametrical direction of the inner rolling member train, and the wheel-support rolling bearing unit known as the fourth-generation hub unit is downsized and reduced in its weight with the difficulty.

Other features and advantages of the present invention will become readily apparent from the following description taken in conjunction with the accompanying drawings.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principle of the invention, in which.

DESCRIPTION OF THE PREFERRED EMBODIMENTS

Figure 21:
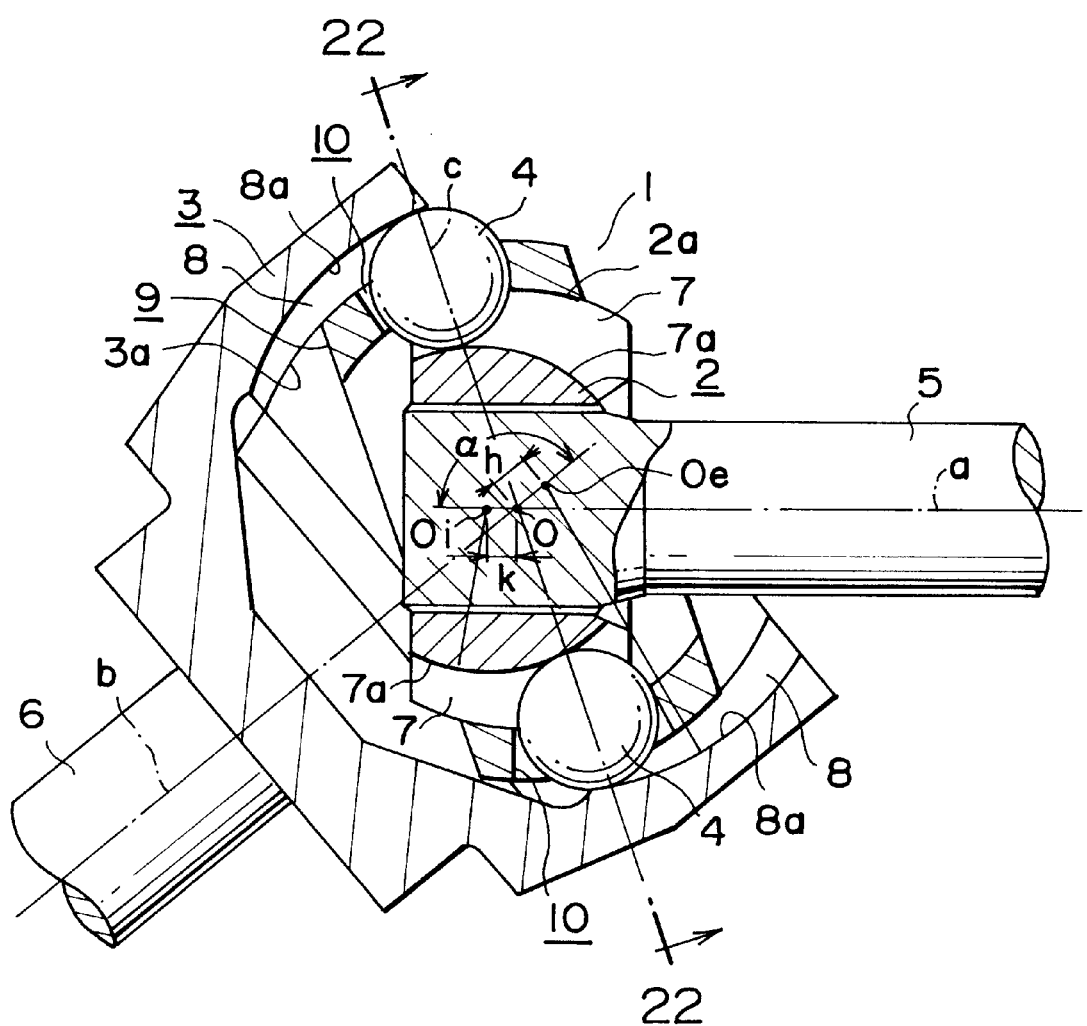
FIG. 21 is a sectional view showing a first example of a prior art constant velocity joint in a state where a joint angle is given.
Figure 22:
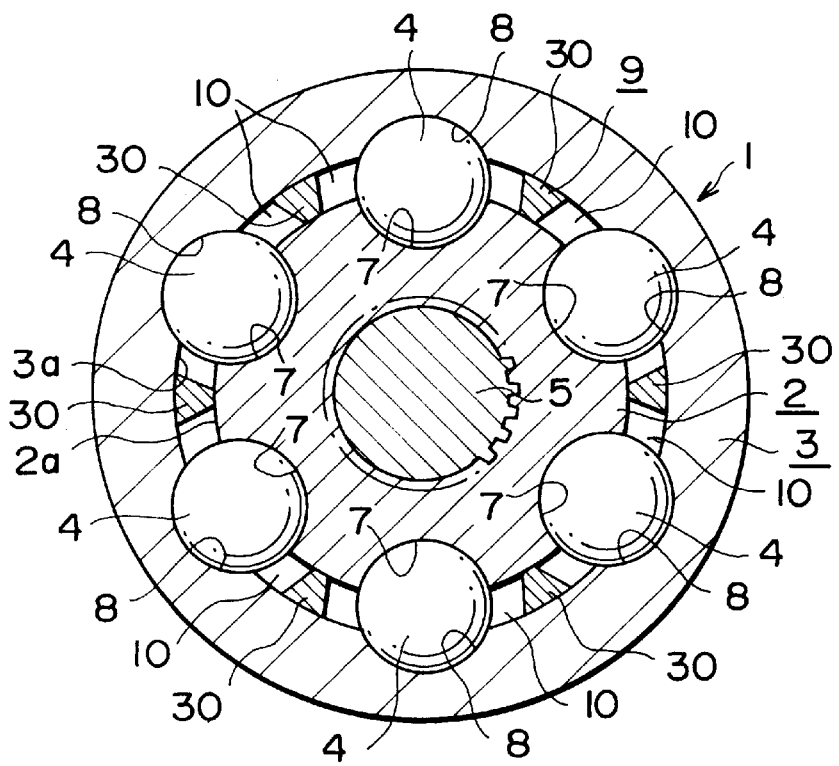
FIG. 22 is similarly a sectional view corresponding to the section taken along the line 22—22 in FIG. 21 in a state where the joint angle is not given.
Figure 23:
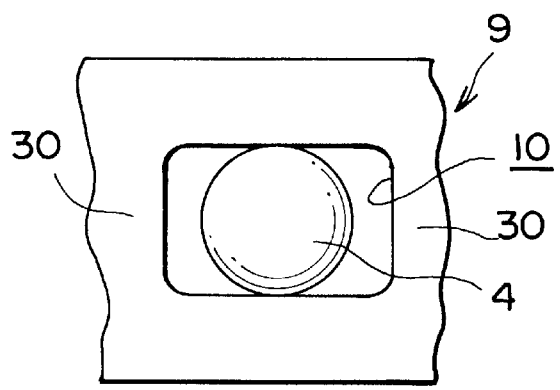
FIG. 23 is a view similarly showing a part of the cage as viewed from an outer peripheral side.

The basic structure and operation of the constant velocity joint, which have been explained referring to FIG. 21 can be applied to all of embodiments and modified examples of a constant velocity joint according to the present invention and of a wheel-support rolling bearing unit according to the present invention, of which repetitive explanations are therefore omitted herein.

First Embodiment

Figure 5:
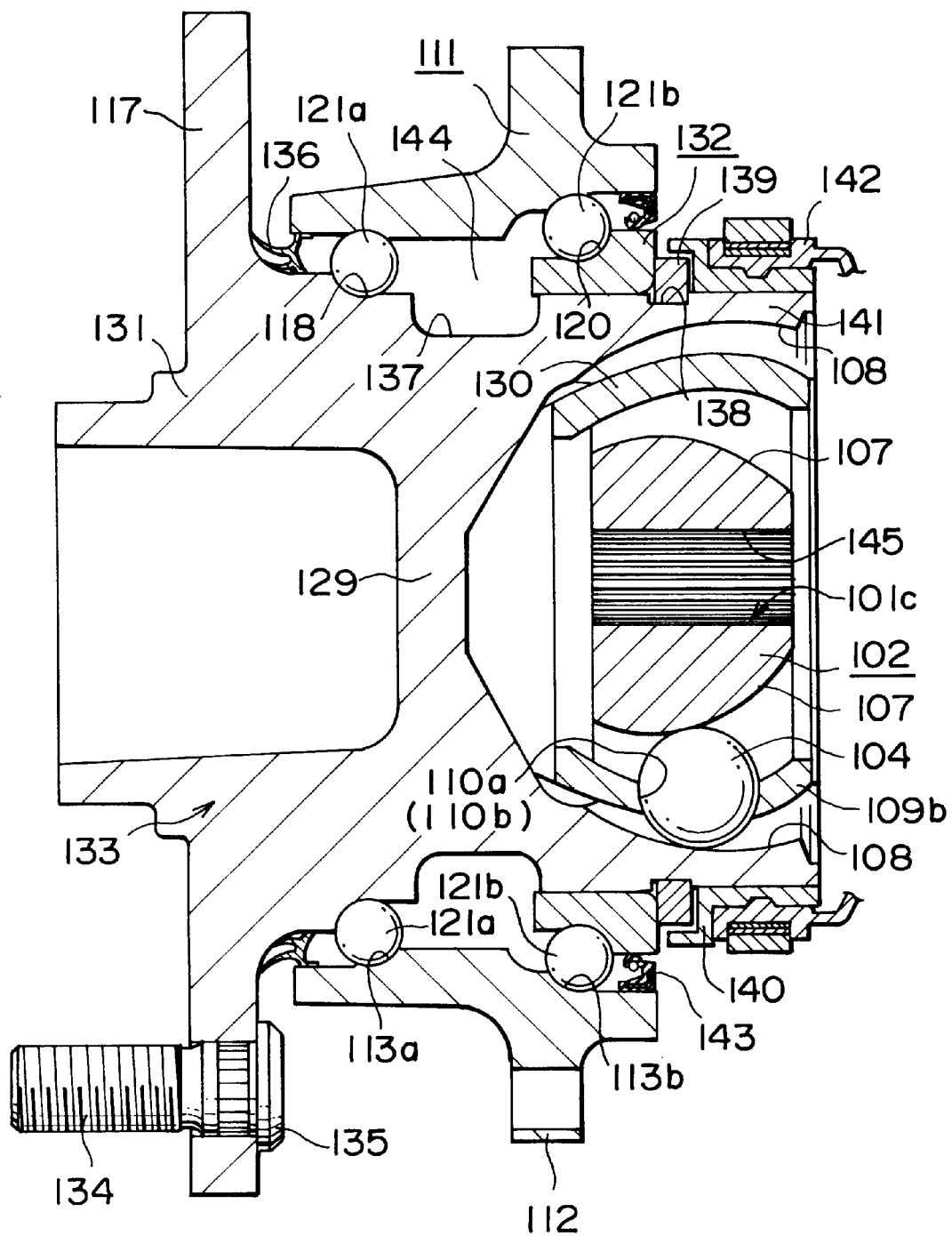
FIG. 5 is a sectional view showing one example of the wheel-support rolling bearing unit incorporating the constant velocity joint in the first embodiment of the present invention.

FIG. 5 shows a first embodiment in which the present invention is applied to the constant velocity joint constituting the fourth-generation hub unit according to the first aspect of the invention. An outer race 111, which does not rotate but is held stationary in a state of being supported on the suspension, includes a first fitting flange 112, formed on its outer peripheral surface, for supporting this outer race 111 on the suspension, and plural trains of outer race tracks 113, 113 formed along an inner peripheral surface, respectively. A hub 133 composed of a hub body 131 and an inner race 132 is disposed concentrically with the outer race 111 on the side of a minor diameter of the outer race 111. First and second inner race tracks 118, 120 are respectively formed in positions on the outer peripheral surface of this hub 133, which face to the outer race tracks 113, 113. Of these two inner race tracks 118, 120, the first inner race track 118 is formed directly on an outer peripheral surface of an intermediate portion of the hub body 113. Further, the inner race 132 is externally fitted to a portion, closer to an internal side end (closer to a right side end in FIG. 5) than the portion formed with the first inner race track 118, of the intermediate portion of the hub body 131. The second inner race track 120 is formed on an outer peripheral surface of this inner race 132. Then, a plurality of rolling members 121 and another plurality of rolling members 121 are so provided as to be capable of rolling respectively between the outer race tracks 113a, 113b and the first and second inner race tracks 118, 120, whereby the hub 133 is rotatably supported on the inner side of the outer race 111.

In the case of the illustrated example, as described above, the first inner race track 118 is formed directly on the outer peripheral surface of the hub body 131, whereby a diameter of the first inner race track 118 is set smaller than a diameter of the second inner race track 120 formed on the outer peripheral surface of the inner race 132. Further, with this contrivance of thus setting the diameter of the first inner race track 118 smaller than the diameter of the second inner race track 120, a diameter of the outer race track 113a on the outer side (implying an outer side in a widthwise-direction in a state of being assembled to the automobile, i.e., a left side in FIG. 5) which faces to the first inner race track 118, is set smaller than a diameter of the outer race track 113b on the inner side (implying a central side in the widthwise in the state of being assembled to the automobile, i.e., a right side in FIG. 5). Further, a major diameter of an outer half portion, formed with the outer race track 113a on the outer side, of the outer race 111, is set smaller than a major diameter of an inner half portion, formed with the outer race track 113b on the inner side, of the outer race 311. Moreover, in the illustrated example, with the setting of thus decreasing the diameters of the first inner race track 118 and of the outer race track 113a on the outer side, the number of the rolling members 121a, 121b provided between the first inner race track 118 and the outer race track 113a on the outer side is set smaller than the number of the rolling members 121a, 121b provided between the second inner race track 120 and the outer race track 113 on the inner side.

Moreover, a second fitting flange 117 for supporting and fixing the wheel to the hub body 131 is provided integrally with this hub body 131 on an outer peripheral surface of an external side end of the hub body 131. Proximal ends of a plurality of studs 134 for joining the wheel are fixed to the second fitting flange 117. In the case of the illustrated, a pitch circle diameter of each of the plurality of studs 134 is reduced to such a degree as to similarly set the major diameter of the outer half portion of the outer race 111 than the major diameter of the inner half portion as described above (to such a degree that a head 135 of each stud 134 does not interfere with the outer peripheral surface of the external side end of the outer race 111). Note that a diameter of a portion, existing more inwards in the axial direction than a portion formed with the first inner race track 118, of the outer peripheral surface of the hub body 131, is set smaller than a diameter of an inscribing circle of each of the rolling members 121, 121 corresponding to the first inner race track 138. The reason why so is that when assembling the wheel-support rolling bearing unit, the plurality of rolling members 121a are assembled on the side of the minor diameter of the outer race track 113a formed on the inner peripheral surface of the external side end of the outer race 111, and a seal ring 136 is fixedly fitted on an inner peripheral surface of the external side end of the outer race 111, in which state the hub body 131 is made insertable into the inside-diametrical portion of the outer race 111. Further, a wall-sunk portion 137 taking a recessed groove-like shape is formed along the entire periphery at a portion, between the first inner race track 118 and the portion fitted on the inner race 132, on the outer peripheral surface of the intermediate portion of the hub body 131, thereby reducing a weight of the hub body 131.

Moreover, a stop ring 139 engages with an engagement recessed groove 138 formed along the entire periphery of a portion, closer an internal side end of the outer peripheral surface, of the hub body 131 in order to keep to a proper value a pressure given to each of the plurality of rolling members 121a and the plurality of rolling members 121b so provided as to be capable of rolling between the outer race tracks 113a, 113b and the first and second inner race tracks 118, 120 by preventing the inner race 132 fitted on the hub body 131 from displacing toward the internal side end in the axial direction. This stop ring 139 is constructed of a pair of stop ring elements each assuming a semicircular shape. The thus constructed stop ring 139 makes its own inner peripheral edge engaged with the engagement recessed groove 138 while pressing the inner race 132 against the hub body 131 outwards in the axial direction in order to give the proper pressure to each of the rolling members 121a, 121b. The stop rings 139 having proper thickness dimensions are selectively used for keeping each of the rolling members 121a, 121b given the proper pressure even in a state where the force pressing the inner race 132 outwards in the axial direction is canceled. More specifically, there are prepared plural types of stop rings 139 slightly different from each other in terms of their thickness dimensions, and the stop ring 139 having the proper thickness dimension in relation to a dimension of each of the constructive members of the rolling bearing unit such as a groove width of the engagement recessed groove 138, is chosen and engaged with the engagement recessed groove 138. Accordingly, when this selected stop ring 139 engages with the engagement recessed groove 138, even if the pressing force is canceled, the inner race 132 is prevented from displacing toward the internal side end in the axial direction, whereby each of the rolling members 121a, 121b can remain to be given the proper pressure.

Further, a part of a spacer 140 is disposed along the periphery of the stop ring 139 in order to prevent the stop ring 139 from being unintentionally disengaged from the engagement recessed groove 138 due to outward displacements, in the diametrical direction, of the pair of stop ring elements constituting the stop ring 139. This spacer 140 is a member for supporting a boot 142 for preventing foreign matters such as rain water and dusts etc from permeating into a constant velocity joint 101c, at which the present invention aims, constructed of an outer race 141 for the constant velocity joint which is provided at the internal side end of the hub body 131 in such a way that the external side end of the boot 142 is fitted on the spacer 140. Further, a seal ring 136 is provided between the inner peripheral surface of the external side end of the outer race 111 and the outer peripheral surface of the intermediate portion of the hub body 131. A combination seal ring 143 is provided between the inner peripheral surface of the internal side end of the outer race 111 and the outer peripheral surface of the internal side end of the inner race 132. Openings at both ends of a space 144 in which the plurality of rolling members 121a, 121b are disposed, are sealed by these seal rings.

Further, an outer race 141 serving as an outer race of constant velocity joint 101c is formed at a portion, on which the inner race 132 and the external side end of the boot 142 are fitted, at the internal side end of the hub body 131. An inner peripheral surface of this outer race 141 is formed with eight streaks of outer engagement grooves 108, 108. The engagement grooves 108 each taking a circular arc configuration in section, are formed in a direction right-angled (in the right-and-left direction in FIG. 5) to the circumferential direction. Moreover, an inner race 102 for constituting the rzeppa type constant velocity joint 101c in combination with the outer race 141, is disposed inwardly of the outer race 141. Then, an outer peripheral surface of the inner race 102 is formed with eight streaks of inner engagement grooves 107, 107 in the direction right-angled to the circumferential direction. Then, totally eight pieces of balls 104 are so provided piece by piece for each of the engagement grooves 107, 108 as to be capable of rolling between these inner engagement grooves 107, 107 and the outer engagement grooves 108, 108 in a state of being held in pockets 110a, 110b of cage 109b. Furthermore, a spline hole 145 is formed extending in the axial direction at the central portion of the inner race 102. An edge portion of an unillustrated drive shaft is spline-engaged with the spline hole 145 in a state of being assembled to the automobile, whereby the hub body 131 can be rotationally driven through the eight pieces of balls as well as through the inner race 102.

On the other hand, a screen board 129 for closing a central spatial portion of the hub body is provided at the center of a central portion of the hub body 131, thereby ensuring a rigidity of the outer race 141 and preventing foreign matters from permeating into the constant velocity joint from outside.

In the constant velocity joint constituting the fourth-generation hub unit having the above-described configuration, a relationship between the major diameter $D_a$ (see FIG. 1) of each of the eight balls 104, 104, a width w of each of the column members 130 constituting the cage 109b, and a ratio $r_t$ of the thickness $t_c$ (see FIG. 4) of each column member 130 to the major diameter $D_a$ of each of the balls 104, 104, is controlled within a range satisfying: $(0.054/r_t) \cdot D_a \leq w \leq (0.16/r_t) \cdot Da$.

Given first is an explanation of a relationship between a load allowable to an impingement portion between the rolling surfaces of the balls 104 constituting the constant velocity joint and the two inner/outer engagement grooves 107, 108, and the major diameter $D_a$ of the ball 104.

A radius of curvature of a sectional configuration of each of the two engagement grooves 107, 108 is normally set to a value in the vicinity of 51% ($0.51D_a$) of the major diameter $D_a$ of the ball 104. If this value is too small (a value approximate to $0.5D_a$), a contact ellipse existing in the impingement portion described above is easy to run onto the shoulder portion of the engagement groove (the inner engagement groove 107 or the outer engagement groove 108). Then, when running thereon, an edge load is exerted upon the rolling surface of the ball 104, and this rolling surface might be exfoliated at an early stage. Whereas if the above value is too large (a value well over $0.51D_a$), an area of the contact ellipse existing in the impingement portion described above is diminished, and it follows that a surface pressure applied onto the inner surface of the engagement groove and the rolling surface of the ball 104 at the impingement portion therebetween, becomes excessively high.

On the other hand, the constant velocity joint is required to satisfy the following conditions (1) through (3).

(1) A maximum allowable surface pressure at the impingement portion is set to 4200 MPa The reason for this lies in smoothing the rolling of the ball 104 when the constant velocity joint is operated in a state of giving a joint angle. Namely, the surface of each of the two engagement grooves 107, 108 is hardened to such an extent that a surface hardness thereof is on the order of $H_RC60$ to $H_RC64$ by hardening a carbon steel. If a surface pressure (a contact stress) on the order of 4200 $MP_a$ is applied onto the inner surface of each of the two engagement grooves 107, 108 having the above surface hardness, a sum of permanent deformation quantities of the ball 104 and the inner engagement groove 107 or the outer engagement groove 108, is approximately a 0.0001-fold value of the major diameter $D_a$ of the ball 104. If the sum of the permanent deformation quantities is over this (0.0001-fold) value, the ball 104 does not smoothly roll, resulting in a large torque loss in the constant velocity joint.

(2) A contact angle $\theta$ of the ball 104 to each of the two engagement grooves 107, 108 is set to approximately 40 degrees during the operation of the constant velocity joint.

If a value of this contact angle is too large (well over 40 degrees), the contact ellipse is easy to run onto the shoulder portion of the inner engagement groove 107 or the outer engagement groove 108, and the edge load occurs on the rolling surface of the ball 104 as in the case of reducing the radius of curvature in section of each of the engagement grooves 107, 108, with the result that the rolling surface might be exfoliated at the early stage. Whereas if the value of the contact angle is too small (well under 40 degrees), a value obtained by multiplying the load applied to the ball 104 by sin o becomes a load component in a torque transmitting direction, and therefore the torque transmitted via the ball 104 decreases at such a rate that the load applied to the ball 104 increases, which might be conceived as a design exhibiting a poor efficiency.

(3) A ratio of the major diameter $D_a$ of the ball 104 to the diameter of the pitch circle of each of the plurality of balls 104 is set to approximately ¼.

When the number of the balls incorporated into the constant velocity joint is set to 8, the ratio of the diameter $D_a$ of each ball to the diameter of the pitch circle similarly becomes approximately ¼.

If this ratio is too large (well over ¼), the major diameter $D_a$ of each ball increases, and a circumference-directional length of the pocket 110 of the cage 109 for holding those balls, becomes large corresponding to that diametrical increase. Consequently, the width of the column members existing between the pockets adjacent to each other in the circumferential direction is narrowed, resulting in a deficiency in terms of the strength of each column member.

Whereas if the above ratio is too small (well under ¼), the major diameter $D_a$ of each ball decreases, it follows that that torque capacity of the constant velocity joint diminishes.

Note that the condition (3) among the conditions (1) to (3) given above is the value related to the width of the column member, however, even when the ratio (¼) itself prescribed by the condition (3) fluctuates, there must be a small influence upon the maximum surface pressure of the contact ellipse existing in the above impingement portion. Hence, the following calculation is carried out taking no account of a deviation from the ratio ¼.

A relationship between the maximum surface pressure of the contact ellipse and the ball load is expressed based on the Hertz formula as follows:

$$P_{max} = \frac{852}{\mu \cdot \nu} \sqrt[3]{(\Sigma \rho)^2 \cdot Q} \text{ (Mpa)} \quad (1)$$

Throughout the formula (1) and the formulae (2)–(7) which will hereinafter be given, Q is the ball load (N), $\Sigma \rho$ is the total sum of the main curvatures, $D_a$ is the major diameter (mm) of the ball, f is the ratio of the radius of curvature of the sectional configuration of each of the two groups of inner and outer engagement grooves to the major diameter $D_a$ of the ball and is set to 0.51, $\gamma$ is the value given by $D_a \cdot \cos\theta/d_m$ and is set to 0.1915 in this case, and $d_m$ is the diameter of the pitch circle of the ball 104, $\theta$ is the contact angle of each ball to the internal surface of each of the two groups of inner and outer engagement grooves and is set to 40 degrees as described above.

Further, there is made a calculation with cos τ serving as a parameter about the inner race having its radius which is smaller than the outer race, and therefore having an increased stress based on the contact with each ball 104 in accordance with the following formula (2):

$$\cos\tau = \frac{\frac{1}{f} + \frac{2\gamma}{1-\gamma}}{4 - \frac{1}{f} + \frac{2\gamma}{1-\gamma}} = 0.96878 \quad (2)$$

where $\mu$ is 5.0, $\nu$ is 0.36, and $\Sigma\rho$ is $(1/D_a) \cdot (2.5129)$.

When the above value given by $P_{max}$=4200 Mpa is substituted together with values of $\mu$, $\nu$ and $\Sigma\rho$ into the formula (1) given above, the following formula (3) is obtained.

$$Q = \left(\frac{4200 \times \mu \cdot \nu}{852}\right)^3 \frac{D_a^2}{(2.5129)^2} = 110.6 \cdot D_a^2 \quad (3)$$

Next, it is required that the ratio $r_t(=t_c/D_a)$ of the plate thickness $t_c$ of the cage to the diameter $D_a$ of the ball 104 should satisfy the following formula (4):

$$t_c/D_a = 0.16 \text{ to } 0.30 = r_t \quad (4)$$

If the ratio $t_c/D_a$ becomes smaller than the range in the formula (4), the plate thickness $t_c$ of the cage becomes too small. In this case, the width of the column member must be extremely increased in terms of a necessity for compensating a deficiency in the strength of the column member. As a result, the diameter $D_a$ of the ball 104 diminishes, and the torque capacity of the constant velocity joint decreases.

Whereas if the ratio $t_c/D_a$ becomes larger than the range in the formula (4), the plate thickness $t_c$ of the cage becomes too large. In this case, it is impossible to ensure a groove depth of one or both of the inner engagement groove existing on the side of the minor diameter of the cage and the outer engagement groove similarly existing on the side of the major diameter, and the rolling surface of each ball is easy to run on the shoulder portion of the engagement groove. Then, when running thereon, the edge load occurs on the rolling surface, with the result that this rolling surface might be exfoliated at the early stage.

Given next is an explanation of a load P applied onto annular portions, existing at the rim portions of the cage, i.e., at the two axial side ends thereof, at which the two axial side ends of the column member are connected in the case of operating the constant velocity joint in the state giving the joint angle (180 degrees–axial crossing angle).

Figure 1:
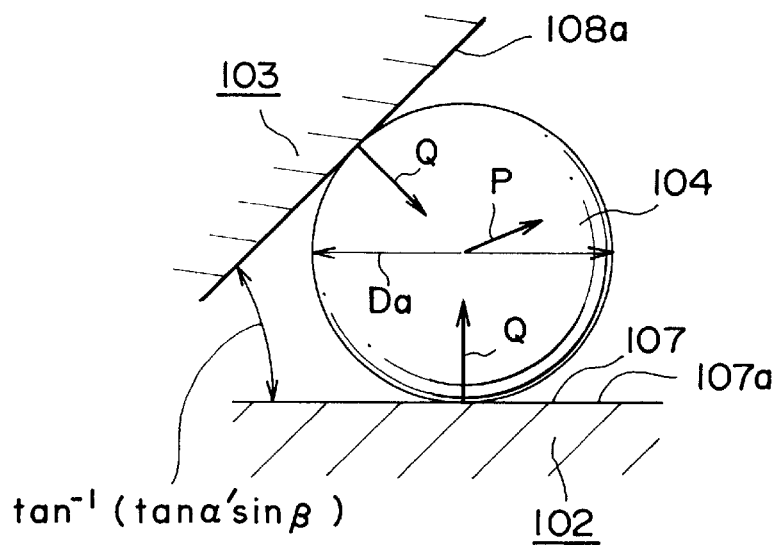
FIG. 1 is an explanatory partial sectional view showing how a force is applied to a rim portion from the ball during an operation of a first embodiment of the present invention.
Figure 2:
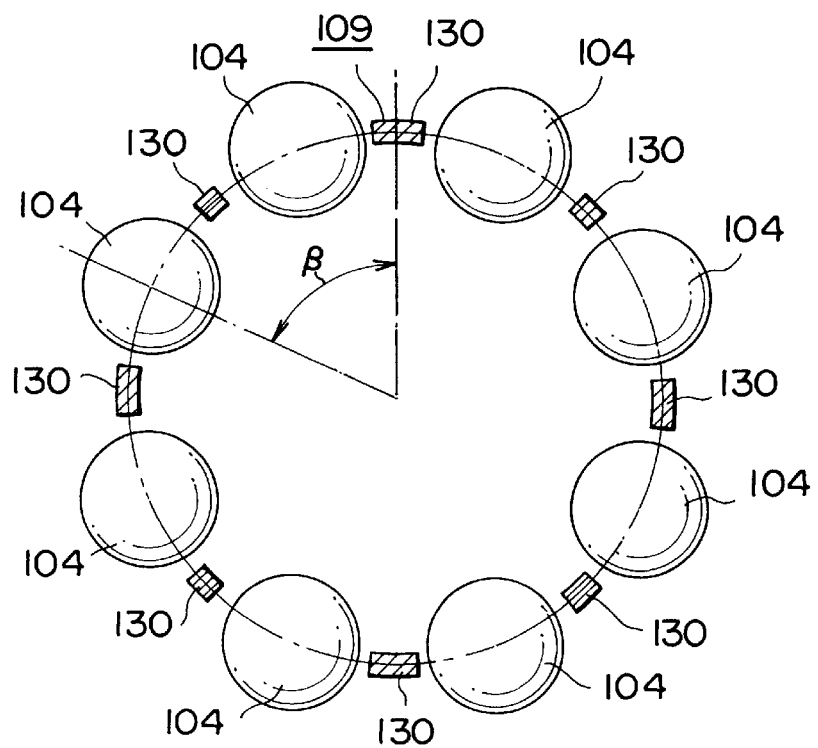
FIG. 2 is an explanatory view showing a column member to which a large stress is similarly applied, and showing the cage and the balls as viewed in an axial direction of the cage.

A joint angle $\alpha'$ is set to 45 degrees or larger as a prerequisite. The center of a bottom surface 107a of the inner engagement groove 107 and the center of a bottom surface 108a of the outer engagement groove 108, are offset each other (see FIG. 21), and, with this offset, the load acting on the cage is minute enough to be negligible. Then, as shown in FIG. 1, only the load acting on the rim portion at the joint angle $\alpha'$ is taken into consideration. As in the column members shown at the two right and left side ends in FIG. 1, when the column member of the cage 109 assumes a phase of 90 degrees to the plane including the center of the drive shaft and the center of the driven shaft, the maximum load is exerted on the continuous portion between the above column member and the rim portion. When the eight pieces of balls are incorporated into the constant velocity joint, phases of the centers of the two balls 104, 104 adjacent to the column member (to which the maximum load is applied) from the plane including the center of the drive shaft and the center of the driven shaft, are 67.5 degrees (β) and 112.5 degrees, respectively. Then, the same load obtained by the following formula (5) acts on the above continuous portion respectively from the two balls 104, 104 adjacent thereto.

$$P = 2Q\sin\left\{\frac{\tan^{-1}(\tan\alpha' \cdot \sin\beta)}{2}\right\} \quad (5)$$
$$= 2Q\sin\left\{\frac{\tan^{-1}(\tan 45° \cdot \sin 67.5°)}{2}\right\}$$
$$= 0.729Q$$

Figure 3:
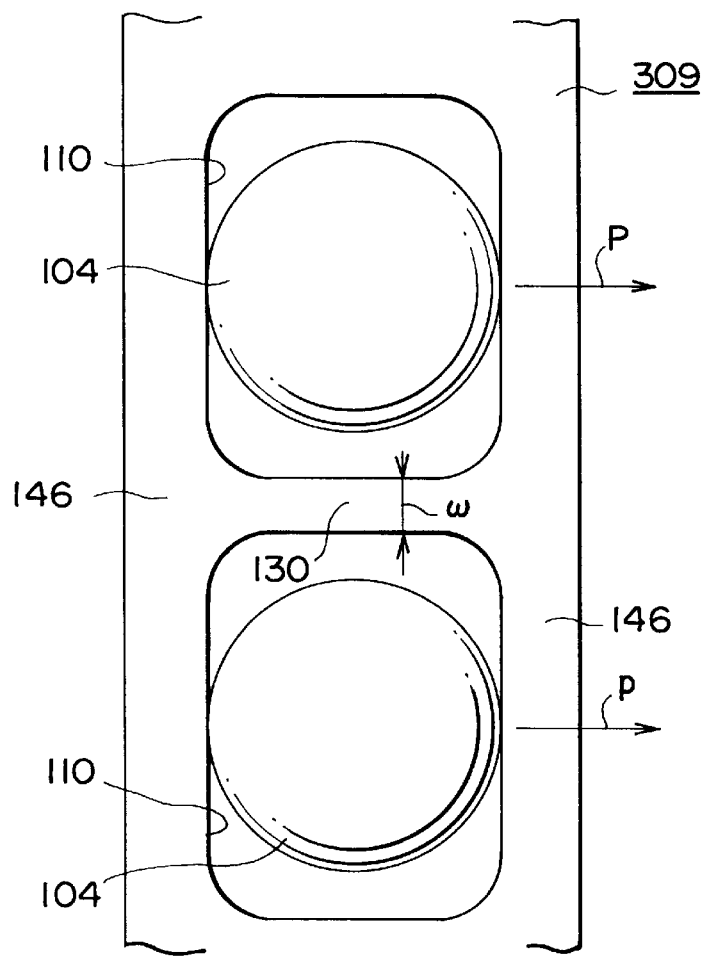
FIG. 3 is an explanatory view showing how the force is applied to the rim portion from the ball during the operation, as viewed from above in FIG. 1.

Next, the load applied to the column member of the cage will be explained with reference to FIGS. 3–4. The load applied to a rim portion 146 of the cage from each ball 104 is received by the column members 130, 130 of which respective side ends are connected to this rim portion 146. An allocation of the load acting on each of the column members 130, 130 is influenced by rigidities of the rim portion 146 and of the column members 130, 130, and therefore, strictly speaking, requires a calculation such as FEM etc. Normally, however, taking account of the fact that the major diameter $D_a$ of each ball 104 is 10 mm or larger and that the pitch between the column members 130, 130 is sufficiently large, if it is assumed not that the load P is borne by all the column members but that a half of the load P (P/2) applied to the rim portion 146 from each ball 104 is equally borne by only the two column members 130, 130 adjacent to the ball 104 concerned, the load can be approximated in such a direction that a safety factor is enhanced.

If the material of the cage is a steel subjected to cement hardening or induction hardening, it is conceived difficult in terms of utility to produce the steel so that a tensile strength $\sigma_B$ is always kept at over 1470 Mpa. It is therefore preferable to make a design with such a criterion for a limit stress that a value of $\sigma = P/(w \cdot t_c)$ is 1470 Mpa. As described above, the load applied to the respective column members 130, 130 is approximated comparatively largely in the direction where the safety factor is enhanced, and hence this value can be estimated somewhat largely.

Figure 4:
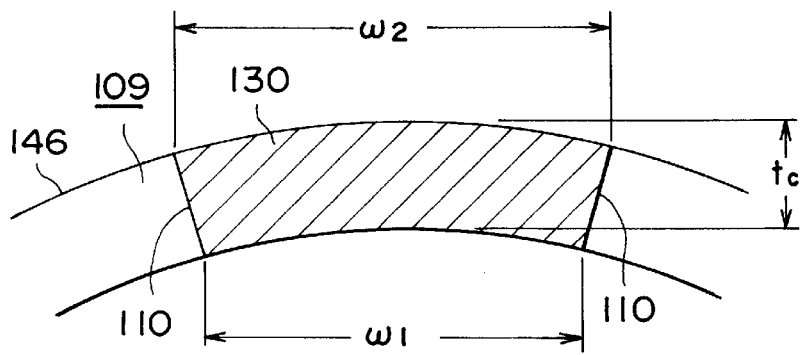
FIG. 4 is a sectional view showing the column member of the cage in the first embodiment of the present invention.

A fatigue strength $\sigma_a$ is approximately a ⅓ value of the tensile strength $\sigma_B$, and hence, if the tensile strength $\sigma_a$, is set to over 1470/3=490 Mpa, it becomes over the fatigue strength. It can not be, however, considered that when using the constant velocity joint, there is always applied a large torque to such an extent that the maximum surface pressure becomes 4200 Mpa at the joint angle α' of 45 degrees, which implies that an excessive allowance is given to the value. If the excessive allowance is given to the value of the tensile strength $\sigma_a$, this might lead to the reduction in the major diameter $D_a$ of each ball 104. Then, as described above, an exfoliation life-span decreases, resulting in an ill-balanced design. Accordingly, the stress based on the load applied to the column members of the cage should be set to over 490 Mpa under the worst condition. Incidentally, in the discussion given above, only the tensile load acting on the column members 130, 130 is taken into consideration. A large bending moment is, however, applied to the proximal ends of the respective column 6 members 130, 130, i.e., to the connecting portion with the rim portion 146. Therefore, a corner R of this connecting portion has sufficiently a large value (a 0.4- to 0.5-fold value of the major diameter $D_a$ of the ball 104), and it is required that the cage should not be broken at this connecting portion. Based on a result of the above examination, the stress applied to each of the column members 130, 130 should satisfy the following formula (6).

$$490 \leq \frac{P}{w \cdot t_c} \leq 1470 \quad (6)$$

where w is, as shown in FIG. 4, the average of the width $w_1$ of the column member 130 on the side of the minor diameter and the width $w_2$ on the side of the major diameter. Note that in the case of the cage in which the plate thickness $t_c$ is different in the axial direction, there is taken a value of $t_c$ in such a position that the sectional area $w \cdot t_c$ is minimized.

Then, when the above formulae (3)–(5) are substituted into the formula (6), the following formula (7) is obtained.

$$\frac{0.054}{r_t}D_a \leq w \leq \frac{0.16}{r_t}D_a \quad (7)$$

Namely, as described above, a relationship between the major diameter $D_a$ of each ball, the width of the column member in the circumferential direction, and the ratio $r_t$ ($=t_c/D_a$) of the thickness $t_c$ of each column member in the diametrical direction of the cage to the major diameter $D_a$ of each ball, is controlled to $(0.054/r_t) \cdot D_a \leq w \leq (0.16/r_t) \cdot D_a$. In this case, it is feasible to sufficiently ensure both of the strength of the cage and the rolling fatigue life-span of each of the inner and outer engagement grooves and to downsize the constant velocity joint, which contributes the utilization of the so-called fourth generation hub unit in which the outer race of the constant velocity joint is integrated with the inner race of the rolling bearing unit for supporting the wheel. Note that the calculation in the formula (7) does not take account of the fact that $r_t$ falls within the range of 0.16–0.30, however, if designed so that $r_t$ falls within this range, as obvious from the explanation of the formula (4), an well-balanced design is attained.

The constant velocity joint in the first embodiment according to the first aspect of the present invention takes the structure capable of diminishing the major diameter by setting the number of the balls for transmitting the rotary force to 8, and besides it is possible to actualize the constant velocity joint which is small-sized and exhibits an excellent durability. Accordingly, it is possible to attain the downsizing and reduction in the weight of the wheel-oriented rolling bearing unit known as the fourth-generation hub unit integrally incorporating the constant velocity joint while ensuring the sufficient durability.

Second Embodiment

Next, a second embodiment according to a second aspect of the present invention and modified examples thereof will be described with reference to FIGS. 6–8. The whole structure of the constant velocity joint in the second embodiment which will be next discussed, will be illustrated the same as it is depicted in FIGS. 21 or 5 in the following discussion, and hence the illustration thereof is omitted. What is illustrated and explained herein is only the principal portion required for describing the second aspect of the present invention.

Figure 6:
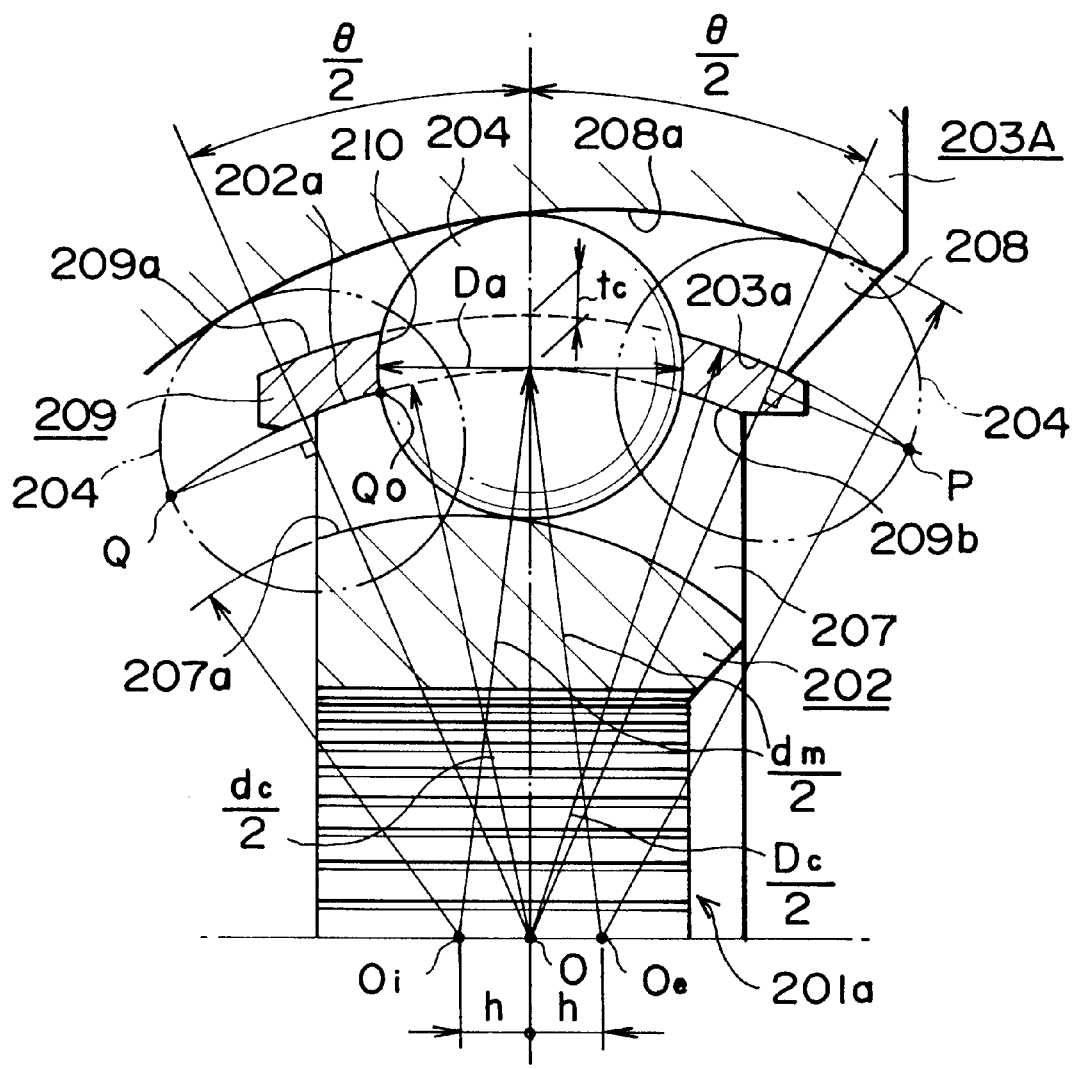
FIG. 6 is a partial sectional view showing a second embodiment of the present invention.

FIG. 6 shows the second embodiment according to the second aspect of the present invention. In the case of the second embodiment, a center of curvature of an outer peripheral surface 202a of an inner race 202 and a center of curvature of an inner peripheral surface 203a of an outer race 203A, are concentric on the same central point O. Corresponding to this concentricity, curvature centers of outer peripheral surface 209a and an inner peripheral surface 209b of a cage 209 are each concentric on the central point O of oscillations of a constant velocity joint 201a. Accordingly, a thickness (excluding both of side edges in the axial direction) of the cage 209 is uniform in the axial direction. To be more specific, the thickness (=average thickness $t_c$) of the cage 209 is $\frac{1}{2}\{t_c=(D_c-d_c)/2\}$ of a difference between a diameter $D_c$ of the outer peripheral surface 209a and a diameter $d_c$ of the inner peripheral surface 209b.

During an operation of the thus constructed constant velocity joint 201a, the ball 204, as indicated by the dotted line in FIG. 6, oscillates in reciprocation together with the cage 209 within a range of an angle θ with a neutral position indicated by the solid line in FIG. 6 being centered. Then, with these reciprocative oscillations, the ball 204 displaces in the diametrical direction of the cage 209 along a bottom surface 207a of an inner engagement groove 207 and a bottom surface 208a of an outer engagement groove 208. With the reciprocative oscillations and the displacement in the diametrical direction, the cage 209 oscillates while being guided along an inner peripheral surface 203a of the outer race 203A, and a portion existing at a point Q0 in FIG. 6 in the neutral state, with a θ/2 oscillation of the cage 209, shifts to a point Q in FIG. 6. Then, at the point Q, a rolling surface of the ball 204 becomes closest to a peripheral edge of an opening on the minor diameter side of the pocket 210. Similarly at a point P, this rolling surface becomes closest to a peripheral edge of an opening on the major diameter side of the pocket 210.

Based on such a structure, if a ratio $R_1$, $(=D_c/d_m)$ of the diameter $D_c$ of the outer peripheral surface 209a of the cage 209 to a diameter $d_m$ of the pitch circle of each of the plurality of balls 204, is set such as $1.06<R_1<1.11$, it is feasible to prevent an impingement of the rolling surface upon the peripheral edge of the opening on the major diameter side while ensuring a smooth operation of the constant velocity joint 201a, which might lead to a damage to the peripheral edge of the opening on the major diameter side of the pocket 210 at the point P, as well as being possible to prevent the rolling surface of each ball 204 from running on the edge portion of the opening of the outer engagement groove 208.

Further, if a ratio $r_1$, $(=d_c/d_m)$ of the diameter $d_c$ of the inner peripheral surface 209b of the cage 209 to the diameter $d_m$ of the pitch, is set such as $0.945<r_1<0.998$, it is feasible to prevent the impingement of the rolling surface of each ball 204 upon the peripheral edge on the minor diameter side while ensuring the smooth operation of the constant velocity joint 201a, which might lead to the damage to the peripheral edge on the minor diameter side of the pocket 210 at the point Q, as well as being possible to prevent the rolling surface of each ball 204 from running on the edge portion of the opening of each of the engagement grooves 207, 208.

Moreover, if a ratio $r_t$ of a the average thickness $t_c$ of the cage 209, which is expressed by ½ of the difference between the diameter $D_c$ of the outer peripheral surface 209a of the cage 209 and the diameter $d_c$ of the inner peripheral surface 209b of the cage 209, to a major diameter $D_a$ of the ball 204 is controlled within a range of $0.16<r_t<0.30$, it is possible to establish a compatibility between ensuring the strength and the durability of the cage 209 including the column member existing between the pockets 210 adjacent to each other in the circumferential direction, and ensuring a load capacity of the constant velocity joint 201a by securing depths of the two inner/outer engagement grooves 207, 208.

Figure 7:
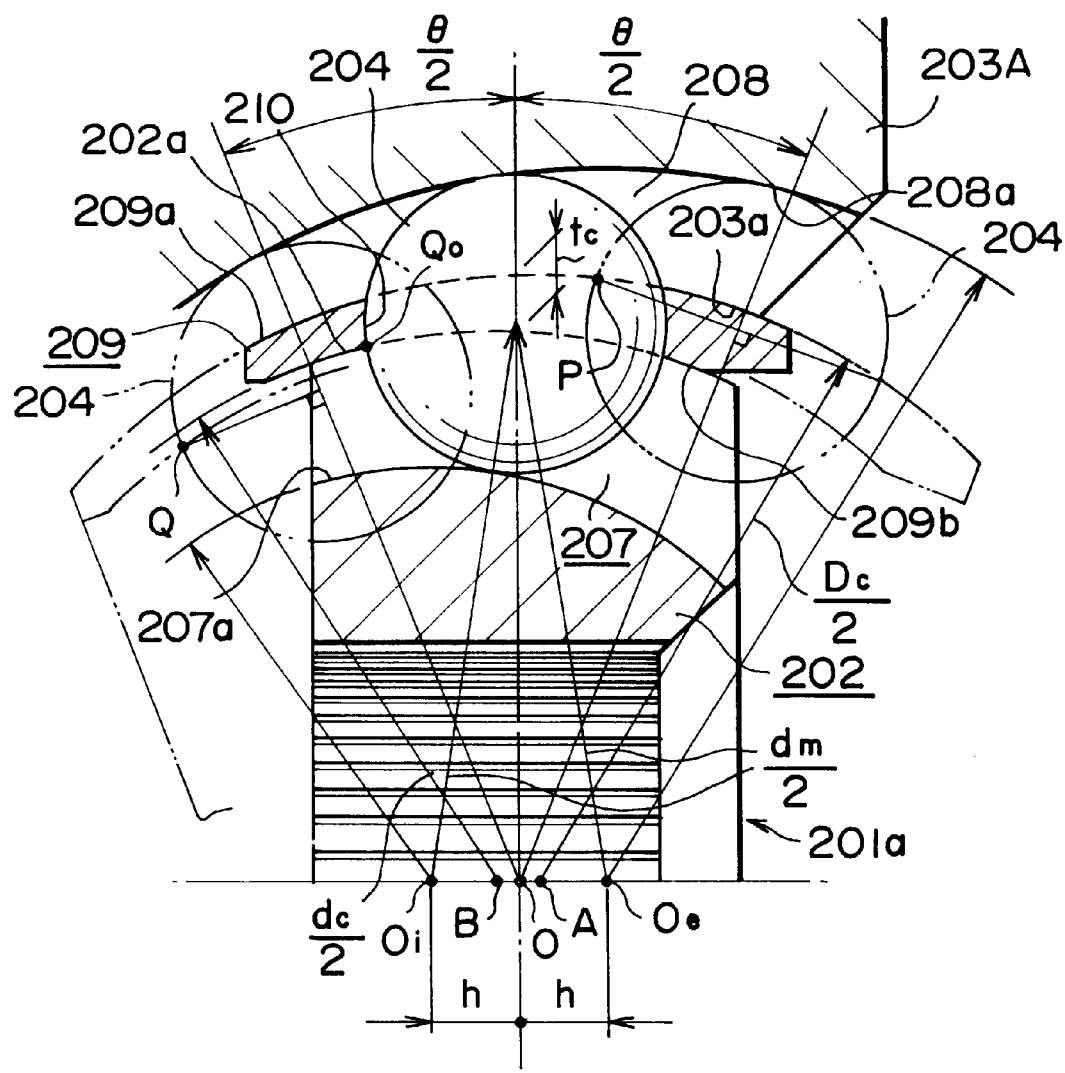
FIG. 7 is a view similar to FIG. 6, showing a first modified example of the second embodiment.

Next, FIG. 7 shows a first modified example of the second embodiment of the present invention. In the case of the first modified example thereof, a curvature center A of the outer peripheral surface 209a of the cage 209 and of the inner peripheral surface 203a of the outer race 203A, is disposed between the central point O of the oscillations of the constant velocity joint 201a and a curvature center $O_e$ of the bottom surface 208a of the outer engagement groove 208. Further, a curvature center B of the outer peripheral surface 202a of the inner race 202 and of the inner peripheral surface 209b of the cage 209, is disposed between the central point O of the oscillations of the constant velocity joint 201a and a curvature center $O_i$ of the bottom surface 207a of the inner engagement groove 207. Accordingly, the cage 209 has a larger thickness on the side of the opening (a right side in FIG. 7) of the outer race 202A and has a smaller thickness on the depthwise side (a left side in FIG. 7). Such an average thickness $t_c$ of the cage 209 is a thickness of the central portion in the axial direction and can be obtained as being ½ $\{t_c=(D_c-d_c)/2\}$ of a difference between the diameter $D_c$ of the outer peripheral surface 209a and the diameter $d_c$ of the inner peripheral surface 209b.

Figure 8:
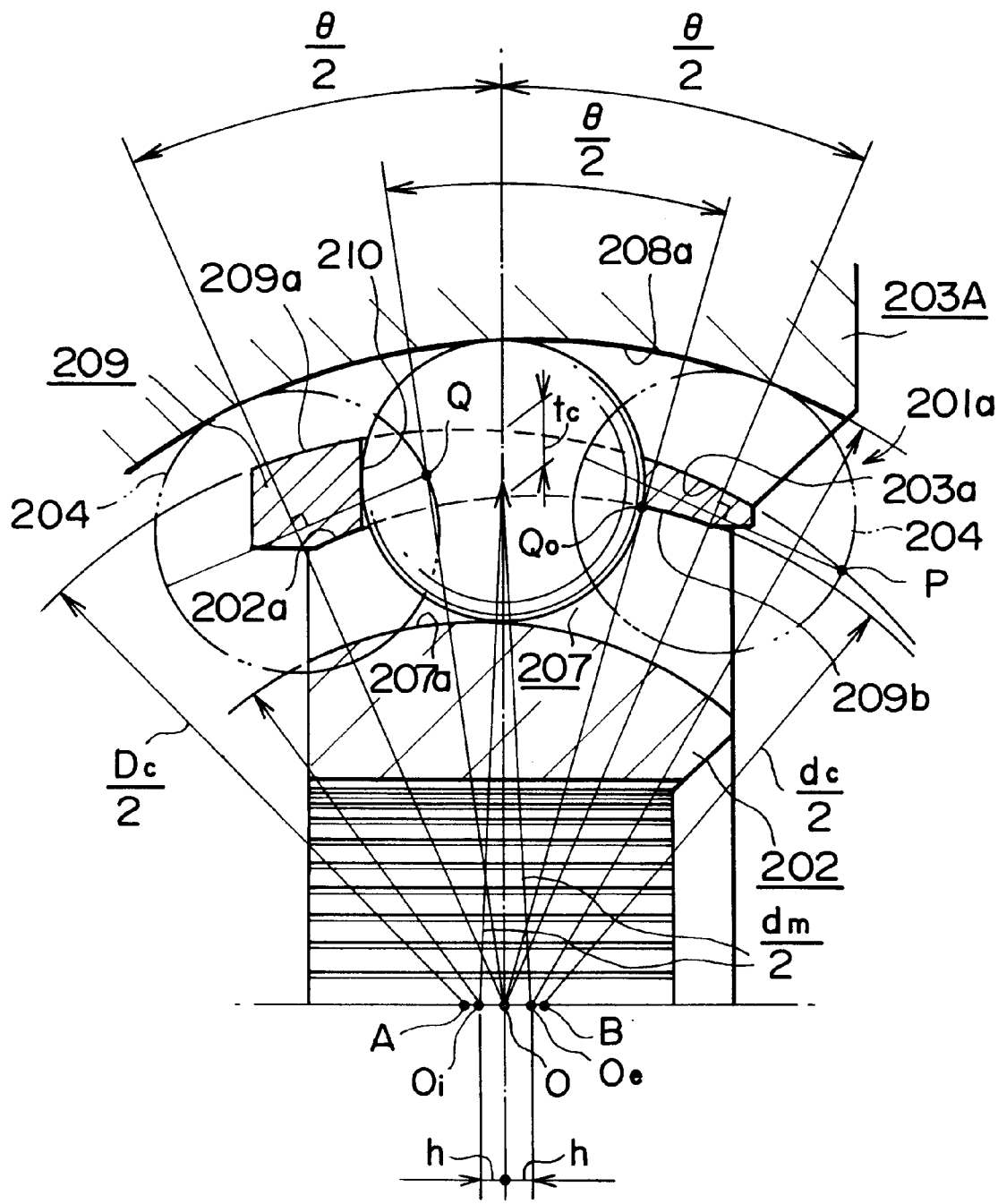
FIG. 8 is a view similar to FIG. 6, showing a second modified example of the second embodiment.

Next, FIG. 8 shows a second modified example of the second embodiment of the present invention. In the case of the second modified example, the curvature center A of the outer peripheral surface 209a of the cage 209 and of the inner peripheral surface 203a of the outer race 203A, is disposed on the opposite side to the central point of the oscillations of the constant velocity joint 201a with respect to the curvature center $O_i$ of the bottom surface 207a of the inner engagement groove 207. Further, the curvature center B of the outer peripheral surface 202a of the inner race 202 and of the inner peripheral surface 209b of the cage 209, is disposed on the opposite side to the central point O of the oscillations of the constant velocity joint 201a with respect to the curvature center $O_e$ of the bottom surface 208a of the outer engagement groove 208. Accordingly, the cage 209 has a smaller thickness on the side of the opening (a right side in FIG. 8) of the outer race 203A and has a larger thickness on the depthwise side (a left side in FIG. 8). Such an average thickness $t_c$ of the cage 209 is also a thickness of the central portion in the axial direction and can be obtained as being ½ $\{t_c=(D_c-d_c)/2\}$ of a difference between the diameter $D_c$ of the outer peripheral surface 209a and the diameter $d_c$ of the inner peripheral surface 209b.

The structures of the first and second modified examples shown in FIGS. 7 and 8, as in the case of the second embodiment in FIG. 6, also have relationships such as $1.06<R_1<1.11$, $0.945<r_1<0.998$, and $0.16<r_t<0.30$, and are thereby capable of exhibiting the same operation and effect as those in the second embodiment discussed above by preventing the impingement of the rolling surface of the ball 204 upon both of the opening portions on the minor/major diameter sides of the pocket 210. Note that a geometry of the curvature centers of the respective peripheral surfaces 202a, 203a, 209a and 209b is not limited to what is shown herein, and there may exist other geometries to which the present invention can be applied individually. Further, the respective pockets 210 are not necessarily disposed at the equal intervals in the circumferential direction.

Following Tables (1), (2) and (3)show test data when making a variety of options with respect to Dc/dm, dc/dm and tc/Da in the second embodiment.

TABLE 1

| | 1.06 < Dc/dm < 1.11 | | | | |
|---|---|---|---|---|---|
| Dc/dm | 1.04 | 1.06 | 1.10 | 1.11 | 1.12 |
| Chip, swelling of cage window edge | X | O | O | O | O |
| Durability of outer race | O | O | O | O | X |

TABLE 2

| | 0.945 < dc/dm < 0.998 | | | | |
|---|---|---|---|---|---|
| dc/dm | 0.925 | 0.945 | 0.975 | 0.998 | 1.005 |
| Chip, swelling of cage window edge | O | O | O | O | X |
| Durability of inner race | X | O | O | O | O |

TABLE 3

| | 0.16 < tc/Da < 0.30 | | | | |
|---|---|---|---|---|---|
| tc/Da | 0.14 | 0.16 | 0.24 | 0.30 | 0.32 |
| Column strength of cage | X | O | O | O | O |
| Durability of outer and inner race | O | O | O | O | X |

In Table (1)–(3), the mark O indicates "acceptable" and the mark X indicates "non-acceptable".

The constant velocity joint in the second embodiment is constructed and operates as described above, and hence capable of ensuring both of the load capacity and the durability of the cage for holding the balls with the structure in which the major diameter can be reduced by setting the number of the balls for transmitting the rotary force to, e.g., 8 or more. Accordingly, it is feasible to attain the downsizing and the decrease in the weight of the wheel-support rolling bearing unit known as the fourth-generation hub unit unit integrally incorporating the constant velocity joint while ensuring the sufficient durability.

Third Embodiment

FIGS. 9 to 12B illustrate a third embodiment of a constant velocity joint according to a third aspect of the present invention. Note that the third embodiment deals with a structure of incorporating the constant velocity joint of the present invention into a fourth-generation hub unit. To start with, a structure of this hub unit will be discussed. An outer race 311, which does not rotate that is, is held stationary in a state of being supported on a suspension (not shown), includes a first fitting flange 312, formed on its outer peripheral surface, for supporting this outer race 311 on the suspension, and plural trains of outer race tracks 313a, 313b formed along an inner peripheral surface, respectively. A hub 316 composed of a first inner race member 314a and a second inner race member 315a is disposed concentrically with the outer race 311 on the side of a minor diameter of the outer race 311. First and second inner race tracks 318, 320 are respectively formed in positions on the outer peripheral surface of this hub 316a, which face to the outer race tracks 313a, 313b. Of these two inner race tracks 318, 320, the first inner race tracks 318 is formed directly on an outer peripheral surface of an intermediate portion of the first inner race member 314a. Further, the second inner race member 315a is externally fitted to a portion, closer to an internal side end (closer to a right side end in FIG. 1) than the portion formed with the first inner race track 318, of the intermediate portion of the first inner race member 314a. The second inner race track 320 is formed on an outer peripheral surface of the second inner race member 315a. Then, a plurality of rolling members 321a and another plurality of rolling members 321b are so provided as to be capable of rolling respectively between the outer race tracks 313a, 313b and the first and second inner race tracks 318, 320, whereby the hub 316a is rotatably supported on the inner side of the outer race 311.

Figure 9:
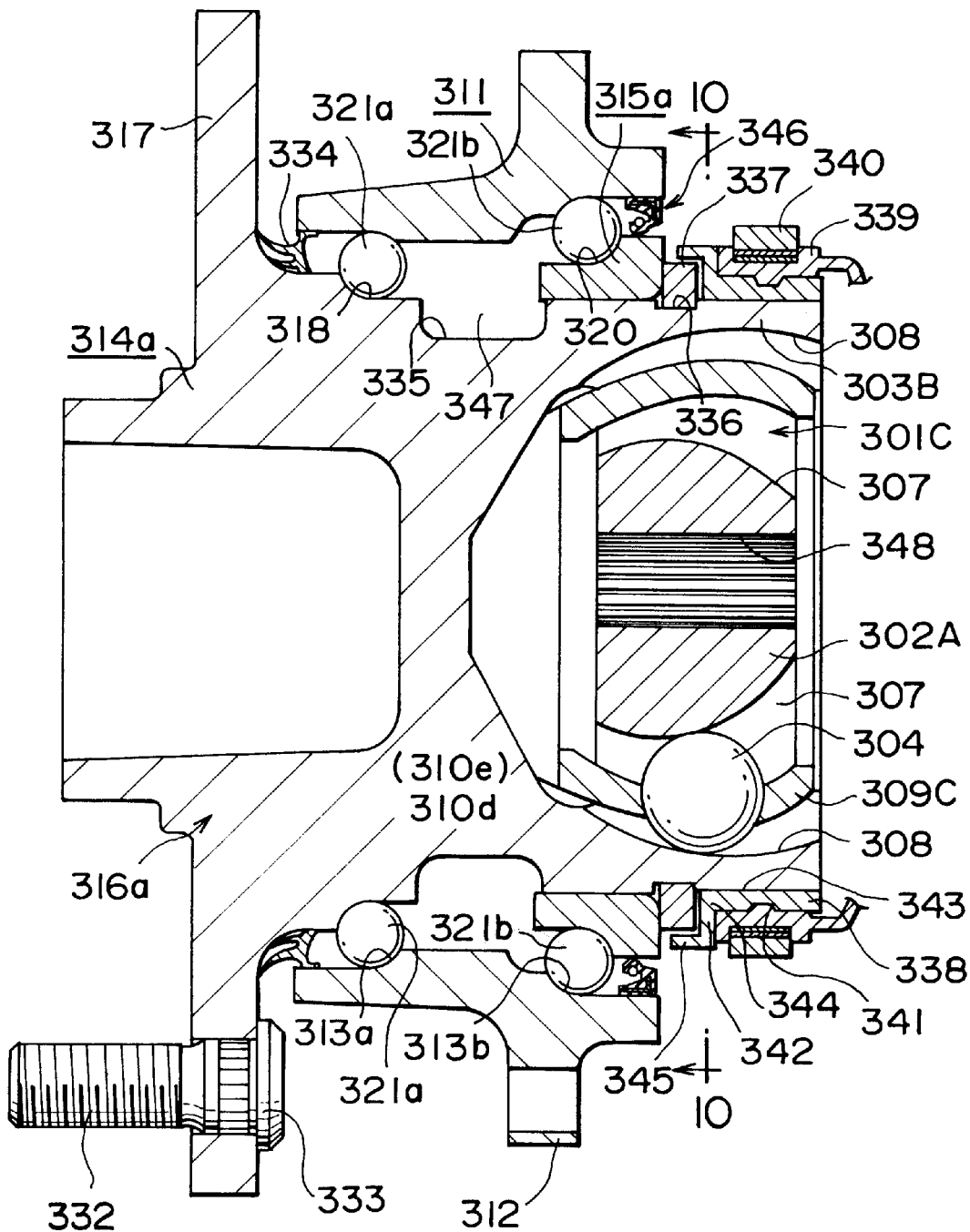
FIG. 9 is a sectional view showing a wheel-support rolling bearing unit incorporating a constant velocity joint in a third embodiment of the present invention.
Figure 10:
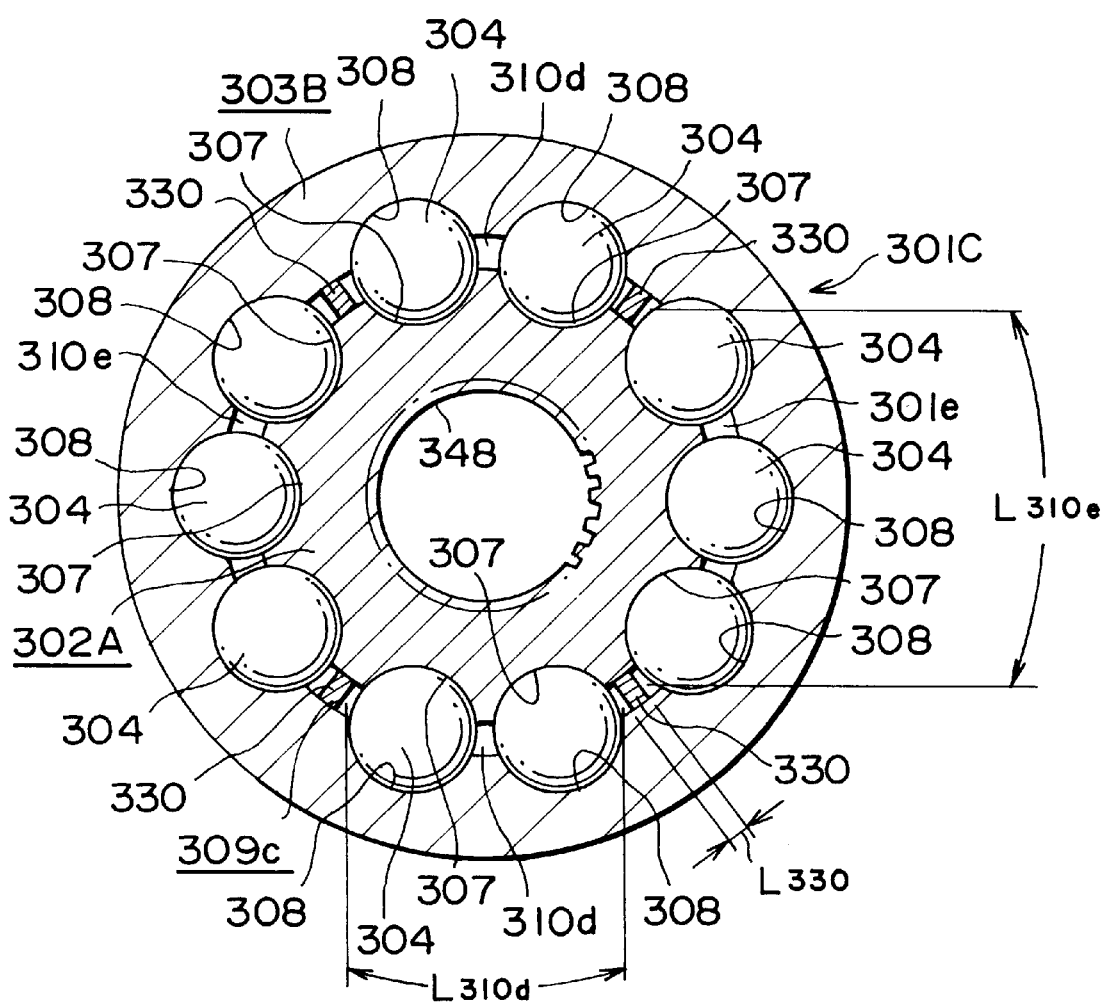
FIG. 10 is a sectional view, with some portions being omitted, taken substantially along the line 10—10 in FIG. 9.

In the case of this example illustrated in FIG. 9, as described above, the first inner race track 318 is formed directly on the outer peripheral surface of the first inner race member 314, whereby a diameter of the first inner race track 318 is set smaller than a diameter of the second inner race track 320 formed on the outer peripheral surface of the second inner race member 315a. Further, with this contrivance of thus setting the diameter of the first inner race track 318 smaller than the diameter of the second inner race track 320, a diameter of the outer race track 313a on the outer side (implying an outer side in a widthwise-direction of an automobile in a state of being assembled to the automobile, i.e., a left side in FIG. 9) which faces to the first inner race track 318, is set smaller than a diameter of the outer race track 313b on the inner side (implying a central side in the widthwise direction of the automobile in the state of being assembled to the automobile, i.e., a right side in FIG. 9). Further, a major diameter of an outer half portion (which is a half portion on the outer side in the widthwise direction in the state being assembled to the vehicle, i.e., a left half portion in FIG. 9), formed with the outer race track 313a on the outer side, of the outer race 311, is set smaller than a major diameter of an inner half portion (which is a half portion on the central side in the widthwise direction in the state being assembled to the vehicle, i.e., a right half portion in FIG. 9), formed with the outer race track 313b on the inner side, of the outer race 311. Moreover, in the example shown in FIG. 9, with the setting of thus decreasing the diameters of the first inner race track 318 and of the outer race track 313a, the number of the rolling members 321a provided between the first inner race track 318 and the outer race track 313a on the outer side is set smaller than the number of the rolling members 321b provided between the second inner race track 320 and the outer race track 313b on the inner side.

Moreover, a second fitting flange 317 for supporting and fixing the wheel to the first inner race member 314 is provided integrally with the first inner race member 314a on an outer peripheral surface of an external side end of the first inner race member 314a. Proximal ends of a plurality of studs 332 for joining the wheel are fixed to the second fitting flange 317. In the case of the example illustrated in FIG. 1, a pitch circle diameter of each of the plurality of studs 332 is reduced to such a degree as to similarly set the major diameter of the outer half portion of the outer race 311 than the major diameter of the inner half portion as described above (to such a degree that a head 333 of each stud 332 does not interfere with the outer peripheral surface of the external side end of the outer race 311). Note that a diameter of a portion, existing more inwards in the axial direction than a portion formed with the first inner race track 318, of the outer peripheral surface of the first inner race member 314a, is set smaller than a diameter of an inscribing circle of the rolling member 121a corresponding to the first inner race track 318. The reason why so is that when assembling the wheel-support rolling bearing unit, the plurality of rolling members 321a are assembled on the side of the minor diameter of the outer race track 313a formed on the inner peripheral surface of the external side end of the outer race 311, and a seal ring 334 is internally fixedly fitted to an inner peripheral surface of the external side end of the outer race 311, in which state the first inner race member 314a is made insertable into the inside-diametrical portion of the outer race 311. Further, a wall-sunk portion 335 taking a recessed groove-like shape is formed along the entire periphery at a portion, between the first inner race track 318 and the portion externally fitted with the second inner race member 315, on the outer peripheral surface of the intermediate portion of the first inner race member 314a, thereby reducing a weight of the first inner race member 314a.

Moreover, a stop ring 337 engages with an engagement recessed groove 336 formed along the entire periphery of a portion, closer an internal side end of the outer peripheral surface, of the first inner race member 314a in order to keep to a proper value a pressure given to each of the plurality of rolling members 321a and the plurality of rolling members 321b so provided as to be capable of rolling between the outer race tracks 313a, 313b and the first and second inner race tracks 318, 320 by preventing the second inner race member 315a externally fitted to the first inner race member 314a from displacing toward the internal side end in the axial direction. This stop ring 337 is constructed of a pair of stop ring elements each assuming a semicircular shape. The thus constructed stop ring 337 makes its own inner peripheral edge engaged with the engagement recessed groove 336 while pressing the second inner race member 315a against the first inner race member 314a outwards in the axial direction in order to give the proper pressure to each of the rolling members 321a, 321b. The stop rings 337 having proper thickness dimensions are selectively used for keeping each of the rolling members 321a, 321b given the proper pressure even in a state where the force pressing the second inner race member 315a outwards in the axial direction is canceled. More specifically, there are prepared plural types of stop rings 337 slightly different from each other in terms of their thickness dimensions, and the stop ring 337 having the proper thickness dimension in relation to a dimension of each of the constructive members of the rolling bearing unit such as a groove width of the engagement recessed groove 336, is chosen and engaged with the engagement recessed groove 336. Accordingly, when this selected stop ring 337 engages with the engagement recessed groove 336, even if the pressing force is canceled, the second inner race member 315a is prevented from displacing toward the internal side end in the axial direction, whereby each of the rolling members 321a, 321b can remain to be given the proper pressure.

Further, a part of a spacer 338 is disposed along the periphery of the stop ring 337 in order to prevent the stop ring 337 from being unintentionally disengaged from the engagement recessed groove 336 due to outward displacements, in the diametrical direction, of the pair of stop ring elements constituting the stop ring 337. This spacer 338 is a member for supporting a boot 339 for preventing foreign matters such as rain water and dusts etc from permeating into a constant velocity joint 301c constructed of an outer race 303B provided at the internal edge of the inner race member 314a in such a way that the external side end of the boot 339 is fitted on the spacer 338. Note that this boot 339 is integrally formed of an elastic material such as a rubber and a synthetic resin etc, wherein an intermediate portion of the boot 339 is formed in a bellows-like configuration, and both edges thereof are formed in a cylindrical shape, respectively. An external side end of the thus constructed boot 339 is fitted on the metal spacer 338 fixedly attached to the internal edge of the first inner race member 314a by interference-fitting, and is pressed against the outer peripheral surface of this spacer 338 by a presser band 340. Note that the inner peripheral surface of the external side end of the boot 339 engages along its entire periphery with the engagement groove 341 formed in the outer peripheral surface of the spacer 338.

A portion, protruding outward in the axial direction from the boot 339, at the external side edge of the spacer 338 is formed in a crank shape in section, thus constituting a presser portion 342 along the entire periphery. For constituting this presser portion 342, the spacer 338 is constructed of a small-diameter cylindrical portion 343 fixedly fitted on the internal side end of the first inner race member 314a, a ring portion 344 crooked outward in the diametrical direction from the external side edge of the small-diameter cylindrical portion 343, and a large-diameter cylindrical portion 345 crooked outward in the axial direction from an outer peripheral edge of this ring portion 344. Then, an outer surface of the ring portion 344 among these components is brought into contact with or disposed in close proximity facing to the inner surface of the stop ring 337, and an inner peripheral surface of the large-diameter cylindrical portion 345 is brought into contact with or disposed in close proximity facing to the outer peripheral surface of the strop ring 337. Further, a seal ring 334 is provided between the inner peripheral surface of the external side end of the outer race 311 and the outer peripheral surface of the intermediate portion of the first inner race member 314a. A combination seal ring 346 is provided between the inner peripheral surface of the internal side end of the outer race 311 and the outer peripheral surface of the internal side end of the second inner race member 315. Openings at both ends of a space 347 in which the plurality of rolling members 321a, 321b are disposed, are sealed by these seal rings.

Further, an outer race 303B constituting the constant velocity joint 301c is formed at a portion, on which the second inner race member 315a and the external side end of the boot 339 are fitted, at the internal side end of the first inner race member 314a. An inner peripheral surface of this outer race 303B is formed with ten streaks of outer engagement grooves 308. The engagement grooves 308 each taking a circular arc configuration in section when cut off by an imaginary plane orthogonal to the central axis of the outer race 303B, are formed in a direction right-angled (in the right-and-left direction in FIG. 9, i.e., in the surface-and-underside direction in FIG. 10) to the circumferential direction. Moreover, an inner race 302A for constituting the constant velocity joint 301c in combination with the outer race 303B, is disposed inwardly of the outer race 303B. An outer peripheral surface of the inner race 302A is formed with ten streaks of inner engagement grooves 307 in the direction right-angled to the circumferential direction. Then, totally ten pieces of balls 304 are so provided piece by piece for each of the engagement grooves 307, 308 as to be capable of rolling between these inner engagement grooves 307 and the outer engagement grooves 308 in a state of being held in pockets 310d, 310e of cage 309c. Furthermore, a spline hole 348 is formed extending in the axial direction at the central portion of the inner race 302A. An edge portion of an unillustrated drive shaft is spline-engaged with the spline hole 348 in a state of being assembled to the automobile, whereby the first inner race member 314a can be rotationally driven through the ten pieces of balls as well as through the inner race 302A.

Particularly in the case of the constant velocity joint 301c of the present invention which is incorporated into the hub unit described above, the ten balls 304 can be incorporated into the pockets 310d, 310e of the cage 309c, and besides the following construction is to be taken for ensuring length dimensions, in the circumferential direction, of column members 330, 330 between the pockets 310d, 310e adjacent to each other in the circumferential direction. To begin with, the number of the pockets 310d, 310e is set to totally 4. Further, the number of the balls 304, 304 held within the four pockets 310d, 310e is set to totally 10. Then, the number of the balls 304 held by each of the two pockets 310d, 310d existing on the opposite side in the diametrical direction (in the up-and-down direction in FIG. 10) among the four pockets 310d, 310e, is set to 2, and totally four balls are held therein. By contrast, the number of the balls 304 held by each of the remaining two pockets 310e, 310e is set to 3, and totally six balls 304 are held therein.

As described above, the number of the balls 304, 304 held in the four pockets 310d, 310e is changed alternately in the circumferential direction such as 2→3→2→3. A procedure of incorporating the balls 304, 304 into the respective pockets 310d, 310e of the cage 309c is that totally four balls 304, 304 are incorporated in advance by twos into the two pockets 310d, 310d existing on the opposite side in the diametrical direction, and totally six balls 304, 304 are incorporated thereafter by threes into the remaining two pockets 310e, 310e. The incorporating procedure is thus controlled, thereby minimizing a length dimension $L_{310e}$, in the circumferential direction, of each of the pockets 310e, 310e incorporating the balls 304, 304 by threes. In other words, a length ($L_{310e}/3$) of each of the balls in the pockets 310e, 310e each incorporating the balls by threes, is set smaller than a length ($L_{310d}/2$) of each of the balls in the pockets 310d, 310d each incorporating the balls 304, 304 by twos, thereby ensuring a length $L_{330}$, extending in the circumferential direction, of each of the column members 330, 330 existing between the pockets 310d, 310e adjacent to each other in the circumferential direction. Note that pitches of the respective engagement grooves 307, 308 are controlled based on a relationship with the length dimensions $L_{310d}$, $L_{310e}$ of the pockets 310d, 310e. In the illustrated example, the pitch in the circumferential direction is set as an in equal pitch.

Figure 11:
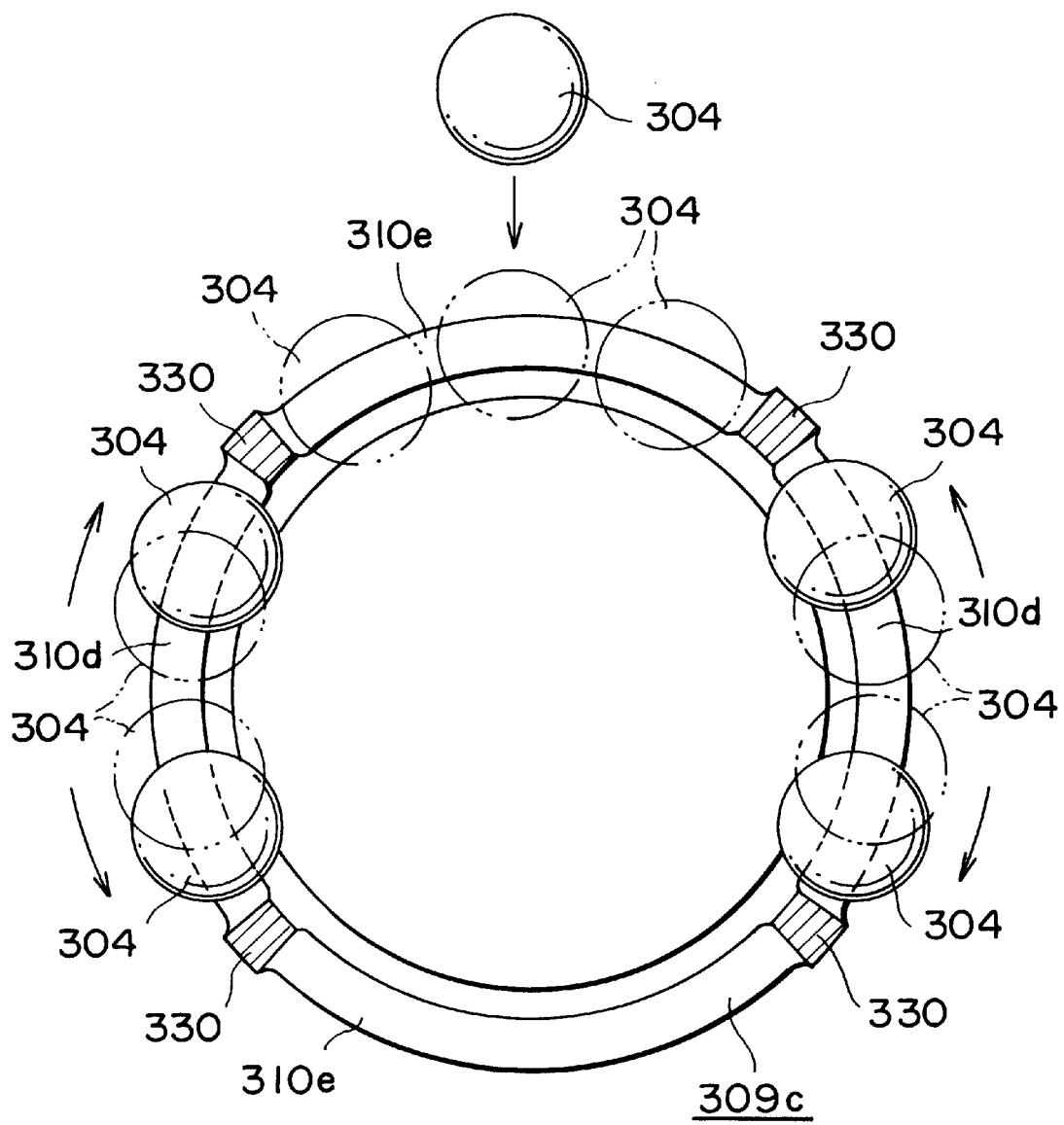
FIG. 11 is a sectional view of a cage, showing how balls are incorporated into pockets.
Figure 24:
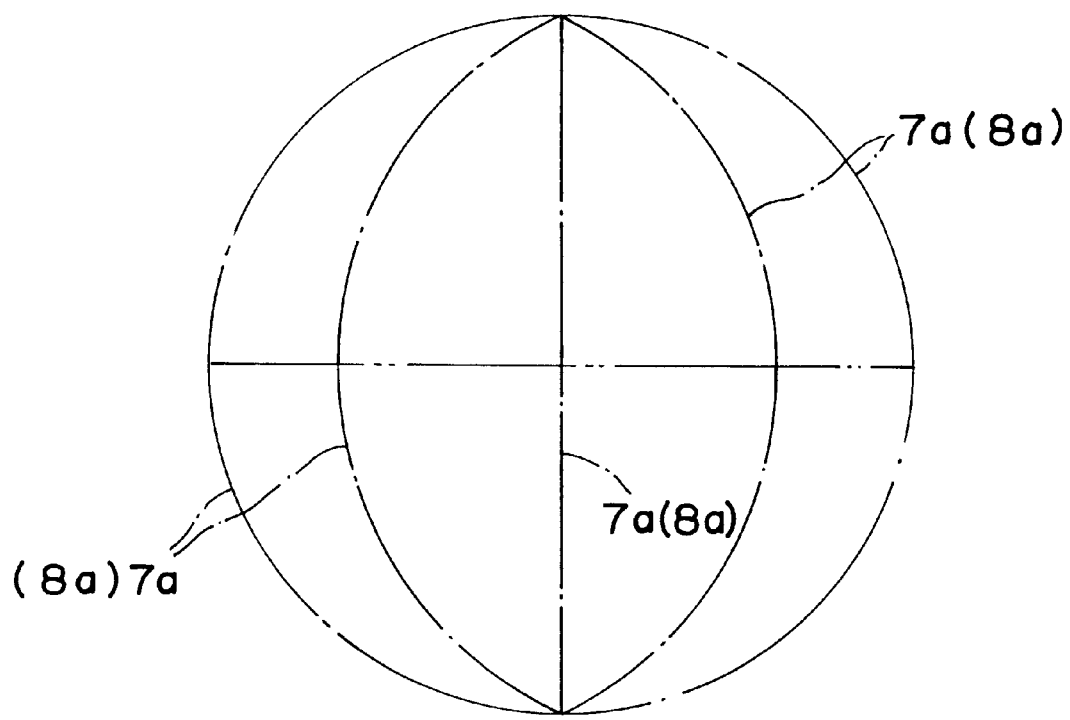
FIG. 24 is a schematic view similarly showing a positional relationship between bottom surfaces of the two inner and outer engagement grooves.
Figure 30:
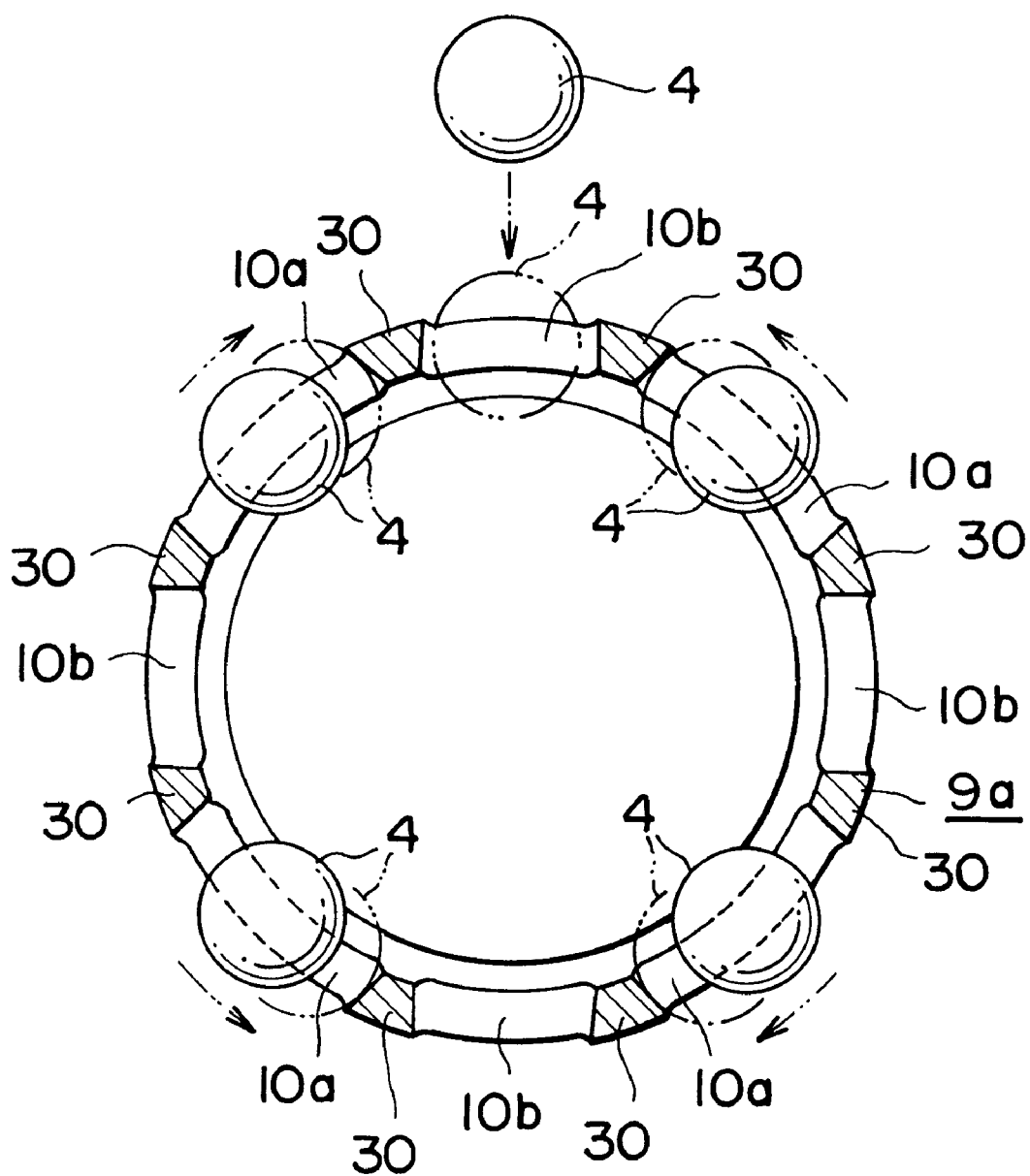
FIG. 30 is a sectional view showing the cage incorporated into the second example of the structure in the prior art.
Figure 31:
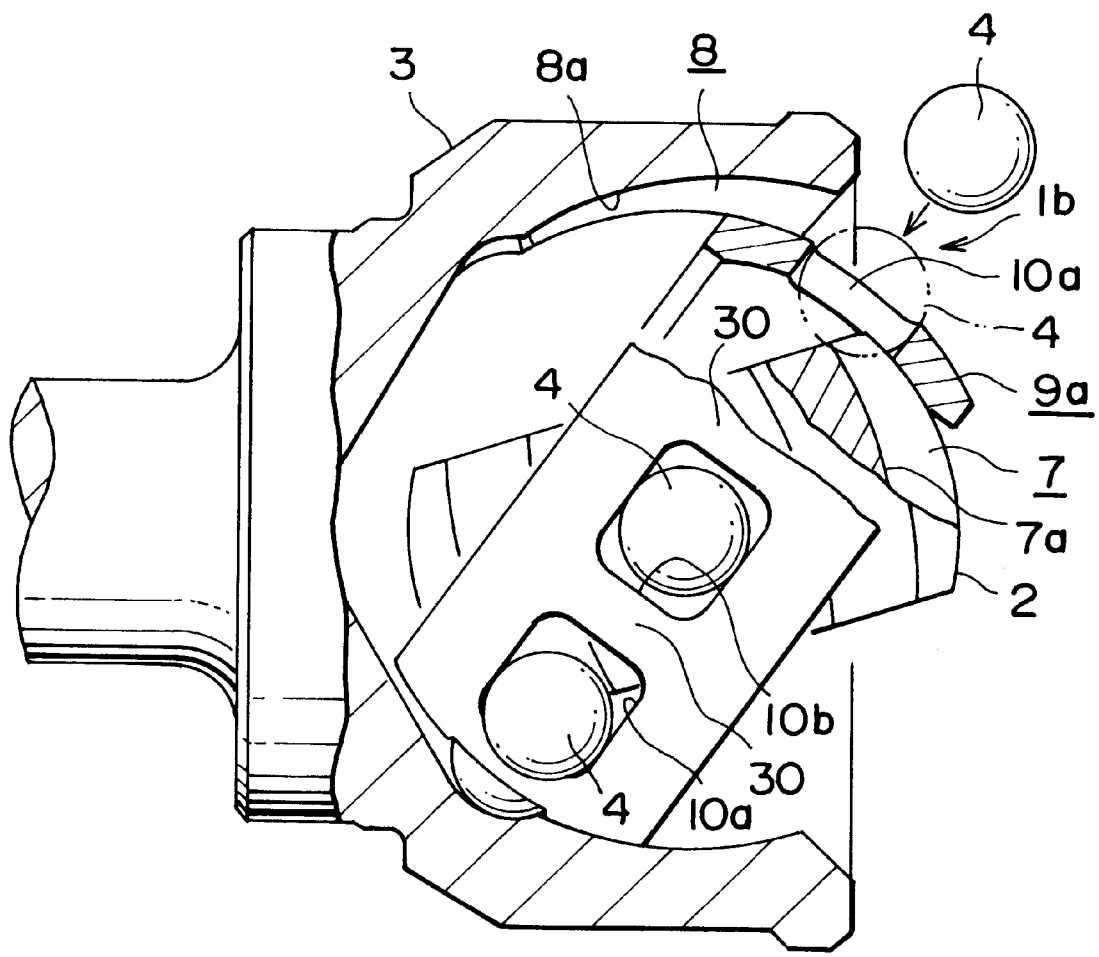
FIG. 31 is a sectional view showing a state where the inner race and the outer race displace in predetermined directions to incorporate the balls into the cage.
Figure 32:
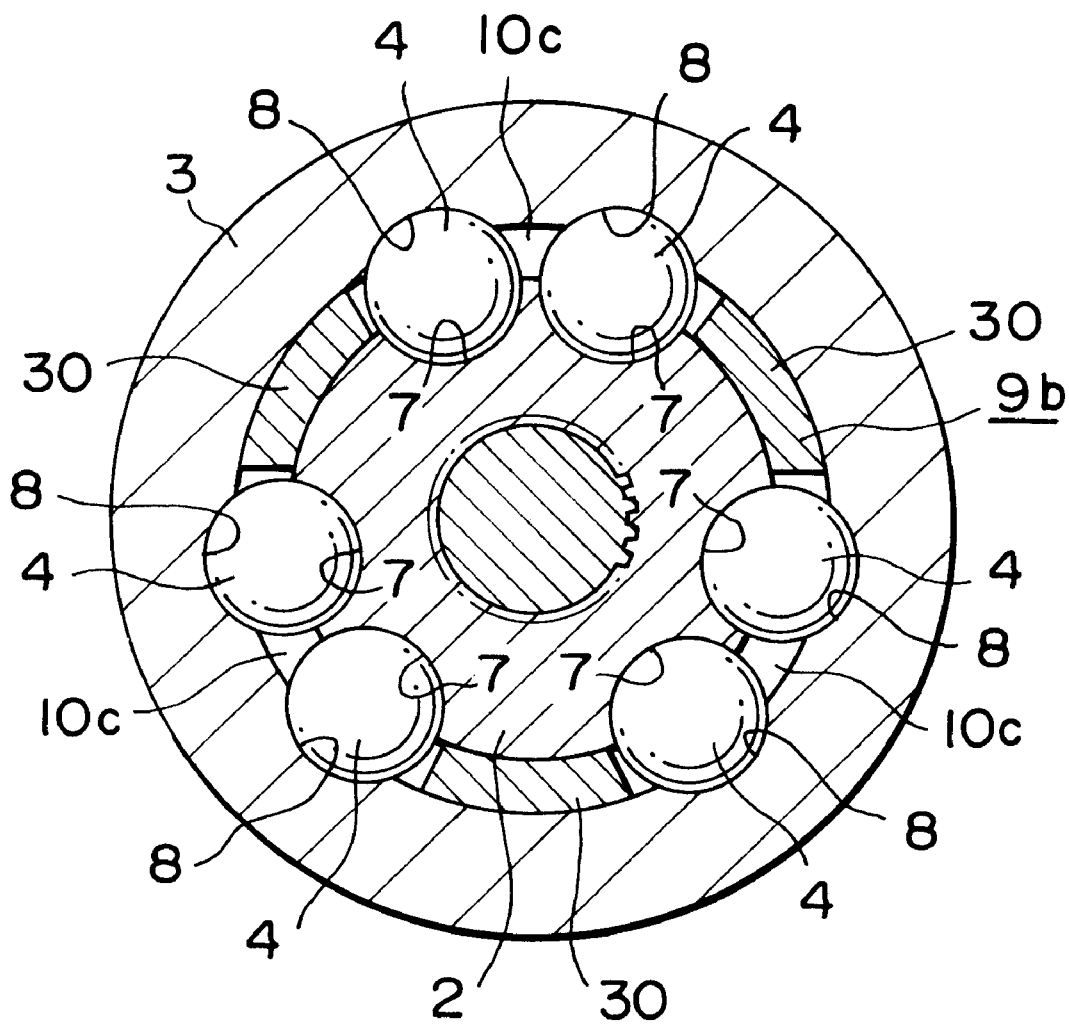
FIG. 32 is a sectional view showing a third example of the structure in the prior art.

The reason why the length $L_{330}$ of each of the column members 330, 330 can be ensured by, as described above, controlling the procedure of incorporating the balls 304, 304, will be elucidated with reference to FIG. 11. In a state where of newly incorporating the balls 304, 304 while giving a joint angle to the constant velocity joint 301c, as obvious from the description in FIGS. 24, 30 and 31, the already incorporated balls 304, 304 displace in such directions as to approach each other along the circumferential direction. Further, the joint angle given to the constant velocity joint 301c when incorporating the balls 304, 304, is by far larger than the joint angle given to the constant velocity joint 301c when used (in the state of being assembled to the automobile). Accordingly, the balls 304, 304 incorporated previously into the pockets 310d, 310d largely shift in the circumferential direction to positions indicated by the solid lines from positions indicated by dotted lines in FIG. 11. Hence, the pockets 310d, 310d previously incorporating the balls 304, 304 must sufficiently allow the circumference-directional displacements of the balls 304, 304 held inside therein. By contrast, however, it might suffice that the pockets 310e, 310e incorporating the balls 304, 304 afterward allow the circumference-directional displacements of the respective balls 304, 304, which are based on the joint angle given when in use. Therefore, as discussed above, the length ($L_{310e}/3$) of each of the balls in the pockets 310e, 310e is set smaller than the length ($L_{310d}/2$) of each of the balls in the pockets 310d, 310d, thereby ensuring the length $L_{330}$, extending in the circumferential direction, of each of the column members 330, 330 existing between the pockets 310d, 310e adjacent to each other in the circumferential direction.

In the case of the thus constructed constant velocity joint of the present invention, the total number of the balls 304, 304 held in the pockets 310d, 310e is set to 10 larger than the number (6) of the balls incorporated into the constant velocity joint which has hitherto been generally used. Hence, even if capable of transmitting a sufficiently large torque, the constant velocity joint can be downsized with a decrease in weight by decreasing the dimension of the major diameter. Namely, a basic dynamic load capacity of a rzeppa constant velocity joint is proportional to the ⅔ power of the number of the balls 304, 304 when the major diameters of the balls 304, 304 are set the same. Accordingly, the basic dynamic load capacity can be made larger as the number of the balls 304, 304 increases. In other words, if the basic dynamic load capacity required is set equal, the major diameter of each of the balls 304, 304 is reduced correspondingly to the increased number of the balls 304, 304, and the major diameter of the constant velocity joint is decreased, thereby attaining the downsizing and the decrease in the weight of the constant velocity joint.

Besides, in the case of the constant velocity joint according to the present invention, it is feasible to increase the length dimension of each of the column members 330, 330 existing between the pockets 310d, 310e adjacent to each other in the circumferential direction. Therefore, a durability of the cage 309c is ensured by relieving a stress acting upon a connecting portion between each of the column members 330, 330 and a rim member 331, thereby obtaining a sufficient durability of the constant velocity joint as a whole.

Especially when the numbers of the balls 304, 304 held in the pockets 310d, 310e adjacent to each other in the circumferential direction are made different from each other, the balls 304, 304 are incorporated afterward into the pockets 310e, 310e having a greater number of the balls 304, 304 to be held therein, whereby these balls 304, 304 can be thus incorporated thereinto. Besides, it is feasible to restrain the length dimension $L_{310e}$ of each of the pockets 310e, 310e from increasing. As a result, the number of the balls incorporated into the constant velocity joint 301c can be increased up to 10 which is by far greater than in the conventional general structure, and in addition the durability of the cage 309c can be ensured.

Figure 12A:
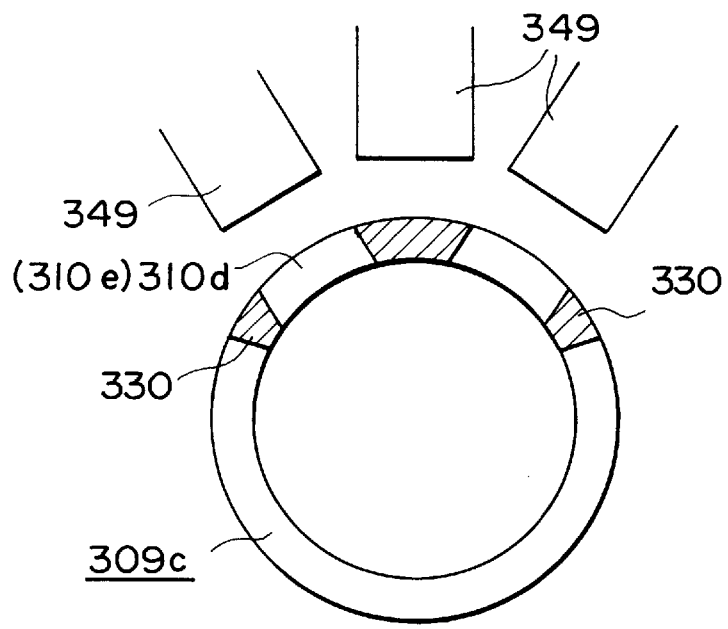
FIGS. 12A and 12B are sectional views showing a state of forming the pocket by punch-out working, FIG. 12A showing preferable working thereof, FIG. 12B showing unpreferable working.

Note that the cage 309 used in the illustrated example is constructed in such a way that a cylindrical member composed of a metal is punched out to form the pockets 310d, 310e. Then, the punch-out working is, as shown in FIG. 12A, carried out at three stages so that the circumference-directional lengths of the column members 330, 330 are not extremely different on the side of the minor diameter and on the side of the major diameter with this punch-out working.

Figure 12B:
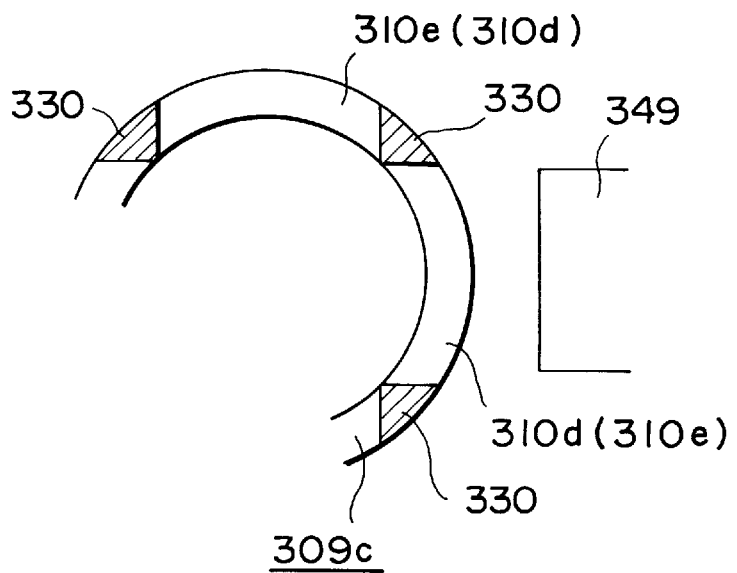

More specifically, when forming the pockets 310d (and 310e) by the punch-out working, a portion at one side end in the circumferential direction (e.g., a right-side portion in FIG. 12A) is punched out by a punch 349, and thereafter a portion at the other side end in the circumferential direction (e.g., a left-side portion in FIG. 12A) is punched out by the punch 349. Finally, the central portion is also punched out by the punch 349. This punch-out working is executed a plurality of times separately, whereby two inside surfaces of the pockets 310d (and 310e) in the circumferential direction are disposed in non-parallel to each other and the circumference-directional lengths of the column members 330, 330 do not become so different on the side of the minor diameter and on the side of the major diameter. Therefore, the durability of each of the column members 330, 330 can be endured by sufficiently ensuring a sectional area of each of the column members 330, 330. In contrast with this, as shown in FIG. 12B, if the punch-out workings of the respective pockets 310d (and 310e) are effected at one time, the two inside surfaces of the pockets 310d (and 310e) in the circumferential direction are, as shown in FIG. 12B, disposed in parallel to each other, and the circumference-directional lengths of the column members 330, 330 become extremely different on the side of the minor diameter and on the side of the major diameter. Then, the sectional area of each of the column members 330, 330 is reduced, with the result that the durability of the column members 330, 330 are ensured with a difficulty.

Moreover, in the case of the illustrated example, as explained above, the major diameter of the outer half portion of the outer race 311 can be reduced by decreasing the diameter of the pitch circle of each of the rolling members 321, 321 structuring an outer rolling member train. Then, a diameter of a pitch circle of each of the plurality of studs 332 fixed to the second fitting flange 317 provided on the outer peripheral surface of the first inner race member 314a, can be reduced corresponding to a degree to which the major diameter of the outer half portion of the outer race 311 is decreased. Accordingly, the major diameter of the second fitting flange 317 for supporting and fixing the studs 332 can be decreased without increasing the axial dimension of the first inner race member 314a, whereby the wheel-support rolling bearing unit can be downsized and reduced in its weight more effectively.

As discussed above, with such a contrivance that the diameter of the pitch circle of each of the rolling members 321, 321 constituting the outer rolling member train, is set smaller than the diameter of the pitch circle of each of the rolling members 321, 321 constituting the inner rolling member train, the basic dynamic load capacity upon the outer rolling member train becomes smaller than the basic dynamic load capacity upon the inner rolling member train. Hence, if the loads applied on the two trains are equal, it follows that a life-span of the outer rolling member train is shorter than that of the inner rolling member train. By contrast, in the general automobile, the load upon the outer rolling member train is smaller than the load upon the inner rolling member train. A design for substantially equalizing the life-spans of the two trains is facilitated and can eliminate a futility. Note that the rolling member 321, 321 involve the use of the balls in the illustrated example, however, taper rollers might be used as the rolling members in the case of the rolling bearing unit for an automobile with a heavy weight. The present invention can be, as a matter of course, applied the rolling bearing unit involving the use of the taper rollers serving as the rolling members as described above.

Figure 13:
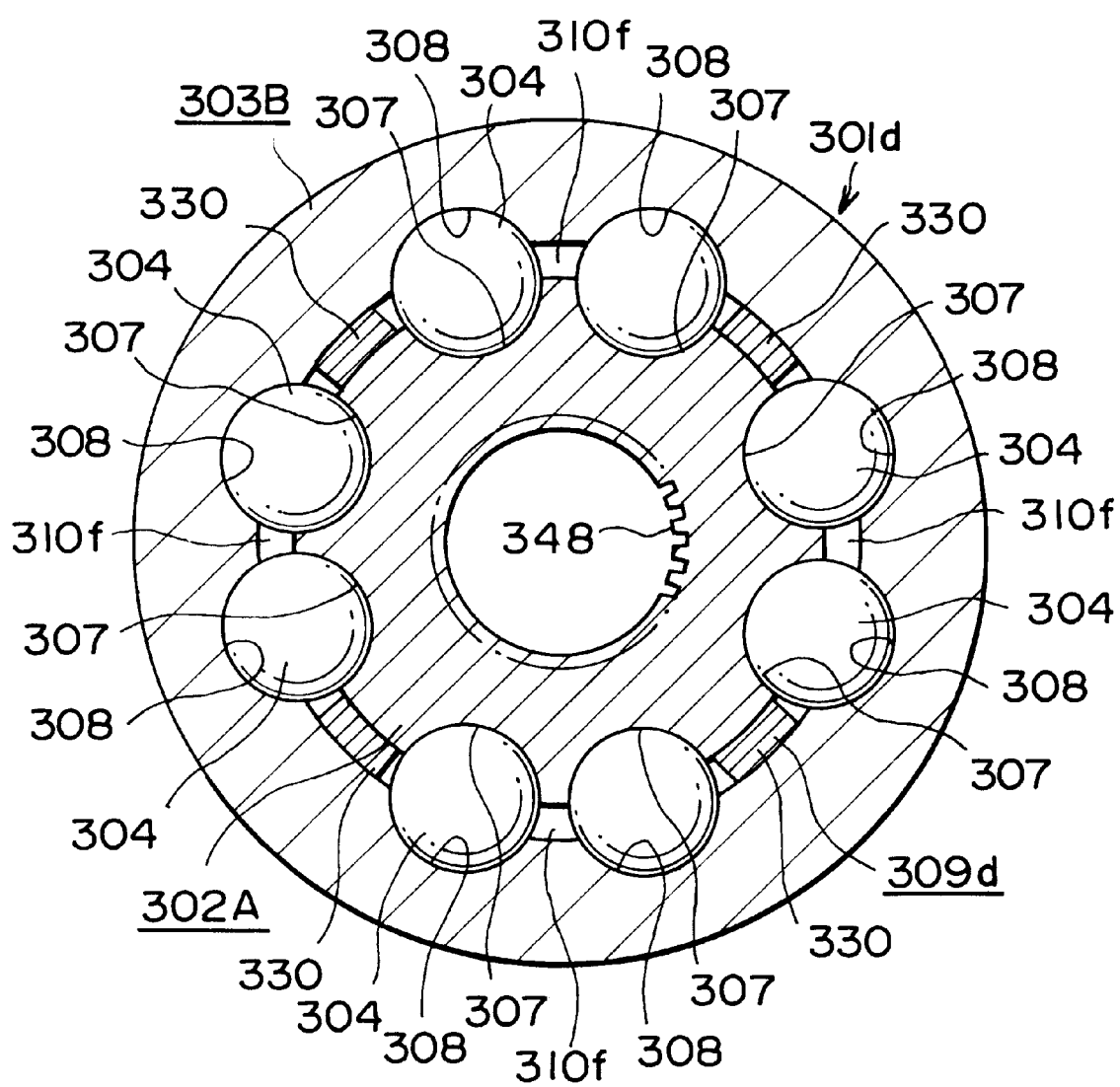
FIG. 13 is a view similar to FIG. 10, showing a first modified example of the third embodiment of the present invention.

Next, FIG. 13 shows a modified example of the first embodiment of the present invention. In this modified example, a cage 309d constituting a constant velocity joint 301d is formed with four pockets 310f, 310f. Then, these pockets 310f, 310f each hold two balls 304, 304, totally eight pieces of balls 304, 304. In the case of a structure of this modified example also, it is feasible to increase the length dimension of each of the column members 330, 330 existing between the pockets 310f, 310f adjacent to each other in the circumferential direction by narrowing a spacing between the balls 304, 304 held in the pockets 310f, 310f each having the same width. Then, the durability of the cage 309d is ensured, thereby obtaining a sufficient durability of the constant velocity joint 301d as a whole.

Figure 14:
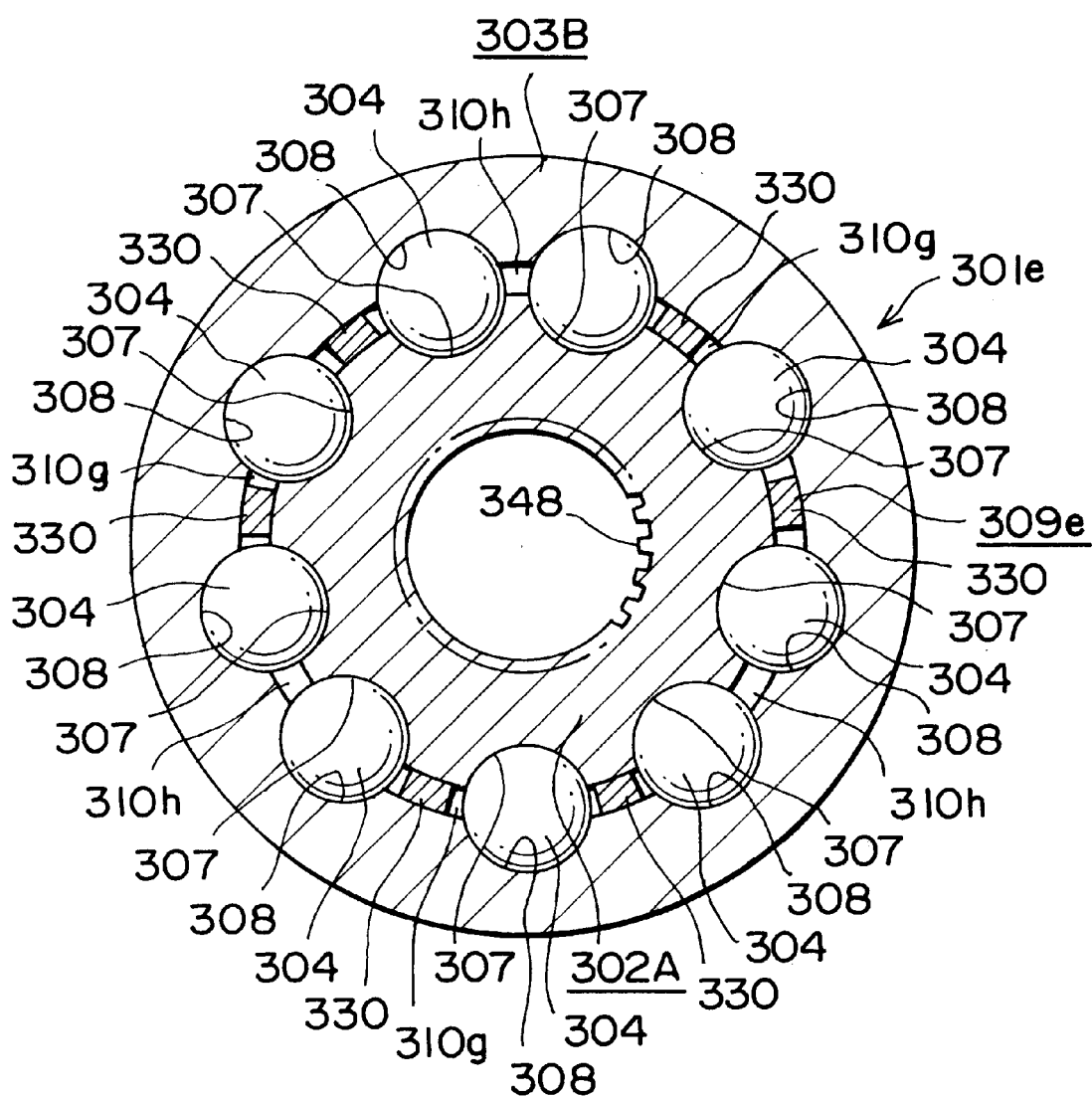
FIG. 14 is a view similar to FIG. 10, showing a second modified example of the third embodiment of the present invention.
Figure 15:
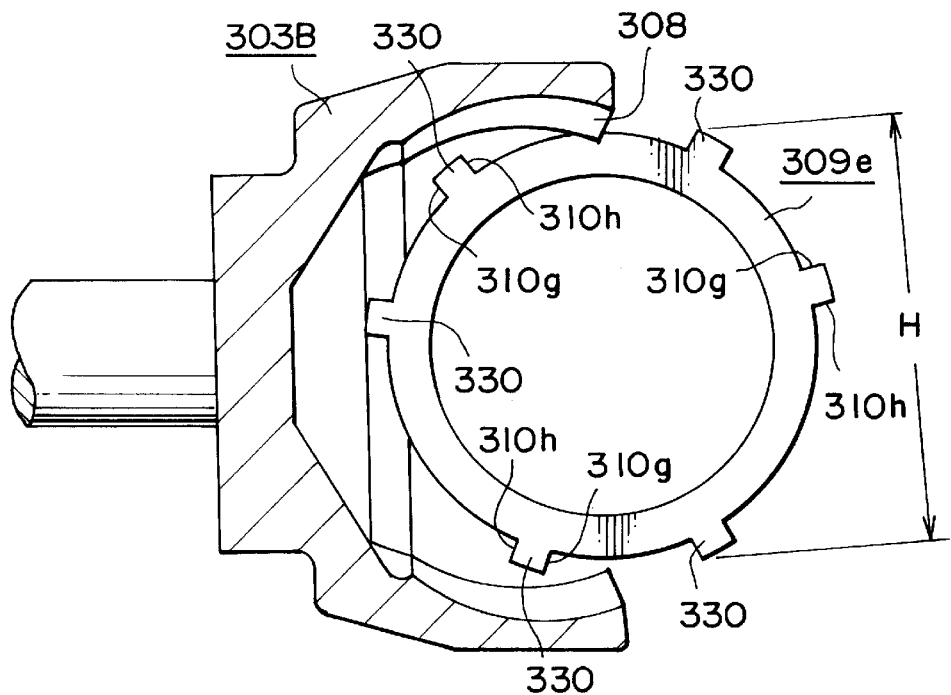
FIG. 15 is a sectional view showing a state where the cage is incorporated into an internal area of an outer race as viewed in the same direction as the one in FIG. 9.
Figure 16:
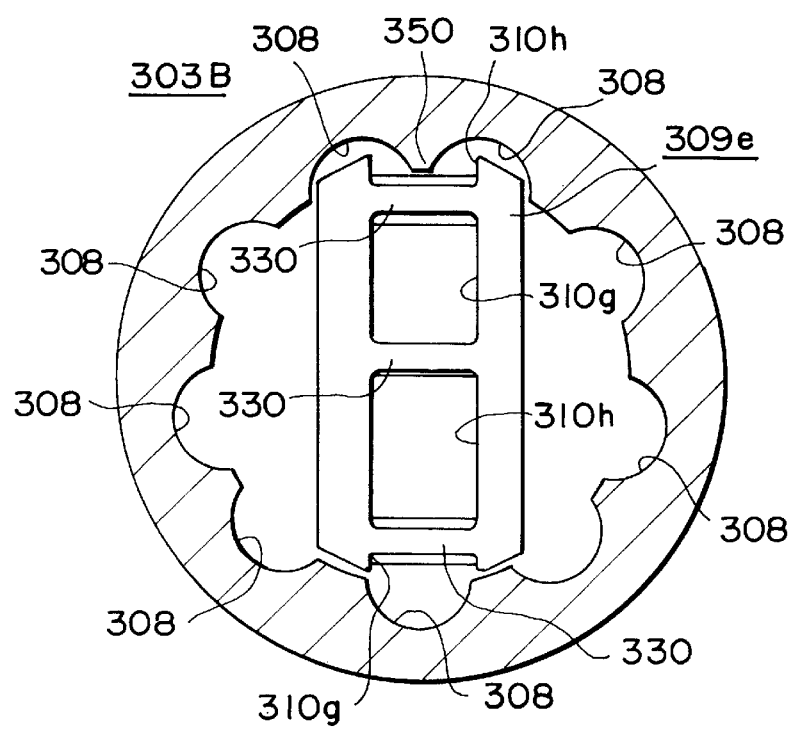
FIG. 16 is a view similarly showing the state as viewed in a right direction in FIG. 15.

Next, FIGS. 14 to 16 show a second modified example of the third embodiment of the present invention. In the case of the second modified example, a cage 309e constituting the constant velocity joint 301c is formed with six pockets 310g, 310h. Then, these pockets 310g, 310h each hold one or two balls, totally nine pieces of balls 304, 304. In the case of a structure of this modified example also, it is feasible to increase the length dimension of each of the column members 330, 330 existing between the pockets 310g, 310h adjacent to each other in the circumferential direction by narrowing a spacing between the balls 304, 304 held in the same pockets 310h, 310h.

Furthermore, in the case of the second modified example, the odd-number of the balls 304, 304 are provided, and nevertheless the pockets 310g, 310h are even-numbered. Hence, as illustrated in FIG. 15, there decreases a distance H between the column members 330, 330 existing between the adjacent pockets 310g, 310h. Consequently, when incorporating the cage 309e into the outer race 303B, as shown in FIGS. 15 and 16, a shoulder portion 350 between the outer engagement grooves 308, 308 adjacent to each other in the circumferential direction is intruded in the pockets 310g, 310h of the cage 309e, and the cage 309e can be decentered upward in FIGS. 15 and 16 till the shoulder portion 350 impinges upon the column member 330 of the cage 309e. Hence, this cage 309e can be incorporated. The reason why the pockets 310g, 310h are totally even-numbered in this second modified example is that the cage 309e can be incorporated into the outer race 303B by reducing the distance H. Note that the second modified example has exemplified the case of providing nine pieces of the balls 304, 304, however, if the number of the balls 304, 304 is set to 7, the pockets of the cage becomes even-numbered by making such a design that the respective pockets respectively hold one ball, one ball 304, one ball 304, one ball 304, one ball 304 and two balls 304. In this case, the pocket into which to insert the single ball is disposed in a 180-degree diagonal position of the pocket into which the two balls are inserted, and the distance H between the column members is decreased as in the case shown in FIG. 15.

The constant velocity joint in the third embodiment of the present invention is constructed and operates as discussed above, and has the structure capable of reducing the major diameter by setting the balls for transmitting the rotary force to 7 or more. Besides, the durability of the cage for holding these balls can be enhanced by increasing the rigidity of the cage. Accordingly, it is feasible to attain the downsizing and the decrease in the weight of the wheel-support rolling bearing unit known as the fourth-generation hub unit integrally incorporating the constant velocity joint while ensuring the sufficient durability.

Embodiment of Rolling Bearing Unit for Wheel

Figure 17:
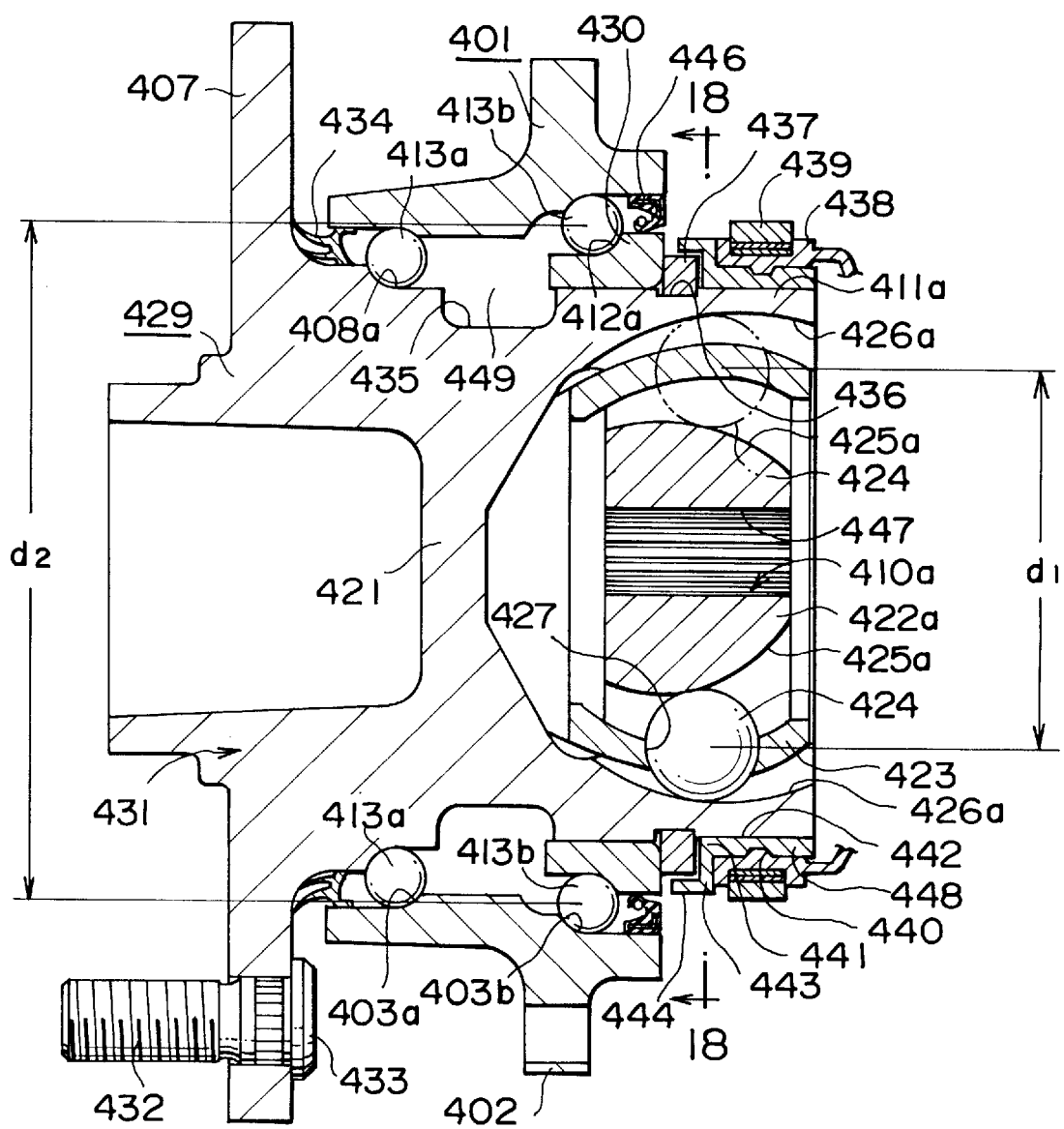
FIG. 17 is a sectional view showing a fourth embodiment of the present invention.
Figure 18:
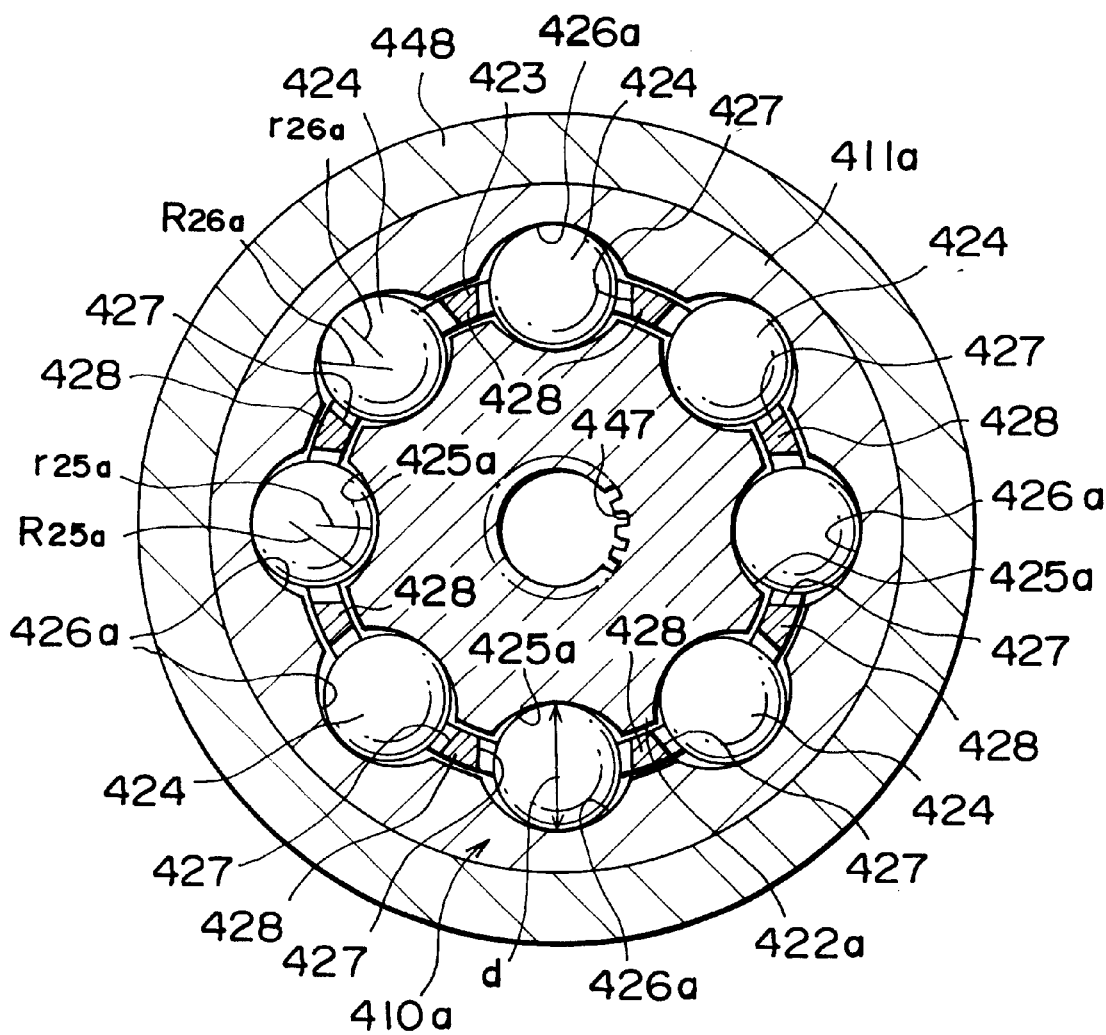
FIG. 18 is a view similarly showing only the constant velocity joint, corresponding to the section taken along the line 18—18 in FIG. 17.

FIGS. 17 and 18 show a first embodiment of the wheel-support rolling bearing unit according to the present invention. An outer race 401 (an outer race constructive member), which does not rotate but is held stationary in a state of being supported on the suspension, includes a first fitting flange 402, formed on its outer peripheral surface, for supporting the outer race on the suspension, and plural trains of outer race tracks 403a, 403b formed along an inner peripheral surface, respectively. An inner race constructive member 431 composed of a hub and an inner race 430 is disposed concentrically with the outer race 401 on the inner side of the outer race 401. First and second inner race tracks 408a, 412a are respectively formed in positions on the outer peripheral surface of the inner race constructive member 431, which face to the outer race tracks 403a, 403b. Of these two inner race tracks 408a, 412a, the first inner race track 408a is formed directly on an outer peripheral surface of an intermediate portion of the hub 429. Further, the inner race 430 is externally fitted to a portion, closer to an internal side end (closer to a right side end in FIG. 17) than the portion formed with the first inner race track 408a, of the intermediate portion of the hub 429. The second inner race track 412a is formed on an outer peripheral surface of this inner race 430. Then, a plurality of rolling members 413a and another plurality of rolling members 413b are so provided as to be capable of rolling respectively between the outer race tracks 403a, 403b and the first and second inner race tracks 408a, 412a, whereby the inner race constructive member 431 is rotatably supported on the inner side of the outer race 401.

In the case of the illustrated example, as described above, the first inner race track 408a is formed directly on the outer peripheral surface of the hub 429, whereby a diameter of the first inner race track 408a is set smaller than a diameter of the second inner race track 412a formed on the outer peripheral surface of the inner race 430. Further, with a contrivance of thus setting the diameter of the first inner race track 408a smaller than the diameter of the second inner race track 412a, a diameter of the outer race track 403a on the outer side (implying an outer side in a widthwise-direction in a state of being assembled to the automobile, i.e., a left side in FIG. 17) which faces to the first inner race track 408a, is set smaller than a diameter of the outer race track 403b on the inner side (implying a central side in the widthwise in the state of being assembled to the automobile, i.e., a right side in FIG. 17). Further, a major diameter of an outer half portion (a half portion on the outer side in the widthwise direction in the state of being assembled to the vehicle, i.e., a left half portion in FIG. 17), formed with the outer race track 403a on the outer side, of the outer race 401, is set smaller than a major diameter of an inner half portion (a half portion on the central side in the widthwise direction in the state being assembled to the vehicle, i.e., a right half portion in FIG. 17), formed with the outer race track 403b on the inner side, of the outer race 401. Moreover, in the illustrated example, with the setting of thus decreasing the diameters of the first inner race track 408a and of the outer race track 403a on the outer side, the number of the rolling members 413a provided between the first inner race track 408a and the outer race track 403a on the outer side is set smaller than the number of the rolling members 413b provided between the second inner race track 412a and the outer race track 413b on the inner side.

Moreover, a second fitting flange 407 for supporting and fixing the wheel to the hub 429 is provided integrally with this hub 429 on an outer peripheral surface of an external side end of the hub 429. Proximal ends of a plurality of studs 432 for joining the wheel are fixed to the second fitting flange 407. In the case of the illustrated, a pitch circle diameter of each of the plurality of studs 432 is reduced to such a degree as to similarly set the major diameter of the outer half portion of the outer race 401 than the major diameter of the inner half portion as described above (to such a degree that a head 433 of each stud 432 does not interfere with the outer peripheral surface of the external side end of the outer race 401). Note that a diameter of a portion, existing more inwards in the axial direction than a portion formed with the first inner race track 408, of the outer peripheral surface of the hub 429, is set smaller than a diameter of an inscribing circle of each of the rolling members 413a, 413a corresponding to the first inner race track 408a. The reason why so is that when assembling the wheel-support rolling bearing unit, the plurality of rolling members 413a are assembled on the side of the minor diameter of the outer race track 403a formed on the inner peripheral surface of the external side end of the outer race 401, and a seal ring 434 is internally fixedly fitted to an inner peripheral surface of the external side end of the outer race 401, in which state the hub 429 is made insertable into the inside-diametrical portion of the outer race 401. Further, a wall-sunk portion 435 taking a recessed groove-like shape is formed along the entire periphery at a portion, between the first inner race track 408a and the portion externally fitted with the inner race 430, on the outer peripheral surface of the intermediate portion of the hub 429, thereby reducing a weight of the hub 429.

Moreover, a stop ring 437 engages with an engagement recessed groove 436 formed along the entire periphery of a portion, closer an internal side end of the outer peripheral surface, of the hub 429 in order to keep to a proper value a pressure given to each of the plurality of rolling members 413a and another plurality of rolling members 413b so provided as to be capable of rolling between the outer race tracks 403a, 403b and the first and second inner race tracks 408a, 412a by preventing the inner race 430 fitted on the hub 429 from displacing toward the internal side end in the axial direction. This stop ring 437 is constructed of a pair of stop ring elements each assuming a semicircular shape. The thus constructed stop ring 437 makes its own inner peripheral edge engaged with the engagement recessed groove 436 while pressing the inner race 430 against the hub 429 outwards in the axial direction in order to give the proper pressure to each of the rolling members 413a, 413b. The stop rings 437 having proper thickness dimensions are selectively used for keeping each of the rolling members 413a, 413b given the proper pressure even in a state where the force pressing the inner race 430 outwards in the axial direction is canceled. More specifically, there are prepared plural types of stop rings 437 slightly different from each other in terms of their thickness dimensions, and the stop ring 437 having the proper thickness dimension in relation to a dimension of each of the constructive members of the rolling bearing unit such as a groove width of the engagement recessed groove 436, is chosen and engaged with the engagement recessed groove 436. Accordingly, when this selected stop ring 437 engages with the engagement recessed groove 436, even if the pressing force is canceled, the inner race 430 is prevented from displacing toward the internal side end in the axial direction, whereby each of the rolling members 413, 413 can remain to be given the proper pressure.

Further, a part of a spacer 448 is disposed along the periphery of the stop ring 437 in order to prevent the stop ring 437 from being unintentionally disengaged from the engagement recessed groove 436 due to outward displacements, in the diametrical direction, of the pair of stop ring elements constituting the stop ring 437. This spacer 448 is a member for supporting a boot 438 for preventing foreign matters such as rain water and dusts etc from permeating into a constant velocity joint 410*a* constructed of a housing unit 411*a* provided at the internal side end of the hub 429 in such a way that the external side end of the boot 438 is fitted on the spacer 448. Note that this boot 438 is integrally formed of an elastic material such as a rubber and a synthetic resin etc, wherein an intermediate portion of the boot 438 is formed in a bellows-like configuration, and both edges thereof are formed in a cylindrical shape, respectively. An external side end of the thus constructed boot 438 is fitted on the metal spacer 448 externally fixedly attached to the internal edge of the hub 429 by interference-fitting, and is pressed against the outer peripheral surface of this spacer 448 by a presser band 439. Note that the inner peripheral surface of the external side end of the boot 438 engages along its entire periphery with the engagement groove 440 formed in the outer peripheral surface of the spacer 448.

A portion, protruding outward in the axial direction from the boot 448, at the external side edge of the spacer 448 is formed in a crank shape in section, thus constituting a presser portion 441 along the entire periphery. For constituting this presser portion 441, the spacer 448 is constructed of a small-diameter cylindrical portion 442 fixedly fitted on the internal side end of the hub 429, a ring portion 443 crooked inward in the diametrical direction from the external side edge of the small-diameter cylindrical portion 442, and a large-diameter cylindrical portion 444 crooked outward in the axial direction from an outer peripheral edge of this ring portion 443. Then, an outer surface of the ring portion 443 among these components is brought into contact with or disposed in close proximity facing to the inner surface of the stop ring 437, and an inner peripheral surface of the large-diameter cylindrical portion 444 is brought into contact with or disposed in close proximity facing to the outer peripheral surface of the stop ring 437. Further, a seal ring 434 is provided between the inner peripheral surface of the external side end of the outer race 401 and the outer peripheral surface of the intermediate portion of the hub 429. A combination seal ring 446 is provided between the inner peripheral surface of the internal side end of the outer race 401 and the outer peripheral surface of the internal side end of the inner race 430. Openings at both ends of a spacer 449 in which the plurality of rolling members 413, 413 are disposed, are sealed by these seal rings.

Further, a housing unit 411*a* serving as an outer race of constant velocity joint 410*c* is formed at a portion, on which the inner race 430, the spacer 448 and the stop ring are fitted, at the internal side end of the hub 429. An inner peripheral surface of this housing unit 411*a* is formed with eight streaks of outer engagement grooves 426*a*, 426*a*. The engagement grooves 426*a*, 426*a* each taking a circular arc configuration in section when cut off by an imaginary plane orthogonal to the central axis of this housing unit 411*a*, are formed in a direction right-angled (in the right-and-left direction in FIG. 17, and in the surface-and underside direction in FIG. 18) to the circumferential direction. Moreover, an inner race 422*a* for constituting the constant velocity joint 410*a* in combination with the housing unit 411*a*, is disposed inwardly of the housing unit 411*a*. An outer peripheral surface of the inner race 422*a* is also formed with eight streaks of inner engagement grooves 425*a*, 425*a*, each taking a circular arc configuration in section when cut off by an imaginary plane orthogonal to the central axis of this inner race 422*a*, in the direction right-angled to the circumferential direction. Then, totally eight pieces of balls 424, 424 are so provided piece by piece for each of the engagement grooves 425*a*, 425*a* as to be capable of rolling between these inner engagement grooves 425*a*, 425*a* and the outer engagement grooves 426*a*, 426*a* in a state of being held in pockets 427 of cage 423. Furthermore, a spline hole 447 is formed extending in the axial direction at the central portion of the inner race 422*a*. An edge portion of one shaft (corresponding to 5 in FIG. 21) is spline-engaged with the spline hole 447 in a state of being assembled to the automobile, whereby the hub 429 can be rotationally driven through the eight pieces of balls 424, 424 as well as through the inner race 422*a*. Note that the cage 423 constituting the above constant velocity joint 410*a* is held between the outer peripheral surface of the inner race 422*a* and the inner peripheral surface of the housing unit 411*a*, and the plurality of pockets 427 each elongating in the circumferential direction are formed in positions aligned with the above two engagement grooves 425*a*, 426*a*.

On the other hand, a screen board 421 for closing a central spatial portion of the hub body is integrally provided at the center of a central portion of the hub body 429, thereby ensuring a rigidity of the housing unit 411*a* and preventing foreign matters from permeating into the constant velocity joint 410*a* from outside.

In the case of the wheel-support rolling bearing unit according to the present invention, the two groups of inner and outer engagement grooves 425*a*, 426*a* do not take a simple circular arc configuration in section, and radii of curvature of these sectional configurations are made different from each other at the groove bottom area of each of the engagement grooves 425*a*, 426*a* and two side portions proximal to the respective opening edges. To be specific, each of the engagement grooves 425*a*, 426*a* takes an ellipse takes an elliptical shape in section in which the diametrical direction of the constant velocity joint 410*a* is set as its major-diametrical direction, or a shape of Gothic arch, thereby comparatively decreasing curvature radii $r_{25a}$, $r_{26a}$ (down to, e.g., 0.504–0.51-fold value of the major diameter d of each ball 424) of the groove bottom areas of the engagement grooves 425*a*, 426*a*, and comparatively increasing curvature radii $R25a$, $R26a$ (up to, e.g., 0.51–0.52-fold value of the major diameter d of each ball 424) of the two side portions close to the opening edges ($r_{25a} < R_{25a}$, and $r_{26a} < R_{26a}$). As described above, with a contrivance about the sectional configuration of each of the two groups of inner and outer engagement grooves 425*a*, 426*a*, it is possible to increase the contact angle between the inner surface of each of the two groups of inner and outer engagement grooves 425*a*, 426*a* and the rolling surface of each ball 424. Therefore, the durability of the constant velocity joint 410*a* can be ensured by augmenting the load capacity of the constant velocity joint 410*a*. Further, the respective ball 424 are hard to run on the shoulder portions of the two groups of inner and outer engagement grooves 425*a*, 426*a*, thereby making it feasible to prevent an excessive surface pressure based on the edge load from acting in the rolling surface of each of the balls 424, and ensure the exfoliation life-span of the rolling surface of each ball 424.

Moreover, in the case of the wheel-support rolling bearing unit, the number of the two groups of inner and outer engagement grooves 425*a*, 426*a* and the number of the balls 424, are each set to 7 or more (8 in the case of the present embodiment). Then, if a ratio $d_1/d_2$ (=R) of a diameter $d_1$ of a pitch circle of each ball 424 to a diameter $d_2$ of a pitch circle of each of the rolling members 413*b*, 413*b* constituting the inner rolling body train, is set to 0.49 through 0.63. Hence, even when the number of the balls 424, 424 constituting the constant velocity joint 410*a* is set to over 7, it is feasible to ensure a rolling fatigue life-span of the inner surface of each of the two groups of inner and outer engagement grooves 425a, 426a by restraining a rise in the contact surface pressure of the impingement portion, which involves increasing the major diameter of each ball 424 and also enlarging a contact ellipse existing in the impingement portion between the rolling surface of each of the balls 424, 424 and the inner surface of each of the two groups of inner and outer engagement grooves 425a, 426a. Furthermore, the durability of the cage 423 can be ensured by securing the width of each of the column members 428, 428 existing between the pockets 427, 427 for holding the respective balls 424, 424 so as to be capable of rolling with respect to the cage 423. Besides, it is possible to make such a design that a part of the outer engagement grooves 426a, 426a are disposed on the inner side in the diametrical direction of the train of the inner rolling members 413b, 413b provided along the periphery of the inner race 430. As a result, a part of the body portion of the rolling bearing unit construed including the train of the inner rolling members 413b, 413b, can be overlapped with a part of the constant velocity joint 410a in the diametrical direction, whereby the downsizing and the decrease in weight of the wheel-support rolling bearing unit can be attained by reducing the axial dimension of the wheel-support rolling bearing unit called the fourth-generation hub unit.

As the ratio $d_1/d_2$ (=R) of the diameter $d_1$ of the pitch circle of each of the balls 424 to the diameter $d_2$ of the pitch circle of each of the rolling members 413b, 413b becomes less than 0.49, the pitch circle $d_2$ of the ball 424 becomes larger, in which case it is difficult to reduce the weight of the wheel-support rolling bearing unit known as the fourth-generation hub unit.

By contrast, as the value of $d_1/d_2$ exceeds 0.63, the diameter $d_2$ of the pitch circle of each of the rolling members 413b, 413b constituting the inner rolling body train decreases, at which time a thickness of the housing unit 411a decreases, resulting in a deficiency of the strength of this portion.

Following Table shows test data when selecting the pitch circle diameters $d_{c1}$, $d_2$ in many ways.

| D1/d2 | 0.47 | 0.49 | 0.57 | 0.63 | 0.65 |
|---|---|---|---|---|---|
| Strength of housing | O | O | O | O | X |
| Decrease in weight of hub unit | X | O | O | O | O |

In the above table, the mark O indicates "acceptable" and the mark X indicates "non-acceptable".

The operation of rotatably supporting the wheel on the suspension through the thus constructed wheel-support rolling bearing unit in this embodiment, is the same as that of the prior art wheel-support rolling bearing unit described above. Particularly, in the case of the wheel-support rolling bearing unit of the present invention, as explained above, oven if the dimension of the major diameter of each of the plurality of balls 424 constituting the constant velocity joint 410a is reduced to some extent, the durability of the housing unit 411a can be amply ensured, and the downsizing and the decrease in the weight of the wheel-support rolling bearing unit can be attained.

Further, in the case of the illustrated example, as discussed above, the major diameter of the outer half portion of the outer race 401 can be reduced by decreasing the diameter of the pitch circle of each of the rolling members 413a, 413a forming the outer rolling member train. Then, the diameter of the pitch circle of each of the plurality of studs 432 fixed to the second fitting flange 407 provided on the outer peripheral surface of the hub 429 can be reduced correspondingly to a degree to which the major diameter of the outer half portion of the outer race 401 is decreased. Accordingly, it is feasible to attain the downsizing and the reduction in the weight of the wheel-support rolling bearing unit more effectively by decreasing the major diameter of the second fitting flange 407 for fixedly supporting the studs 432 without increasing the axial dimension of the hub 429.

As discussed above, with the contrivance of making the diameter of the pitch circle of each of the rolling members 413a, 413a constituting the outer rolling member train, smaller than the diameter of pitch circle of each of the rolling members 413b, 413b constituting the inner rolling member train, the basic dynamic load capacity upon the outer rolling member train is smaller than the basic dynamic load capacity upon the inner rolling member train. Accordingly, if the loads upon the two trains are equal, the life-span of the outer rolling member train is shorter than that of the inner rolling member train. In contrast with this, in the general automobile, the load applied to the outer rolling member train is smaller than the load applied to the inner rolling member train. Hence, the design for substantially equalizing the life-spans of the above two rolling member trains can be facilitated, and the design with no futility can be attained. Note that the balls are used as the rolling members 413b, 413b in the illustrated example, however, in the case of the an automobile-support rolling bearing unit with an increased weight, taper rollers might be used as the rolling members in some cases. The present invention is, as a matter of course, applicable to the rolling bearing unit involving the use of the taper rollers serving as the rolling members as described above. Other configurations and operation are basically the same as those in the prior art structure, of which the detailed explanation is omitted.

Figure 19A:
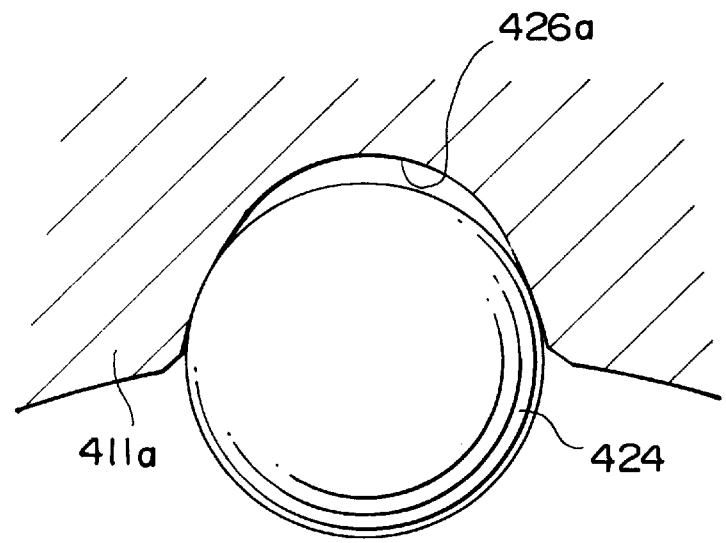
FIGS. 19A and 19B are enlarged sectional views each showing a first modified example of the fourth embodiment of the present invention, FIG. 19A showing a sectional configuration of an outer engagement groove, FIG. 19B showing a sectional configuration of an inner engagement groove.
Figure 19B:
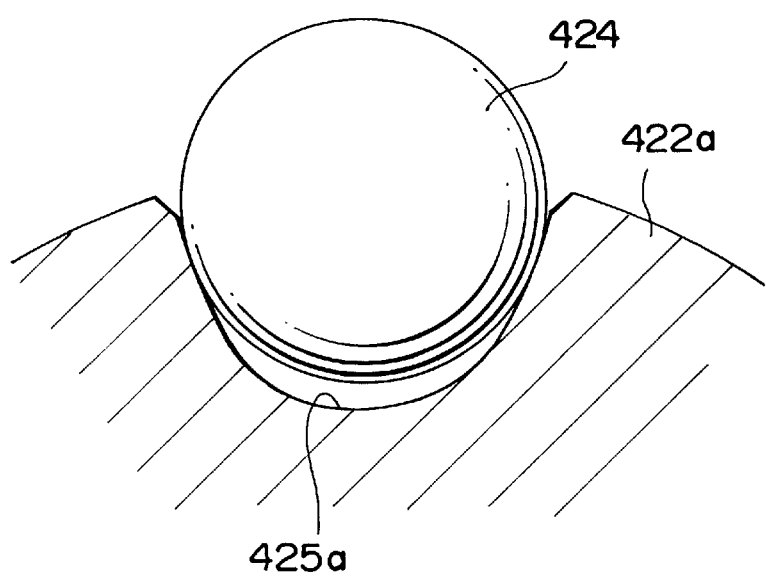

Next, FIGS. 19A and 19B show a modified example of the rolling bearing unit. The present modified example exemplifies a more preferable case of sectional configurations of the outer engagement groove 426a and of the inner engagement groove 425a, in accordance with this modified example, the radius of curvature of the groove bottom area of each of the two groups of outer and inner engagement grooves 426a, 425a is set smaller than the radius of curvature of the rolling surface of the ball 424. Accordingly, the rolling surface of this ball 424 is not brought into contact with the groove bottom area of each of the two groups of outer and inner engagement grooves 426a, 425a. With such a configuration being taken, the edge load is more effectively prevented from occurring on the rolling surface of each ball 424, whereby the exfoliation life-span of the rolling surface of each ball 424 can be ensured. Further, the contact angle between the inner surface of the two engagement grooves 426a, 425a and the rolling surface of the respective balls 424, 424, can be made much larger. It is therefore possible to further enhance the durability of the constant velocity joint 410a by increasing the load capacity of the constant velocity joint 410a. Other configurations and operations are the same as those in the example shown in FIG. 17, and hence the detailed explanation thereof is omitted.

Figure 20A:
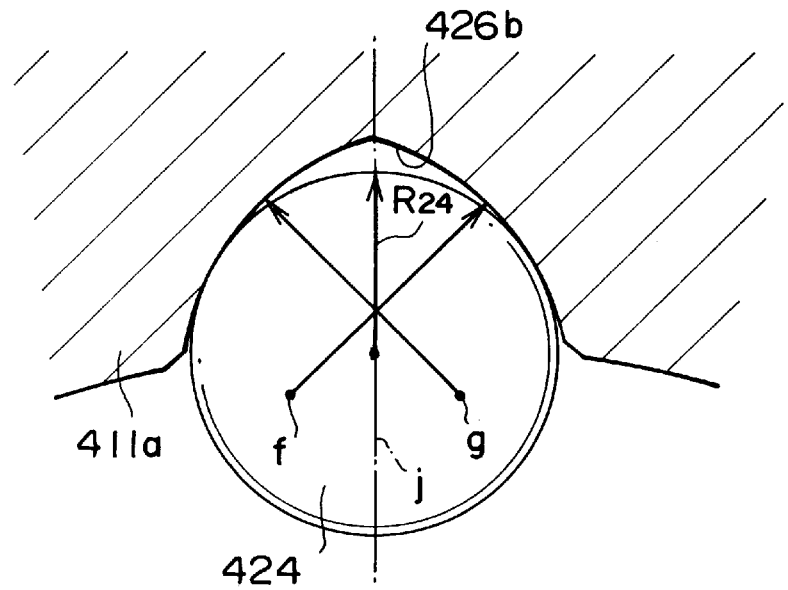
FIGS. 20A and 20B are enlarged sectional views each showing a second modified example of the fourth embodiment of the present invention, FIG. 20A showing a sectional configuration of an outer engagement groove, FIG. 20B showing a sectional configuration of an inner engagement groove.
Figure 20B:
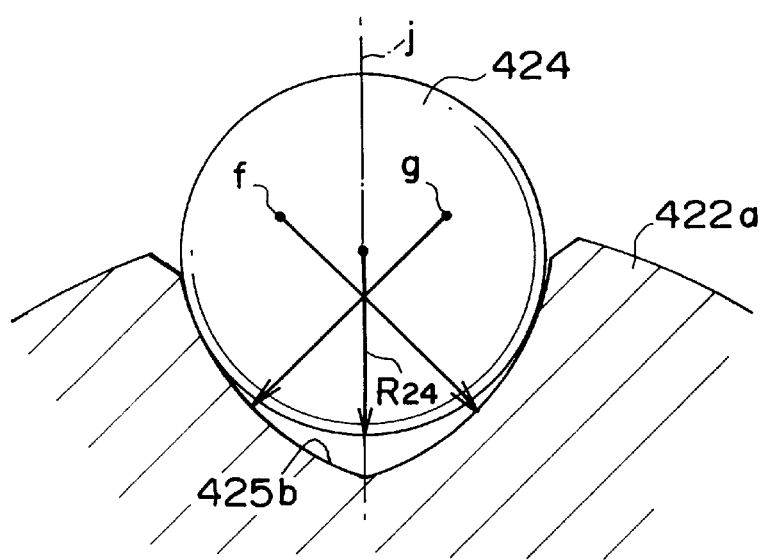

Moreover, FIGS. 20A and 20B show a second modified example of the rolling bearing unit of the present invention.

In the second modified example, each of the two groups of outer and inner engagement grooves 426b, 425b has in terms of the sectional configuration thereof a larger radius of curvature than the curvature radius $R_{24}$ of the rolling surface of each of the balls 424, 424, and the above sectional configuration is shaped by a pair of circular arcs meeting each other at the groove bottom area of each of the two groups of outer and inner engagement grooves 426b, 425b. More specifically, the centers f, g of the curvature radii of the respective circular arcs are offset each other in directions opposite to each other on the basis of a chain line indicating the center of the groove width of each of the two groups of outer and inner engagement grooves 426b 425b. It should be noted that the bottom of each engagement groove is formed as a curved surface gently continuous to both of the inner surfaces so that the stress does not concentrate. Other configurations and operations are the same as those in the first modified example discussed above, and the detailed explanation thereof is therefore omitted.

Figure 25:
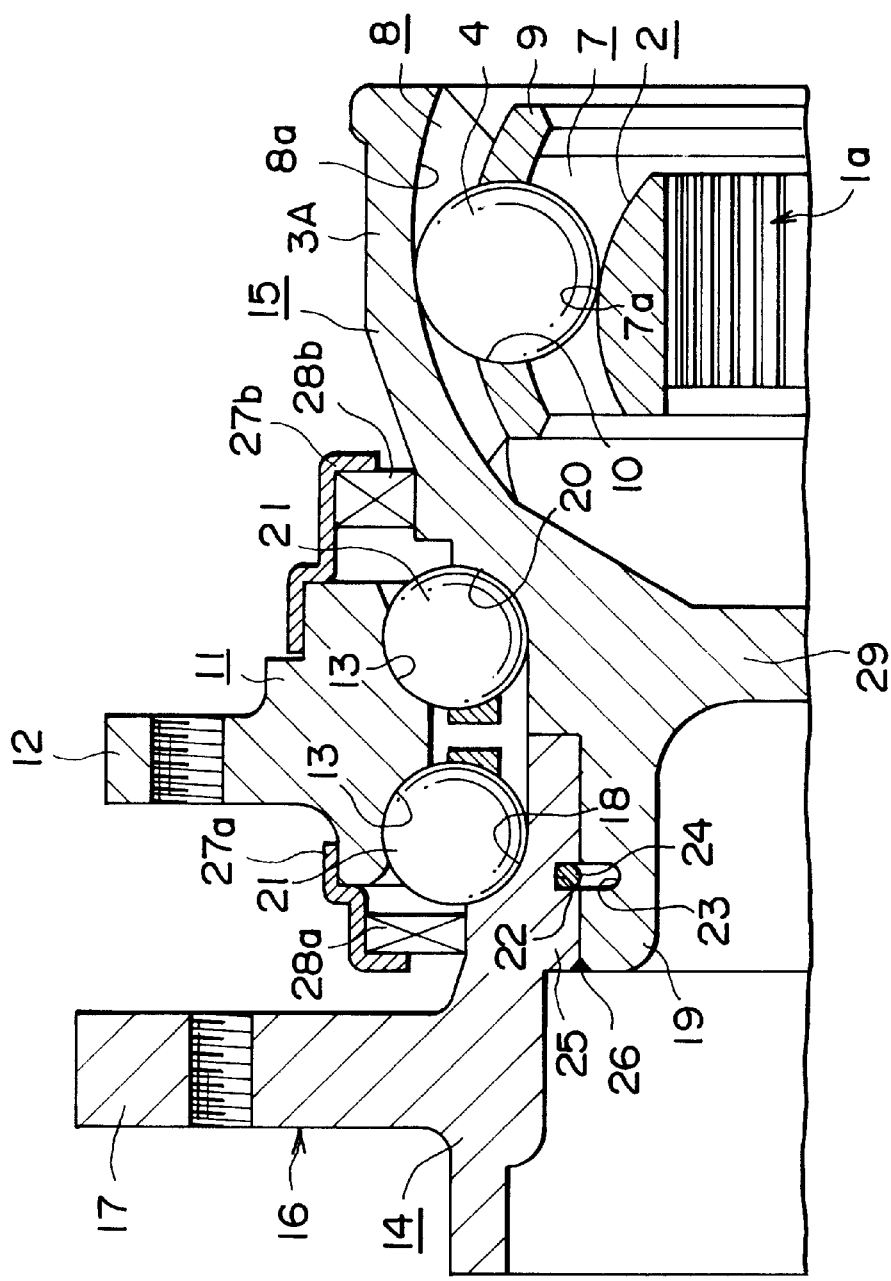
FIG. 25 is a sectional view showing one example of the wheel-support rolling bearing unit integrally incorporating the constant velocity joint in the prior art.
Figure 26:
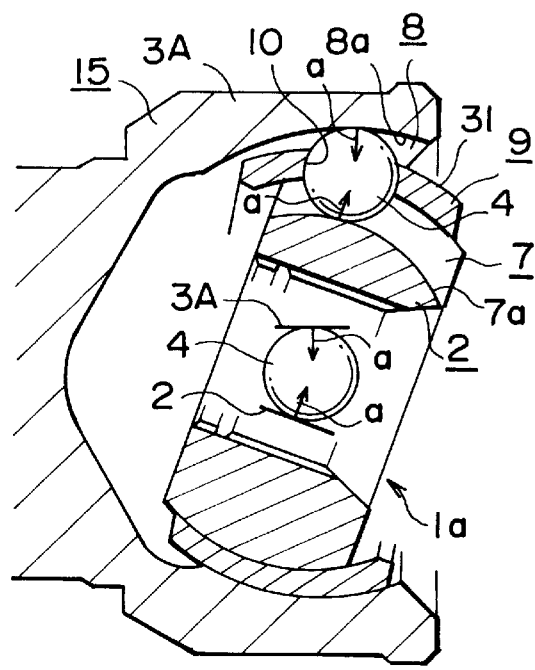
FIG. 26 is a sectional view partially schematically showing how the force is applied to the ball during the operation of the constant velocity joint.
Figure 27:
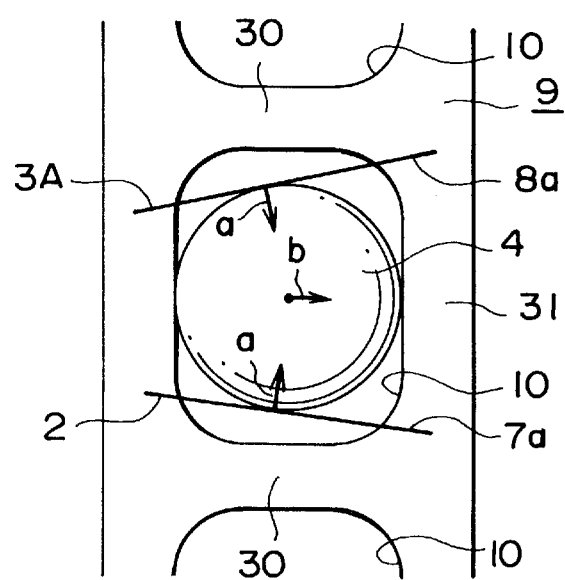
FIG. 27 is an enlarged view similarly showing a central portion in FIG. 26.
Figure 28:
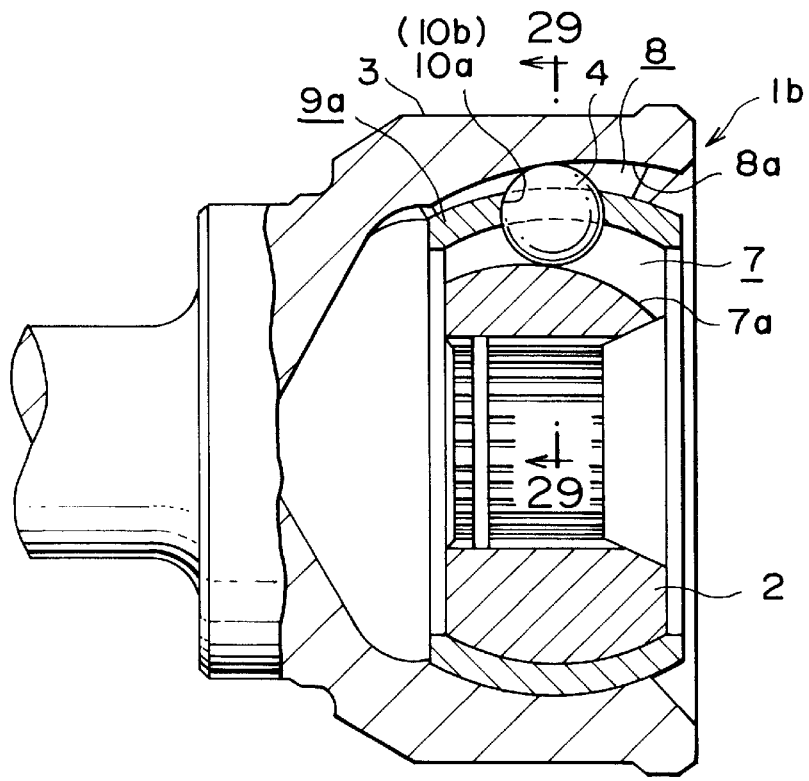
FIG. 28 is a sectional view showing a second example of the prior art constant velocity joint in a state where the joint angle is not given.
Figure 29:
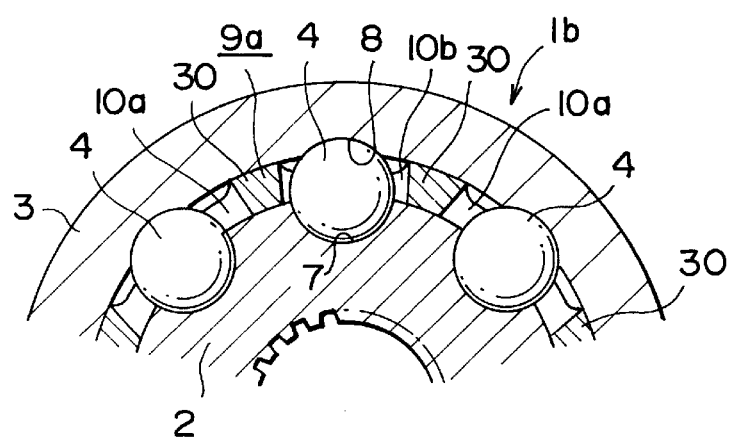
FIG. 29 is a sectional view taken along the line 29—29 in FIG. 28.

Note that as previously illustrated in FIGS. 17 and 18, in the case of the constant velocity joint 410a in the embodiment wherein the number of the balls 424 is set to 8, the major diameter of the housing unit 411a is set smaller than the major diameter of the housing unit 3A of the constant velocity joint 1a including the six balls as in the prior art structure previously shown in FIG. 25, thus attaining the downsizing and the reduction in the weight of the wheel-support rolling bearing unit integral with the constant velocity joint. Thus, it is preferable to comply with the conditions which will hereinafter be explained in the case of reducing the major diameter of the housing unit 411a by decreasing the major diameter of each of the balls 424, 424 as well as increasing the number of the balls 424. Namely, $$0.90 \leq d_1/d_0 \leq 0.95$$

where $d_0$ is the diameter of the pitch circle of each of the balls 4 constituting the prior art constant velocity joint shown in FIG. 25, and $d_1$ is the diameter of the pitch circle of each of the balls 424 constituting the constant velocity joint 410a of the present invention. The reason why so will hereinafter be elucidated.

At first, as $d_1/d_0$ is less than 0.90, the diameter $d_1$ is reduced in the case of the present invention, in which case the major diameter of each ball 424 becomes too small, and the contact surface pressure of the impingement portion between the respective balls 424 and the inner and outer engagement grooves 425a, 426a becomes excessively high. As a result, there declines the rolling fatigue life-span of the two groups of inner and outer engagement grooves 425a, 426a, which is not therefore preferable. By contrast, as $d_1/d_0$ becomes larger than 0.95, the diameter $d_1$ is increased in the case of the present invention, in which case the major diameter of each of the balls 424, 424 becomes too large. Therefore, the diameter of the circumscribing circle of the bottom of each of the outer engagement grooves 426a, 426a increases, with the result that the downsizing and the reduction in the weight of the wheel-support rolling bearing unit incorporating the constant velocity joint can not be effectively attained. This is not likewise preferable. Further, in this case, the spacing between the balls 424 is narrowed, and there diminishes the circumference-directional width of each of the column members 428, 428 existing between the pockets 427 for supporting the respective balls 424 so that the balls are capable of rolling. Hence, this might be a cause for a decline of the durability of the cage 423.

The wheel-support rolling bearing unit according to the present invention is constructed and operates as described above, and can be therefore downsized and reduced in its weight, and beside has the sufficient durability.

The present invention has been discussed by way of the embodiments but may be modified in many forms within the range of the gist of the present invention, and these modifications are not excluded from the scope of the present invention.

What is claimed is:

1. A constant velocity joint comprising:

an inner race;

inner engagement grooves each taking a circular arc in section and formed in a plurality of locations on an outer peripheral surface of said inner race in a direction right-angled to a circumferential direction;

an outer race provided along a periphery of said inner race;

outer engagement grooves each taking a circular arc in section and formed in positions facing said inner engagement grooves on an inner peripheral surface of said outer race in the direction right-angled to the circumferential direction;

a cage sandwiched in between an outer peripheral surface of said inner race and an inner peripheral surface of said outer race and formed with pockets each elongated in a circumferential direction in positions aligned with said inner engagement groove and said outer engagement groove; and a plurality of balls made capable of rolling along said inner engagement grooves and said outer engagement grooves in a state of being held inwardly of the pockets;

wherein an axial crossing angle between a central axis of said inner race and a central axis of said outer race is bisected;

said balls are disposed within a bisection plane orthogonal to a plane including these two central axes;

at least a part of said plurality of pockets are capable of holding said plurality of balls within said single pocket, and the number of said pockets is even-numbered; and said plurality of balls comprises at least 7, and the number of said balls held in each of said pockets is different.

2. A constant velocity joint according to claim 1, wherein the number of said pockets is 4, the number of said balls is 10, the number of said balls held in each of said two pockets existing on the opposite side in a diametrical direction is 2, and the number of said balls held in each of said remaining two pockets is 3, respectively.

3. A constant velocity joint comprising:

an inner race;

inner engagement grooves each taking a circular arc in section and formed in a plurality of locations in a circumferential direction on an outer peripheral surface of said inner race in a direction right-angled to a circumferential direction;

an outer race provided along a periphery of said inner race;

outer engagement grooves each taking a circular arc in section and formed in positions facing to said inner engagement grooves on an inner peripheral surface of said outer race in the direction right-angled to the circumferential direction;

a cage sandwiched in between an outer peripheral surface of said inner race and an inner peripheral surface of said outer race and formed with a plurality of pockets each elongated in a circumferential direction in positions aligned with said inner engagement grooves and said outer engagement grooves; and a plurality of balls made capable of rolling along said inner engagement grooves and said outer engagement grooves in a state of being held inwardly of the pockets, the number of said balls being the same as the number of said inner and outer engagement grooves;

wherein an axial crossing angle between a central axis of said inner race and a central axis of said outer race is bisected;

said balls are disposed within a bisection plane orthogonal to a plane including these two central axes; and when $R_1=D_c/d_m$ where $D_c$ is a diameter of the outer peripheral surface of said cage, $d_m$ is a pitch circle diameter of each of said plurality of balls, and $r_1=d_c/d_m$, where $d_c$ is a diameter of the inner peripheral surface of said cage, and $d_m$ is a pitch circle diameter;

$1.06<R_1<1.11$, and $0.945<r_1<0.998$ are satisfied; and further when $r_t=t_c/D_a$, where $t_c$ is an average thickness of the cage which is expressed by ½ of a difference between a diameter $D_c$ of the outer peripheral surface of said cage and a diameter $d_c$ of the inner peripheral surface of said cage, and $D_a$ is a major diameter of said each ball, $0.16<r_t<0.30$ is satisfied.

4. A rolling bearing unit for a wheel, comprising:

an outer race constructive member including respectively a first fitting flange, formed on an outer peripheral surface, for supporting said outer race constructive member on a suspension, and plural trains of outer race tracks formed on an inner peripheral surface, said outer race constructive member not rotating when used;

an inner race constructive member having the other side end portion formed as a housing unit serving as an outer race of a constant velocity joint, said inner race constructive member rotating when used;

a plurality of rolling members so provided as to be capable of rolling between said outer race tracks and said inner race tracks;

an inner race provided on an inner side of said housing unit and constituting said constant velocity joint;

inner engagement grooves each taking a circular arc in section and formed in a plurality of locations in the circumferential direction on an outer peripheral surface of said inner race in a direction right-angled to a circumferential direction;

outer engagement grooves each taking a circular arc in section and formed in positions facing said inner engagement grooves on the inner peripheral surface of said outer race in the direction right-angled to the circumferential direction;

a cage sandwiched in between an outer peripheral surface of said inner race and an inner peripheral surface of said outer race and formed with a plurality of pockets each elongated in a circumferential direction in positions aligned with said inner engagement grooves and said outer engagement grooves, said cage constituting said constant velocity joint; and a plurality of balls made capable of rolling along said inner engagement grooves and said outer engagement grooves in a state of being held inwardly of the pockets, the number of said balls being the same as the number of said inner and outer engagement grooves;

wherein an axial crossing angle between a central axis of said inner race and a central axis of said outer race is bisected;

said balls are disposed within a bisection plane orthogonal to a plane including these two central axes; and when $R_1=D_c/d_m$, $D_c$ is a diameter of the outer peripheral surface of said cage, $d_m$ is a pitch circle diameter of each said plurality of balls, and $r_1=d_c/d_m$ where $d_c$ is a diameter of the inner peripheral surface of said cage and $d_m$ has the meaning given above;

$1.06<R_1<1.11$, and $0.945<r_1<0.998$ are satisfied; and further when $r_t=t_c/D_a$, $t_c$ is an average thickness of the cage which is expressed by ½ of a difference between a diameter $D_c$ of the outer peripheral surface of said cage and a diameter $d_c$ of the inner peripheral surface of said cage, $D_a$ is a major diameter of said each ball, $0.16<r_t<0.30$ is satisfied.

* * * * *